United States Patent
Sun et al.

(10) Patent No.: US 12,525,826 B2
(45) Date of Patent: Jan. 13, 2026

(54) FREQUENCY SPREADING BASED CHANNEL STATE INFORMATION ACQUISITION IN WIRELESS POWER TRANSFER

(71) Applicant: QUALCOMM Incorporated, San Diego, CA (US)

(72) Inventors: Jing Sun, San Diego, CA (US); Raviteja Patchava, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 18/163,093

(22) Filed: Feb. 1, 2023

(65) Prior Publication Data

US 2024/0258833 A1 Aug. 1, 2024

(51) Int. Cl.
*H02J 50/20* (2016.01)
*H02J 50/10* (2016.01)

(52) U.S. Cl.
CPC ............ *H02J 50/20* (2016.02); *H02J 50/10* (2016.02)

(58) Field of Classification Search
CPC .......... H02J 50/20; H02J 50/10; H02J 50/001
See application file for complete search history.

(56) References Cited

U.S. PATENT DOCUMENTS

| 11,133,717 | B2* | 9/2021 | Reynolds | H02J 50/001 |
| 2008/0174410 | A1* | 7/2008 | Sarangapani | G06K 7/0008 340/572.1 |
| 2010/0044123 | A1* | 2/2010 | Perlman | H02J 50/90 180/2.1 |
| 2011/0130093 | A1* | 6/2011 | Walley | H02J 50/10 307/104 |
| 2015/0091706 | A1* | 4/2015 | Chemishkian | G06K 7/10158 340/10.34 |
| 2024/0146408 | A1* | 5/2024 | Herath | H04J 11/00 |

* cited by examiner

*Primary Examiner* — Rufus C Point
(74) *Attorney, Agent, or Firm* — Procopio, Cory, Hargreaves & Savitch LLP

(57) ABSTRACT

The apparatus may be a reader device configured to transmit a first signal at a first frequency for a backscattering from an energy harvesting (EH) device over a plurality of frequencies, to receive, from an EH device, a backscatter signal over a plurality of frequencies based on a transmitted signal at a first frequency. The apparatus may further be configured to obtain channel state information (CSI) based on the backscattering of the first signal and to transmit an energy signal for the EH device via at least one frequency based on the CSI based on the backscatter signal. In an aspect of the disclosure, the apparatus may be an EH device configured to receive a transmitted signal at a first frequency and backscatter the transmitted signal over a plurality of frequencies and receive, from the reader, an energy signal based on the backscatter signal.

28 Claims, 22 Drawing Sheets

FREQUENCY SPREADING BASED CHANNEL STATE INFORMATION ACQUISITION IN WIRELESS POWER TRANSFER

TECHNICAL FIELD

The present disclosure relates generally to communication systems, and more particularly, to wireless power transfer.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a reader device configured to receive, from an energy harvesting (EH) device, a backscatter signal over a plurality of frequencies based on a transmitted signal at a first frequency. The apparatus may further be configured to transmit an energy signal for the EH device via at least one frequency based on a channel state information (CSI) estimated based on the backscatter signal.

In an aspect of the disclosure, a method, a computer-readable medium, and an apparatus are provided. The apparatus may be an EH device configured to receive a transmitted signal at a first frequency and backscatter, for a CSI estimation at a reader, a backscatter signal over a plurality of frequencies based on the transmitted signal at the first frequency. The apparatus may further be configured to receive, from the reader, an energy signal based on the backscatter signal.

In an aspect of the disclosure, a method, a computer-readable medium, and an apparatus are provided. The apparatus may be a reader device configured to transmit a first signal at a first frequency for a backscattering from an energy harvesting device over a plurality of frequencies and to obtain CSI based on the backscattering of the first signal.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
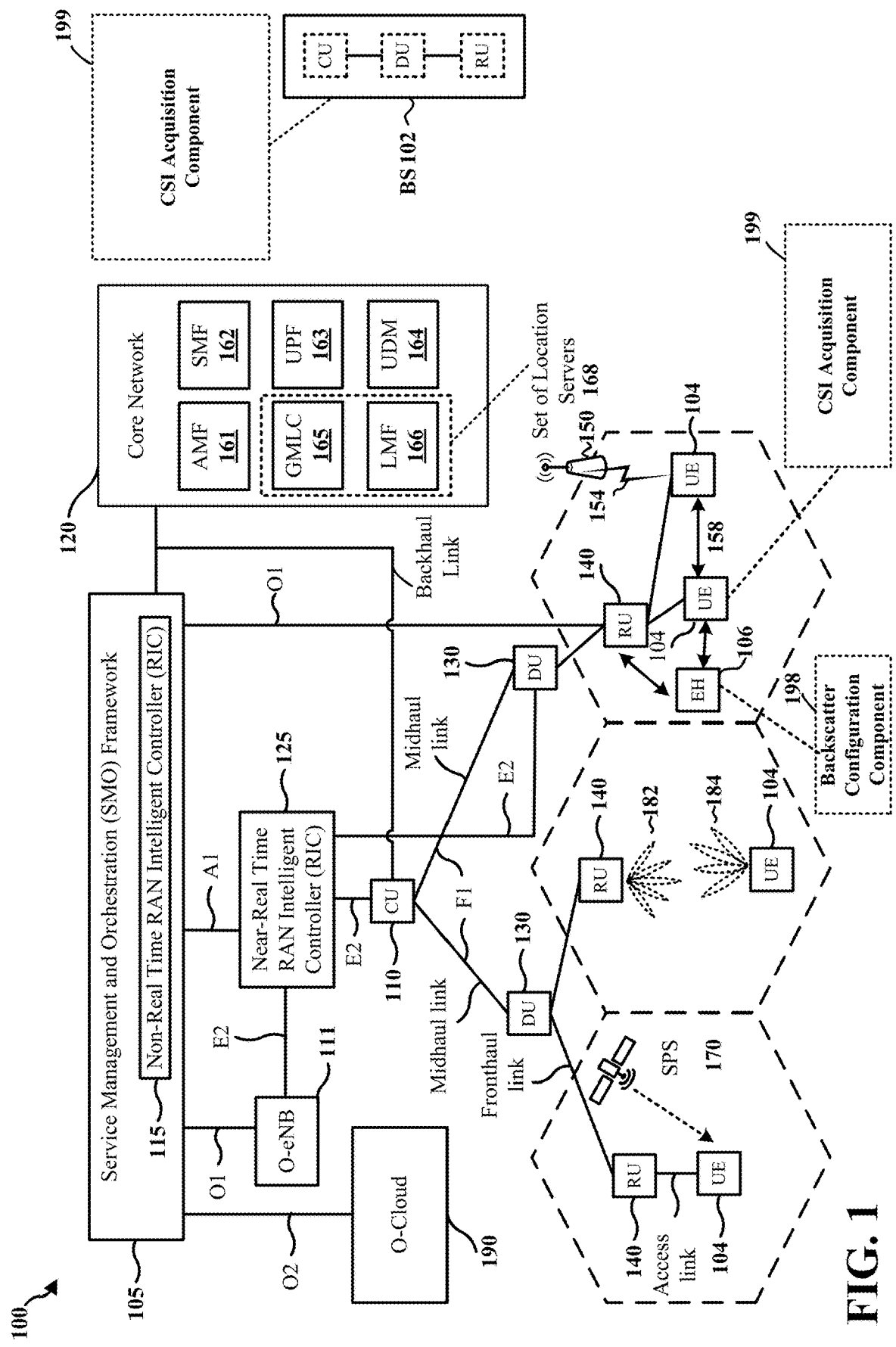
FIG. 1 is a diagram illustrating an example of a wireless communications system and an access network.

Radio frequency identifiers (RFID) is a rapidly growing technology impacting many industries due to its economic potential for inventory and/or asset management in a warehouse, IoT, sustainable sensor networks in factories and/or agriculture, and smart homes. In some aspects, an RFID device consists of small transponders, or tags, emitting an information-bearing signal upon receiving a signal. An RFID device may be operated, in some aspects, without battery at a low operational expenditure (OPEX), low maintenance cost, and long life-cycle. Passive RFID can harvest energy over the air and power the transmission/reception circuitry where the transmitted signal is typically backscatter modulated.

In some aspects, RFID for passive, or semi-passive, IoT devices is supported over a short-range (e.g., less than 10 meters) but not for longer ranges due to insufficient link budget issues (e.g., insufficient power received at the passive IoT device from an associated reader). Accordingly, the power link (or DL from the reader to the RF tag or RFID device) may be a bottleneck link. For example, power harvesting circuitry typically uses high input power (e.g., −13 dBm) while lower input power (e.g., at −20 dBm or below) may not ensure satisfactory cost and conversion efficiency, e.g., may convert less than 1% of the received energy. Reflections associated with multi-path transmission may also cause an energy signal to fade and further reduce the range for energy harvesting from a reader to a RFID tag or device.

To improve the efficiency and/or the range of the energy transfer, in some aspects, a reader may obtain knowledge of a channel state or channel estimation (e.g., associated with a CSI) of a channel between the reader and the RFID tag. The CSI, in some aspects, may be used, e.g., to select a frequency for an energy transfer signal or to perform a spatial beamforming, to improve the efficiency and/or the range by maximizing the amount of transmitted energy that is received by the RFID tag. In some aspects of wireless communication, e.g., 5G NR, CSI may generally be acquired either by transmitting the CSI-RS and receiving feedback from a device (e.g., a UE) associated with the channel or based on a transmitted SRS signal from the device. However, for a (semi-passive) RFID tag, in some aspects, measuring the CSI based on the CSI-RS or the SRS may be too energy-intensive. Accordingly, energy at the RFID tag (or semi-passive IoT device) may be conserved by moving the channel estimation and/or measurement to the reader.

Some aspects of the disclosure provide a method and apparatus for obtaining a CSI (e.g., performing a channel estimation and/or measurement) for a channel associated with an energy transfer signal from a reader to an RFID tag through frequency spreading and shifting at the RFID tag. For example, a first reader may transmit a continuous wave signal at a first frequency in a first frequency band (or sub-band) that is backscattered by an RFID tag with a frequency shift and spread (such that the first frequency, or the first frequency band, is not included in, or overlapping with, a frequency range of the backscattered signal) and received by one of the first reader or a second reader associated with the first reader for channel estimation. While the term 'backscatter signal' may be used interchangeably with 'backscattered signal,' in this disclosure, the term 'backscattered signal' may be used to refer to the result of a backscattering operation at the backscattering device (e.g., before propagation to a reader device) while a backscatter signal may refer to a received (or propagating) signal based on the 'backscattered signal.' After receiving one or more backscatter signals based on one or more backscattered signals, the reader receiving the one or more backscatter signals (e.g., the first reader in a monostatic scenario or the second reader in a bistatic scenario), in some aspects, may determine a frequency (and spatial-beamforming) to use for an energy transfer signal and transmit energy via the selected frequency (and spatial-beamforming) to provide improved energy transfer efficiency.

The method and apparatus, in some aspects, of the disclosure may avoid problems associated with measuring a backscatter signal based on a backscattered signal at a same frequency as a CSI-RS. For example, if a CSI-RS transmission and measurement are both at the reader side, what the reader measures may be a combination of a forward channel (the channel from the reader to the RFID tag, $h_f$) and a reverse channel (the channel from the RFID tag to the reader, assumed to be the same as the forward channel, $h_f$). If there is little, or no, frequency shift introduced by the backscattering from the RFID tag, and the same antenna is used to transmit the CSI-RS and to receive the backscatter signal (to justify the assumption that the forward and reverse channels are the same channel), the measured channel may be assumed to be, or to approximate, $h_f^2$. From the measurement of $h_f^2$, a frequency with a peak gain in the channel may be identified. However, there may be interference from the transmitted CSI-RS when measuring the backscatter signal or a frequency shift introduced by the backscattering from the RFID tag that causes the measured channel to no longer be a reliable representation of $h_f^2$. Accordingly, in some aspects, measuring the combined channel may make it hard to identify which frequency has the best gain in a particular frequency selective channel (e.g., the forward channel used to transmit the energy transfer signal) to maximize the energy received at the RFID tag from the reader.

Various aspects relate generally to energy harvesting. Some aspects more specifically relate to identifying optimized parameters (e.g., related to frequency and beamforming) for wireless energy transmission (WET), wireless power transmission (WPT), and/or wireless information transmission (WIT). The disclosure provides for channel estimation without additional undue energy expenditures at a EH device associated with the channel estimation and for improved energy transfer using optimized WET and/or WPT parameters.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

In some aspects, wireless signals may be provided to one or more energy harvesting devices. FIG. 1 illustrates an example energy harvesting device 106. The energy harvesting device 106 may have a backscatter configuration component 198 that may be configured to receive a transmitted signal at a first frequency and backscatter, for a CSI estimation at a reader, a backscatter signal over a plurality of frequencies based on the transmitted signal at the first frequency. The backscatter configuration component 198 may further be configured to receive, from the reader, an energy signal based on the backscatter signal. In certain aspects, a reader such as the base station 102 or the UE 104 may have a CSI acquisition component 199 that may be configured to receive, from an EH device, a backscatter signal over a plurality of frequencies based on a transmitted signal at a first frequency. The CSI acquisition component 199 may also be configured to transmit an energy signal for the EH device via at least one frequency based on a CSI estimated based on the backscatter signal. The CSI acquisition component 199 may be configured to transmit a first signal at a first frequency for a backscattering from an energy harvesting device over a plurality of frequencies. The CSI acquisition component 199 may also be configured to obtain CSI based on the backscattering of the first signal. Although the following description may be focused on energy harvesting at passive or semi-passive IoT devices, the concepts described herein may be applicable to other types of EH nodes or devices, such as active IoT devices or EH-capable UEs to reduce power usage at the EH nodes or device. Although the following description may be focused on 5G NR, the concepts described herein may be applicable to other similar areas, such as LTE, LTE-A, CDMA, GSM, and other wireless technologies.

Figure 2:
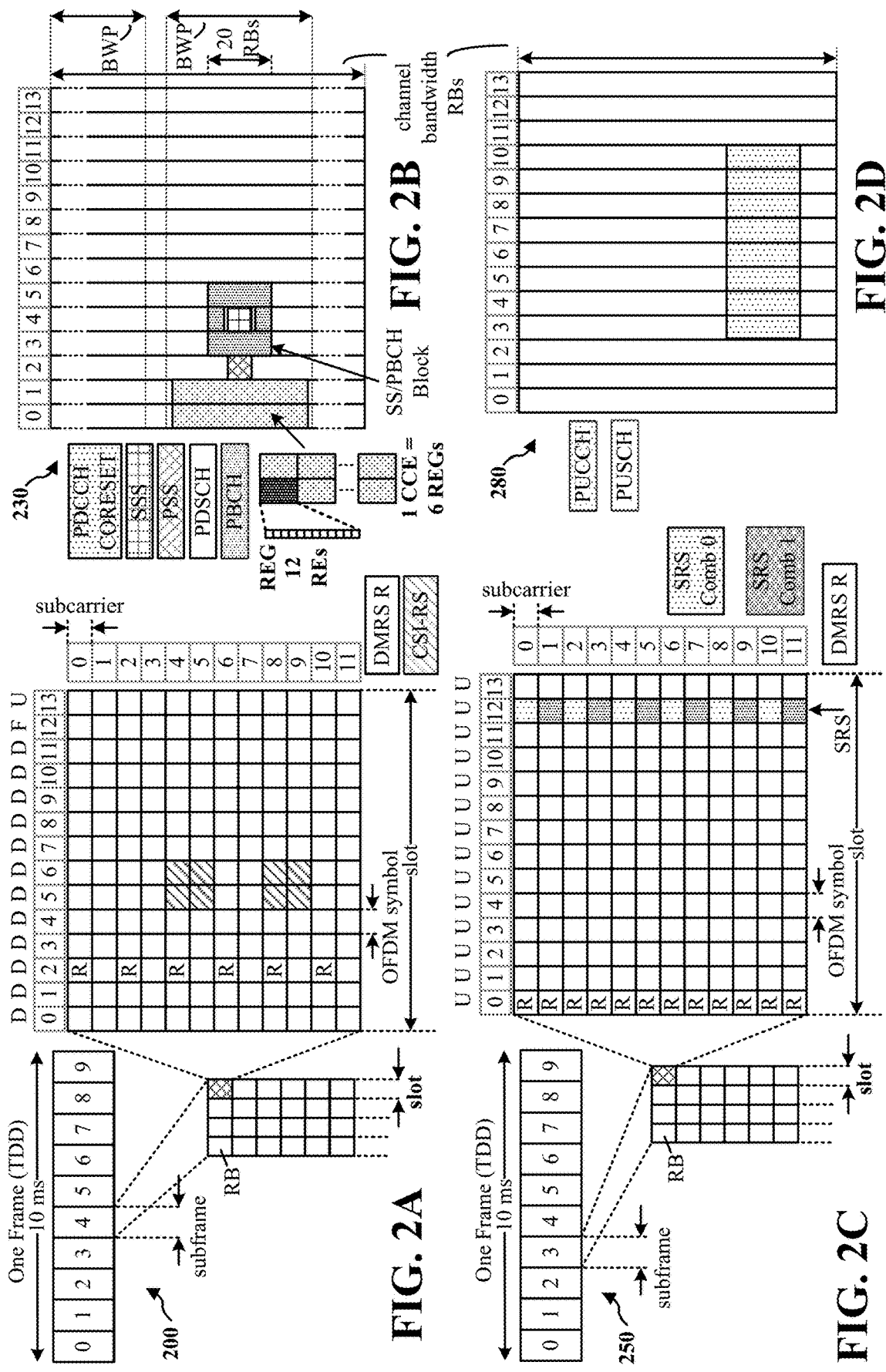
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
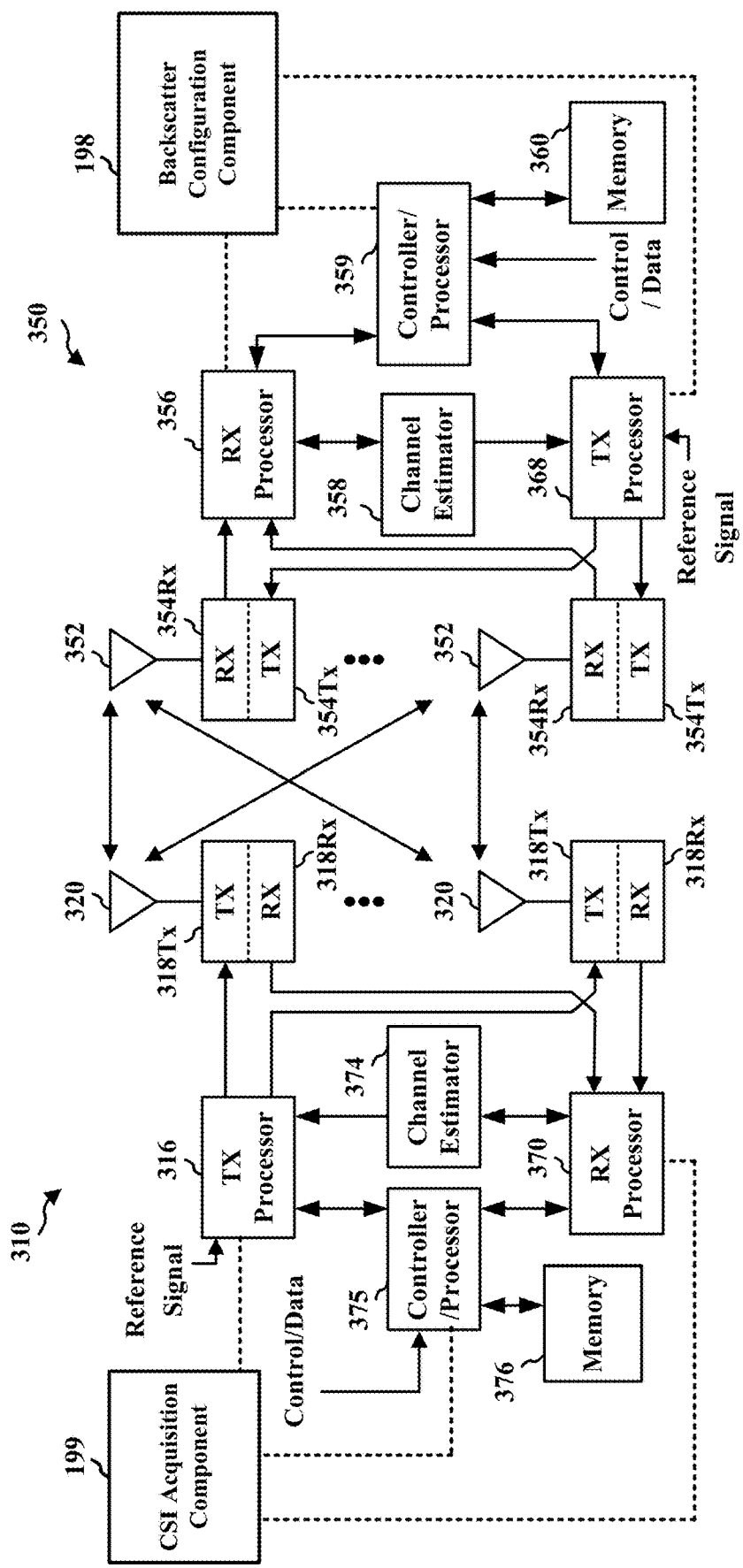
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the backscatter configuration component 198 of FIG. 1.

At least one of the TX processor 316, the RX processor 370, and the controller/processor 375 may be configured to perform aspects in connection with the CSI acquisition component 199 of FIG. 1.

Figure 4:
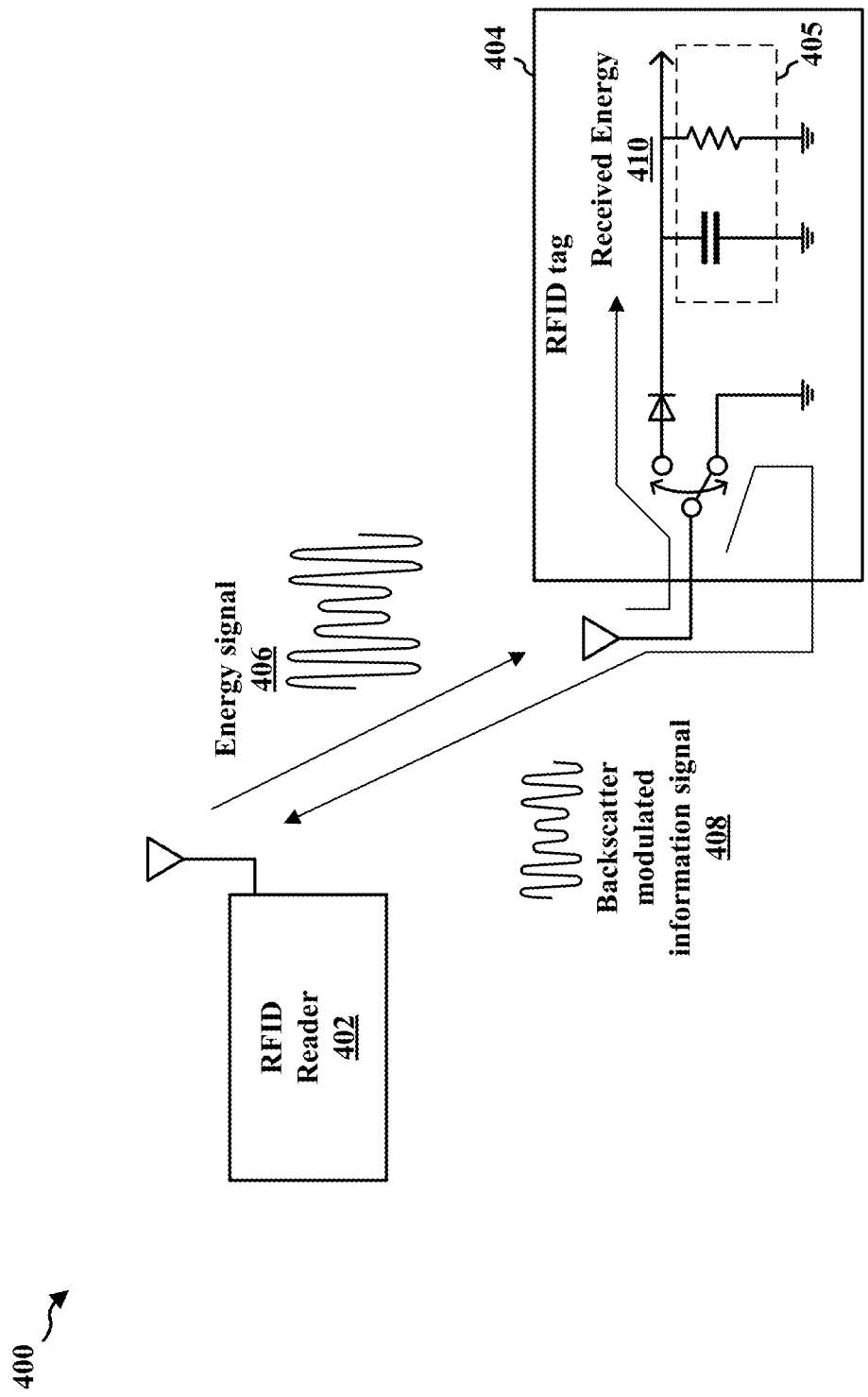
FIG. 4 illustrates a diagram of an RFID tag that receives an energy transfer signal from an RFID reader.

FIG. 4 illustrates a diagram 400 of an RFID tag 404 that receives an energy transfer signal 406 from an RFID reader 402. Such an RFID tag 404 is one example of an energy receiver that may obtain energy from an energy transfer signal (or an energy signal) from an energy transmitter (e.g., the RFID reader 402). The RFID tag 404, in some aspects, may also be described as, or comprise, an RFID device, an RF integrated circuit (RFIC), an RFID chip, a backscatter device, or an IoT device. An energy transfer signal 406 may be used for various industrial IoT (IIoT) applications. For example, RFID technology may be used for inventory/asset management both inside and outside of warehouses, network sensors in factories, logistics devices, manufacturing settings, agricultural applications, smart homes, or other applications. RFID technology may also be deployed in association with cellular infrastructure for wireless applications. RFID devices may include a transponder (e.g., the RFID tag 404) that emits an information-bearing signal, such as a backscattered modulated information signal 408, upon receiving a signal from the RFID reader 402. That is, the RFID reader 402 may transmit the energy transfer signal 406 as well as an information signal to a passive RFID microchip (e.g., RFID tag 404) that operates without a battery source.

The RFID tag 404 may be configured to operate without the battery source at a low OPEX, low maintenance cost, and/or increased lifecycle. Other types of RFID tags may include battery sources. For example, semi-passive RFID devices and active RFID devices may have a battery source, but may also be associated with a higher cost. If the RFID reader 402 is able to provide enough received energy 410 to the RFID tag 404, the RFID tag 404 may harvest the received energy 410 to perform an operation during communication occasions or may harvest the received energy 410 to charge an associated battery. Passive RFID tags may harvest the received energy 410 over-the-air in order to power Tx/Rx circuitry at the RFID tag 404. The energy transfer signal 406 transmitted to the RFID tag 404 may trigger the backscattered modulated information signal 408 from the RFID tag 404. The RFID tag 404 may absorb or reflect signals from the RFID reader 402 based on the information to be communicated between the RFID tag 404 and the RFID reader 402. The RFID tag 404 may include a decreased number of active RF components (e.g., no active RF component) in some cases. By increasing a coverage area of the energy transfer signal 406, the RFID reader 402 and the RFID tag 404 may communicate at longer physical distances.

Wireless communication techniques associated with eMBB, URLLC, machine-type communication (MTC), etc., may be supported for passive IoT devices. Passive IoT devices are another example of an energy receiving device, such as energy receiving device 405 in FIG. 4. In examples, the RFID reader 402 may correspond to a base station or an entity at a base station, and the RFID tag 404 may correspond to a UE or be in communication with the UE. However, some wireless communication techniques may not support certain types of widespread RFID technology, such as passive IoT devices used for asset management, logistics, warehousing, and manufacturing, etc. Among other examples, passive IoT devices may include timing devices such as clocks, video devices, household tools, construction tools, lighting systems, etc.

In some aspects, the wireless communication techniques may support WET, WPT and/or WIT to incorporate passive IoT devices into wireless networks. Using a cellular infrastructure, a base station/network entity may operate as the RFID reader 402 that transmits the energy transfer signal 406 to the RFID tag 404 for communicating with the passive IoT devices via RFID technology. The base station/network entity may provide energy to the passive IoT devices via the energy transfer signal 406 and may be configured to read/write information stored at the passive IoT devices. Information-bearing signals may be reflected from the passive IoT devices to the base station/network entity, which may read the reflected signal. For instance, the base station/network entity may decode information included in the information-bearing signals (e.g., backscattered modulated information signal 408) received from the passive IoT devices (e.g., RFID tag 404).

Figure 5:
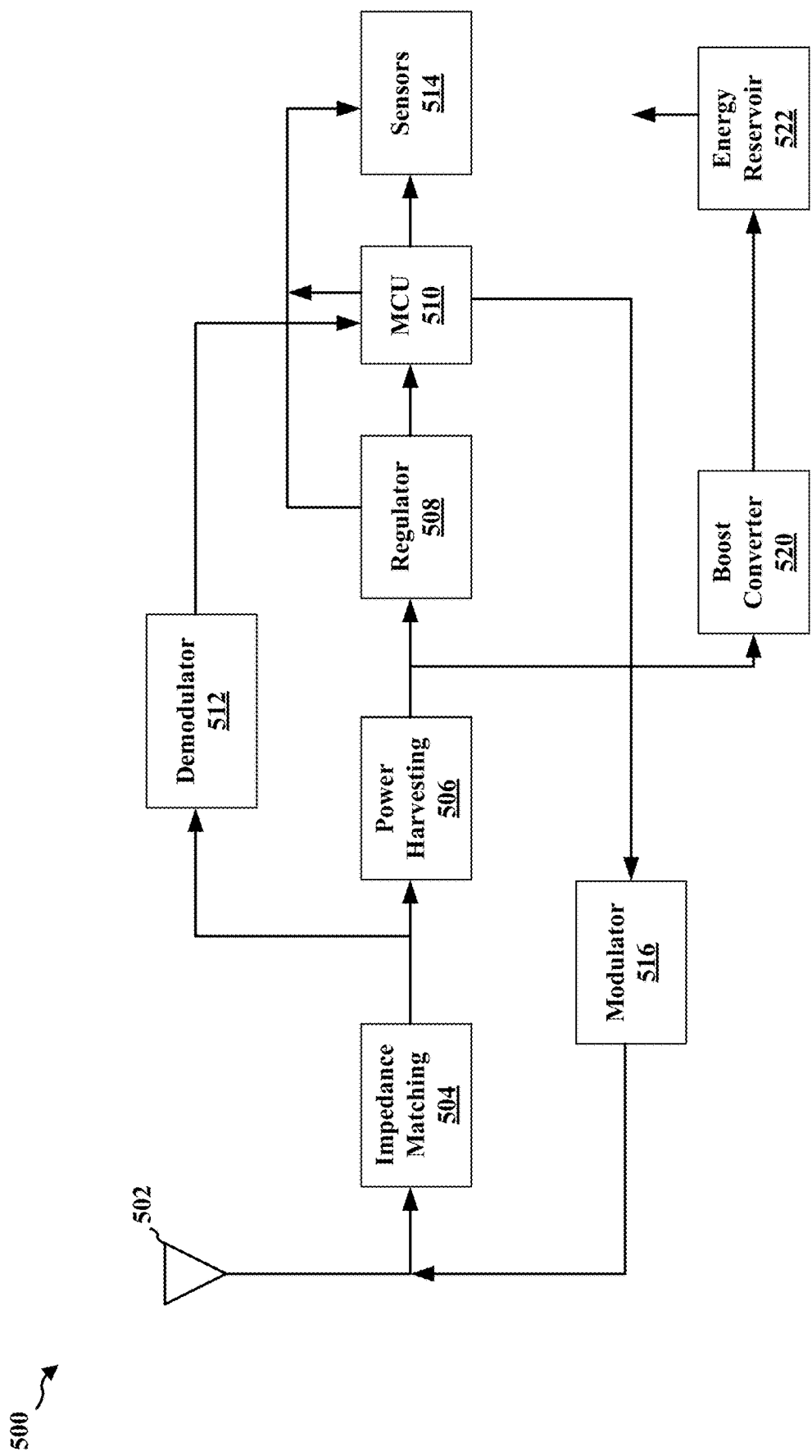
FIG. 5 is a diagram of a power harvesting circuit.

FIG. 5 is a diagram of a power harvesting circuit 500. In examples, the power harvesting circuit may be included at an RFID tag and may include few or no active components. The power harvesting circuit may be configured to operate at low power during an energy transfer procedure for RF power harvesting. The energy transfer signal may be received by an antenna 502 and communicated to an impedance matching component 504. The impedance matching component 504 may be tuned to an impedance of the antenna 502, so that an input to a power harvesting component 506 may be based on an increased power from the impedance matching component. An output of the impedance matching component 504 may also be demodulated by a demodulator 512 and provided to a microcontroller unit (MCU) 510.

A non-linearity of the power harvesting component 506 may be generated at an output of the power harvesting component 506 based on characteristics of a diode associated with the power harvesting component 506. For instance, the power harvesting component 506 may include a diode that has to receive a minimum voltage/power from the antenna 502 and impedance matching component 504 in order to activate the diode. The minimum voltage/power that is input to the power harvesting component 506 to activate the diode may be larger than a power associated with an information signal. For example, the input power to the power harvesting component 506 may be larger than −20 dBm, although −10 dBM may be a minimum power to activate the diode/power harvesting component 506 in some cases. The power harvesting component 506 may be more efficient at lower frequencies at converting the energy transfer signal to power based on a capacitance and/or a resistance of the diode at the power harvesting component 506. In contrast to energy transfer signals, bits of an information signal may be decoded at power inputs as low as −100 dBm to −80 dBm.

A regulator 508 may receive an output of the power harvesting component 506. The regulator 508 may regulate the non-linearity of the power harvesting component 506 prior to providing the output of the power harvesting component 506 to the MCU 510. The MCU 510 may be configured to control sensors 514 in communication with the MCU 510 based on the harvested power and/or output a signal to a modulator 516 that modulates the output signal as feedback for antenna 502 and/or the impedance matching component 504.

The power harvesting circuit 500 may include a boost converter 520 to receive the output of the power harvesting component 506. The boost converter may step up (or boost) the voltage of the output of the power harvesting component. The output of the boost converter 520 with the boosted voltage may be supplied to an energy reservoir 522. The energy reservoir 522 may receive the boosted voltage and store the energy harvested by the power harvesting component 506. The energy reservoir 522 may provide the stored power to other components that may need to turn on without the output of the power harvesting component 506. For example, the power harvesting circuit may determine that the energy signal received from the energy transmitter fails to meet a threshold value. If the energy density of the receive energy signal is lower than a turn-on voltage, the energy receiver may use the power stored in the energy reservoir to transmit an indication to the energy transmitter that the energy signal received from the energy transmitter failed to meet the threshold value.

In some aspects, the passive IoT devices may be incorporated into the wireless networks, and ambient RF signal may not provide sufficient power density to send the energy signal having the power density greater than or equal to a threshold value to activate (or turn on) the power harvesting circuit. In one example, the power density of the ambient RF signals (e.g., digital television signal (DTV), global system for mobile communication (GSM), 3G, or WiFi) may be lower than 10 nW/cm$^2$ Here, the power level may vary over time and depends on the locations.

The wireless communication techniques may support WET and/or WIT to incorporate passive IoT devices into wireless networks. In some aspects, a dedicated frequency bands may be configured for wireless energy transmission to passive IoT applications. The frequency band associated with the WET may be reserved for at least one of the WET, the WIT or the WET+WIT. The dedicated frequency band may provide the energy coverage for the pervasive, or perpetual wireless-powered IoT devices.

Figure 6:
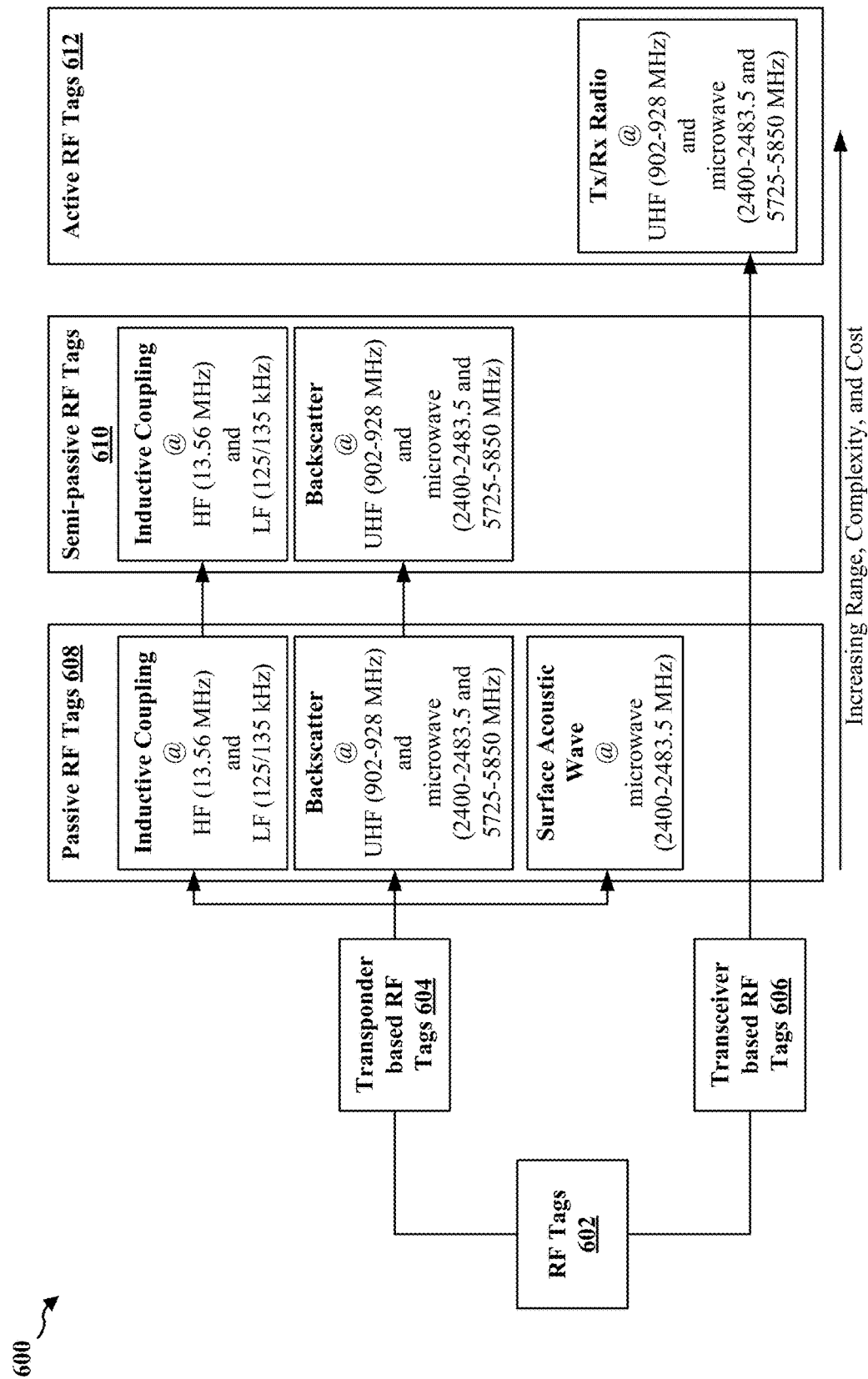
FIG. 6 is a diagram illustrating example aspects of RF tags.

FIG. 6 is a diagram 600 illustrating example aspects of RF tags 602. The RF tags 602 may be categorized into transponder based RF tags 604 and transceiver based RF tags 606. The transponder based RF tags 604 may include transponders. A transponder may refer to communication hardware that includes passive RF components (i.e., without consuming power for transmitting a communication signal); however, power may be consumed for controlling the communication hardware for transmitting different types of signals. In an example, a transponder may be a back-scatter based transponder in which power is consumed for controlling transmission of zero bits and one bits while actual transmission does not consume power. The transceiver based RF tags 606 may include transceivers. A transceiver may refer to communication hardware that includes active RF components that consume power for transmitting communication signals. The transponder based RF tags 604 may include passive RF tags 608 and semi-passive RF tags 610. The passive RF tags 608 may include RF tags that include an integrated circuit (IC), an antenna, and a transponder. The passive RF tags 608 may not include a battery. The passive RF tags 608 may be powered by inductive coupling, backscatter radio, and/or a surface acoustic wave. Inductive coupling may refer to a scenario in which a transmitter and a receiver are coupled through a magnetic field, where a transmitter generated magnetic field flows into the receiver. The transmitter and the receiver may be sensitive to distance and orientation. In an example, a RF tag that is powered by inductive coupling may communicate at a high frequency (HF) range of around 13.56 MHz and at a low frequency (LF) range of 125 or 135 kHz. Backscatter radio may refer to a communication device that may be controlled to reflect/backscatter signals with different amplitude, phase, and frequency. In an example, an RF tag that is powered by backscatter radio may communicate at an ultra-high frequency (UHF) of around 902-928 MHz and at microwave frequencies, such as 2400-2483.5 MHz and 5725-5850 MHz. A device powered by surface acoustic wave may convert an electric magnetic wave into an acoustic wave which propagates in a surface. In an example, an RF tag that is powered by a surface acoustic wave may communicate at a microwave frequency, such as 2400-2483.5 MHz.

The semi-passive RF tags 610 may include RF tags that include an IC, an antenna, and energy storage (e.g., a batteries, rechargeable batteries, super capacitors, etc.). The battery may increase communications reliability and may increase a sensitivity of power harvesting circuitry while increasing costs. The semi-passive RF tags 610 may be powered by inductive coupling and/or backscatter radio (described above). The semi-passive RF tags 610 may store energy/power obtained via the inductive coupling and/or the backscatter radio in the energy storage.

The transceiver based RF tags 606 may include active RF tags 612. The active RF tags 612 may include RF tags that include an integrated circuit, an antenna, a battery, and an on-board transmitter. The battery may increase communications reliability and may increase a sensitivity of power harvesting circuitry while increasing costs. In an example, the on-board transmitter may be a transceiver. The active RF tags 612 may communicate via a Tx/Rx radio at UHFs (e.g., 902-928 MHz) and/or at microwave frequencies (e.g., 2400-2483.5 and 5725-5850 MHz).

In general, the passive RF tags 608 may be associated with a lower range, a lower complexity, and a lower cost compared to the semi-passive RF tags 610. In general, the semi-passive RF tags 610 may be associated with a lower range, a lower complexity, and a lower cost compared to the active RF tags 612.

In some aspects, RFID for passive, or semi-passive, IoT devices is supported over a short-range (e.g., less than 10 meters) but not for longer ranges due to insufficient link budget issues (e.g., insufficient power received at the passive IoT device from an associated reader). Accordingly, the power link (or DL from the reader to the RF tag or RFID device) may be a bottleneck link. For example, power harvesting circuitry (e.g., energy receiving device 405) typically uses high input power (e.g., −13 dBm) while lower input power (e.g., at −20 dBm or below) may not ensure satisfactory cost and conversion efficiency, e.g., may convert less than 1% of the received energy. Reflections associated with multi-path transmission may also cause an energy signal to fade and further reduce the range for energy harvesting from a reader to a RFID tag or device.

To improve the efficiency and/or the range of the energy transfer, in some aspects, a reader may obtain knowledge of a channel state or channel estimation (e.g., associated with a CSI of a channel between the reader and the RFID tag. The CSI, in some aspects, may be used, e.g., to select a frequency for an energy transfer signal or to perform a spatial beamforming, to improve the efficiency and/or the range by maximizing the amount of transmitted energy that is received by the RFID tag. In some aspects of wireless communication, e.g., 5G NR, CSI may generally be acquired either by transmitting the CSI-RS and receiving feedback from a device (e.g., a UE) associated with the channel or based on a transmitted SRS signal from the device. However, for a (semi-passive) RFID tag, in some aspects, measuring the CSI based on the CSI-RS or the SRS may be energy-intensive. Accordingly, energy at the RFID tag (or semi-passive IoT device) may be conserved by moving the channel estimation and/or measurement to the reader.

If the CSI-RS transmission and measurement are both at the reader side, what the reader measures may be a combination of a forward channel (the channel from the reader to the RFID tag, $h_f$) and a reverse channel (the channel from the RFID tag to the reader, assumed to be the same as the forward channel, $h_f$). If there is little, or no, frequency shift introduced by the backscattering from the RFID tag, and the same antenna is used to transmit the CSI-RS and to receive the backscatter signal (to justify the assumption that the forward and reverse channels are the same channel), the measured channel may be assumed to be, or to approximate, $h_f^2$. From the measurement of $h_f^2$, a frequency with a peak gain in the channel may be identified. However, there may be interference from the transmitted CSI-RS when measuring the backscatter signal or a frequency shift introduced by the backscattering from the RFID tag that causes the measured channel to no longer be a reliable representation of $h_f^2$. Accordingly, in some aspects, measuring the combined channel may make it hard to identify which frequency has the best gain in a particular frequency selective channel (e.g., the forward channel used to transmit the energy transfer signal) to maximize the energy received at the RFID tag from the reader.

Some aspects of the disclosure provide a method and apparatus for obtaining a CSI (e.g., performing a channel estimation and/or measurement) for a channel associated with an energy transfer signal from a reader to a RFID tag through frequency spreading and shifting at the RFID tag. For example, a first reader may transmit a continuous wave signal at a first frequency in a first frequency band (or sub-band) that is backscattered by an RFID tag with a frequency shift and spread (such that the first frequency, or the first frequency band, is not included in, or overlapping with, a frequency range of the backscattered signal) and received by one of the first reader or a second reader associated with the first reader for channel estimation. After receiving one or more backscatter signals based on one or more backscattered signals, the reader receiving the one or more backscatter signals (e.g., the first reader in a monostatic scenario or the second reader in a bistatic scenario), in some aspects, may determine a frequency to use for an energy transfer signal and transmit energy via the selected frequency. The method and apparatus, in some aspects, of the disclosure may avoid the problems described above for measuring a backscatter signal based on a backscattered signal at a same frequency as a CSI-RS. Additionally, the method and apparatus of the disclosure may provide, based on the channel estimation and/or the determination of the parameters (e.g., a pre-coding matrix) for beamforming, a more efficient energy transfer signal/operation. In some aspects, the method and apparatus may be associated with a reader that has both transmit and receive functionalities (e.g., TDD and/or FDD TX and RX). The transmission and reception functionalities of the reader (e.g., associated with multiple antennas and/or transceivers of the reader), in some aspects, may be calibrated as for TDD and/or FDD TX/RX.

Figure 7:
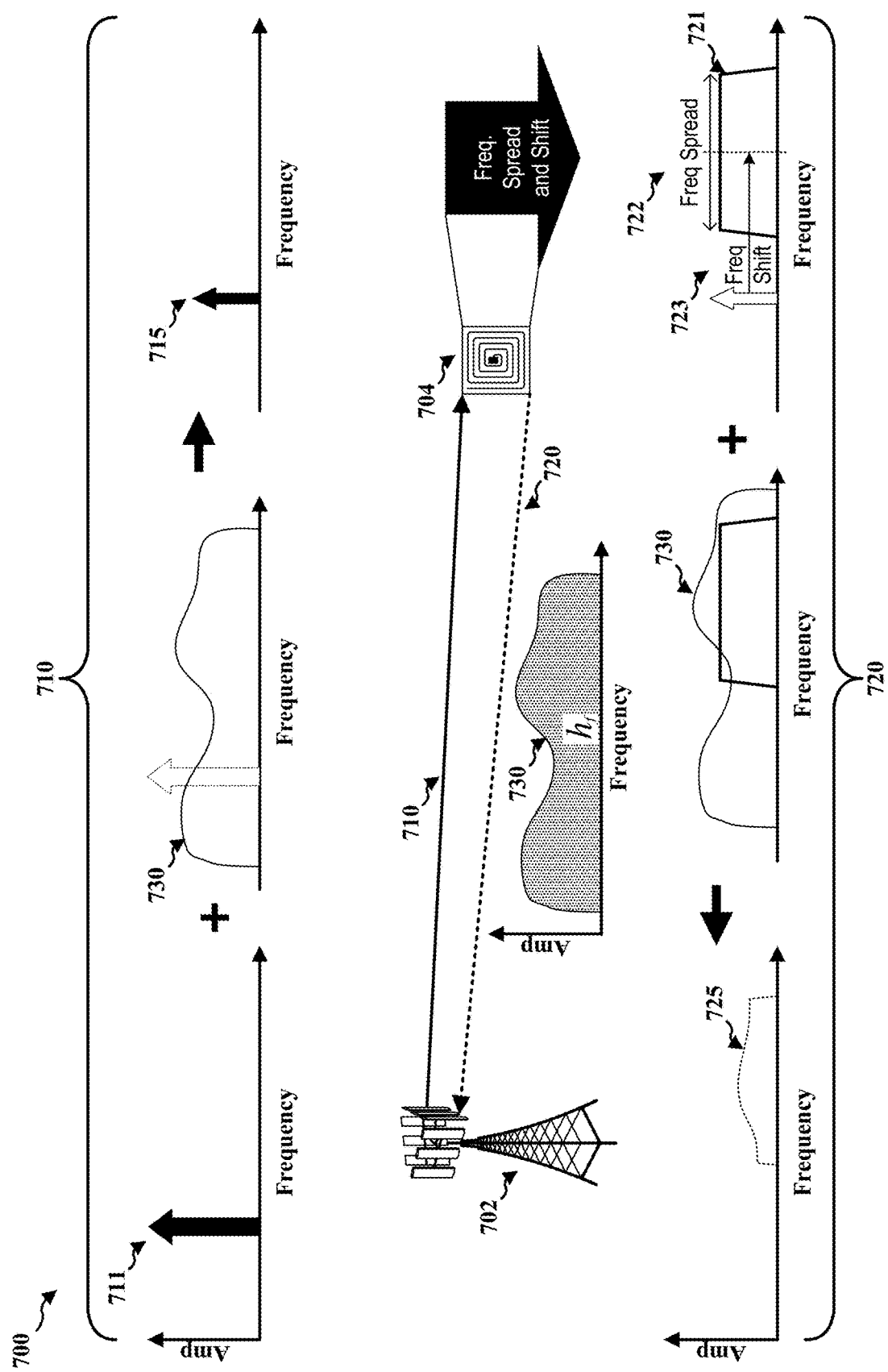
FIG. 7 is a diagram illustrating a monostatic scenario for channel estimation for a channel between a reader and an energy harvesting device in accordance with some aspects of the disclosure.

FIG. 7 is a diagram 700 illustrating a monostatic scenario for channel estimation for a channel between a reader 702 and an EH device 704 in accordance with some aspects of the disclosure. The EH device 704 may be, or may be a component of, a passive/semi-passive IoT device, an RFID tag, an RFID device, a UE, or other device. In some aspects, the reader 702, in some aspects, may be a base station, a UE, or other device that provides a source of energy for one or more energy harvesting devices including the EH device 704.

Diagram 700 illustrates that the reader 702 may transmit a first transmission 710 for backscattering from the EH device 704 as a backscatter signal 720. The reader 702, in some aspects, may transmit a continuous wave (CW) signal at a first frequency, e.g., transmission 711. The CW signal may propagate through the channel 730 associated with a function, $h_f(\omega)$, indicating a channel gain as a function of a frequency, $\omega$. For example, for a single-frequency signal, such as the CW signal at a first frequency, $\omega_1$, the channel gain is effectively a scalar. Accordingly, the signal received at the EH device 704 may be the CW with a reduced amplitude/power, e.g., received transmission 715.

The EH device 704, in some aspects, may be configured to backscatter the received transmission 715 over a plurality of frequencies based on a frequency spread 722 and a frequency shift 723. The frequency spread 722, in some aspects, may be associated with one or more of an m-sequence, a pseudo-noise (PN) sequence, a Zadoff-Chu (ZC) sequence, or other known or configured sequence. The frequency spread 722 and the frequency shift 723, in some aspects, may be configurable, e.g., by the reader 702, or may be known (e.g., pre-configured or previously configured) at the EH device 704 based on a frequency of the received transmission 715 and/or a sub-band associated with the received transmission. For example, in an aspect defining two sub-bands of a frequency band associated with energy harvesting/transfer, the EH device 704 may be configured to shift a received transmission (e.g., received transmission 715) associated with a first (or a second) sub-band to the center of the second (or the first) sub-band and to spread the signal over the second (or first) sub-band (respectively). Alternatively, the reader 702 may have previously communicated a set of frequency shifts and spreads for a corresponding set of CW signals for a CSI measurement operation.

The backscattered signal 721, in some aspects, at the EH device 704 may propagate through the channel 730 associated with the function, $h_f(\omega)$. In some aspects, the backscattered signal 721 may be effectively flat (e.g., evenly distributed among a plurality of frequencies) as illustrated, or may have a known and/or detectable distribution of energy/power over the plurality of frequencies. Because the backscattered signal 721 includes a plurality of frequencies (based on the frequency spread 722), the backscatter signal 725 received at the reader 702 may not be flat based on the frequency-dependence of the gain (e.g., $h_f(\omega)$). Based on the known and/or detectable distribution of energy/power over the plurality of frequencies associated with the frequency spread 722, the reader 702 may determine $h_f(\omega)$ for the plurality of frequencies. The process may be performed multiple times to determine the $h_f(\omega)$ for the full frequency band associated with the energy harvesting/transfer.

As illustrated in diagram 700, reader 702, in some aspects, may include multiple antennas and may receive the backscatter signal 725 via multiple antennas. A channel estimation and/or measurement may be made (e.g., a CSI may be obtained) for a channel associated with each antenna. The multiple CSIs may then be used to determine, or optimize, a spatial beamforming operation associated with a subsequent energy transfer signal.

Figure 8:
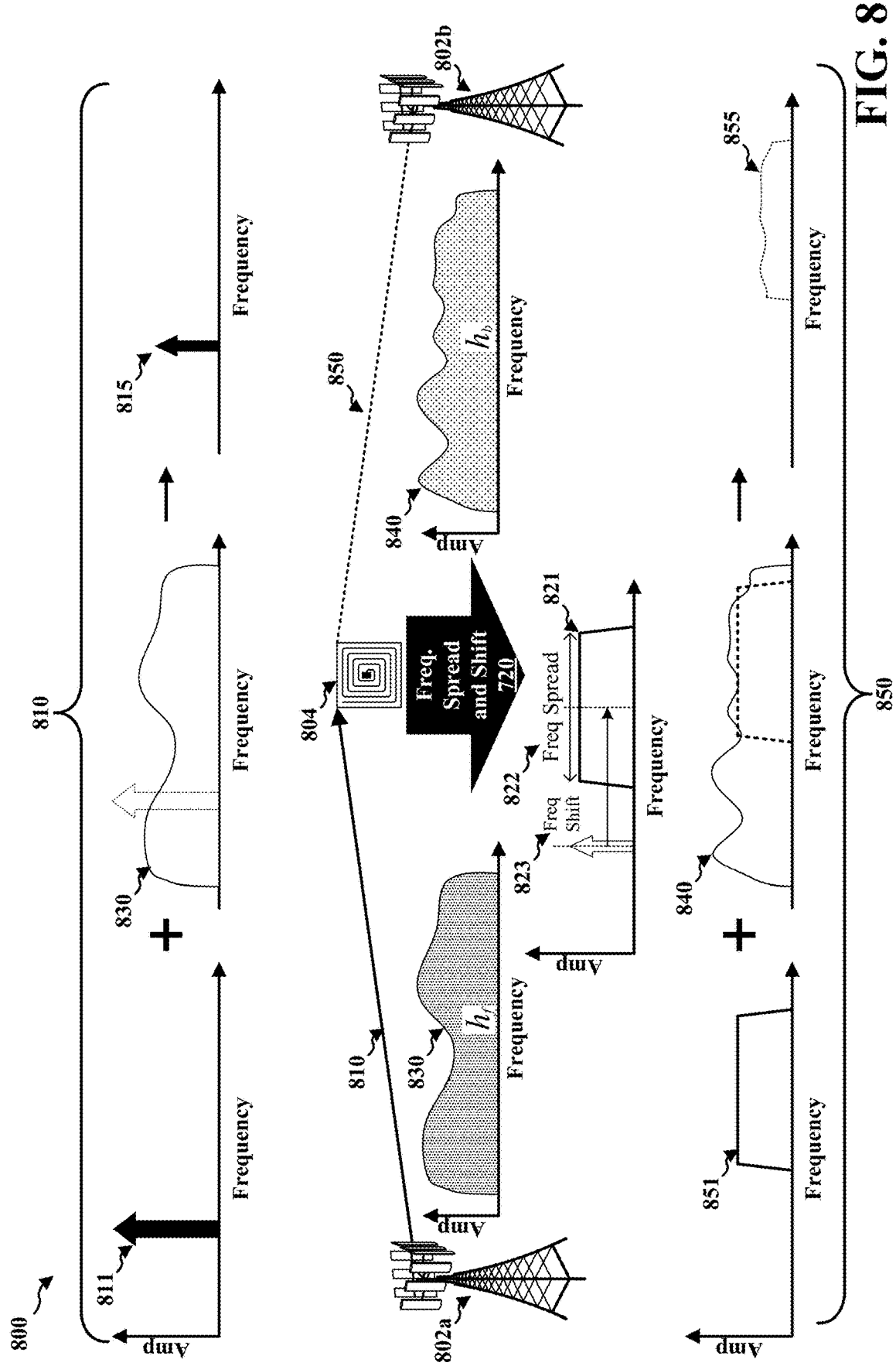
FIG. 8 is a diagram illustrating a bistatic scenario using a transmission from a first reader for channel estimation for a channel between a second reader and an energy harvesting device using a second reader in accordance with some aspects of the disclosure.

FIG. 8 is a diagram 800 illustrating a bistatic scenario using a transmission from a first reader 802a for channel estimation for a channel between a second reader 802b and an EH device 804 using a second reader 802b in accordance with some aspects of the disclosure. The EH device 804 may be, or may be a component of, a passive/semi-passive IoT device, an RFID tag, an RFID device, a UE, or other device. In some aspects, the first reader 802a and the second reader 802b, in some aspects, may be a base station or other source of energy for one or more energy harvesting devices including the EH device 804.

Diagram 800 illustrates that the first reader 802a may transmit a first transmission 810 for backscattering from the EH device 804 as a backscatter signal 850. First reader 802a, in some aspects, may transmit a continuous wave (CW) signal at a first frequency, e.g., transmission 811. The CW signal may propagate through the channel 830 associated with a function, $h_f(\omega)$, indicating a channel gain as a function of a frequency, $\omega$. For example, for a single-frequency signal, such as the CW signal at a first frequency, $\omega_1$, the channel gain is effectively a scalar. Accordingly, the signal received at the EH device 804 may be the CW with a reduced amplitude/power, e.g., received transmission 815.

The EH device 804, in some aspects, may be configured to backscatter the received transmission 815 over a plurality of frequencies based on a frequency spread 822 and a frequency shift 823. The frequency spread 822 and the frequency shift 823, in some aspects, may be configurable, e.g., by the first reader 802a and/or the second reader 802b, or may be known (e.g., pre-configured or previously configured) at the EH device 804 based on a frequency of the received transmission 815 and/or a sub-band associated with the received transmission. For example, in an aspect defining two sub-bands of a frequency band associated with energy harvesting/transfer, the EH device 804 may be configured to shift a received transmission (e.g., received transmission 815) associated with a first (or a second) sub-band to the center of the second (or the first) sub-band and to spread the signal over the second (or first) sub-band (respectively). Alternatively, the first reader 802a and/or the second reader 802b may have previously communicated a set of frequency shifts and spreads for a corresponding set of CW signals for a CSI measurement operation.

The backscattered signal 851 (corresponding to backscattered signal 721), in some aspects, at the EH device 804 may propagate through the channel 840 associated with a function, $h_b(\omega)$, indicating a channel gain as a function of a frequency, $\omega$, for the channel between the EH device 804 and the second reader 802b. In some aspects, the backscattered signal 851 may be effectively flat (e.g., evenly distributed among a plurality of frequencies) as illustrated, or may have a known and/or detectable distribution of energy/power over the plurality of frequencies. Because the backscattered signal 851 includes a plurality of frequencies (based on the frequency spread 822), the backscatter signal 855 received at the second reader 802b may not be flat based on the frequency-dependence of the gain (e.g., $h_b(\omega)$). Based on the known and/or detectable distribution of energy/power over the plurality of frequencies associated with the frequency spread 822, the second reader 802b may determine $h_b(\omega)$ for the plurality of frequencies. The process may be performed multiple times to determine the $h_b(\omega)$ for the full frequency band associated with the energy harvesting/transfer from the second reader 802b to the EH device 804.

As illustrated in diagram 800, the second reader 802b, in some aspects, may include multiple antennas and may receive the backscatter signal 855 via multiple antennas. A channel estimation and/or measurement may be made (e.g., a CSI may be obtained) for a channel associated with each antenna. The multiple CSIs may then be used to determine, or optimize, a spatial beamforming operation associated with a subsequent energy transfer signal. Although not illustrated in diagram 800, the first reader 802a and the second reader 802b may communicate with each other to allow for coordination of the transmitted signals, the configuration of the backscattering performed at the EH device 804, and the measurements performed at the second reader 802b.

Figure 9:
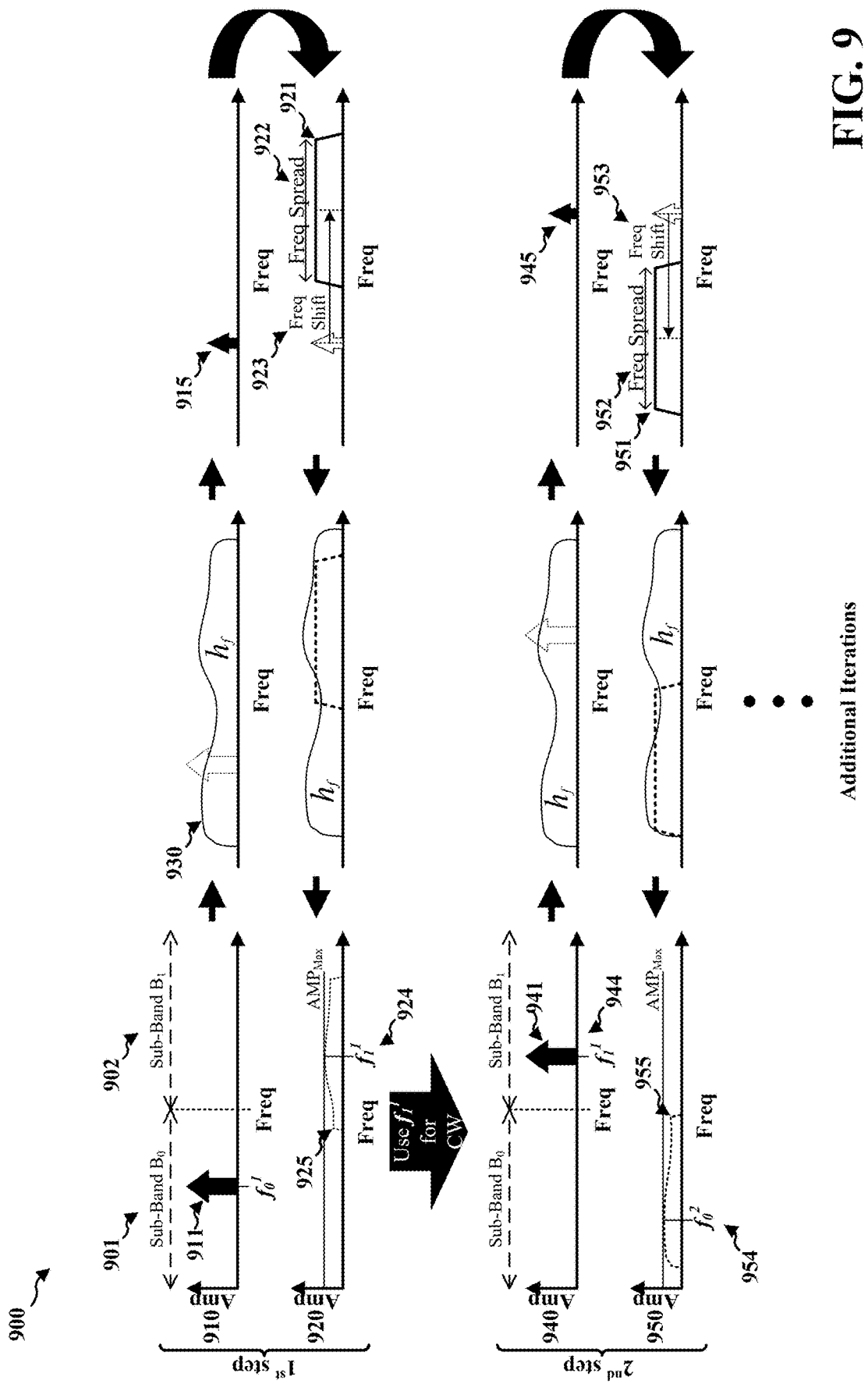
FIG. 9 is a diagram illustrating an iterative process for determining a frequency for transmitting an energy transfer signal for a monostatic scenario in accordance with some aspects of the disclosure.

FIG. 9 is a diagram 900 illustrating an iterative process for determining a frequency for transmitting an energy transfer signal for a monostatic scenario in accordance with some aspects of the disclosure. A first step of a first iteration, in some aspects, may be associated with a first transmission 910 from the reader (corresponding to first transmission 710) and a first backscatter signal 920 received at the reader (corresponding to backscatter signal 720). The first transmission, in some aspects, may include a first CW transmission 911 associated with a first frequency $f_0^1$ in a first frequency sub-band ($B_0$) 901. Because the reader does not have prior information regarding the channel, the first frequency may be selected 'randomly', e.g., based on a known configuration or a default frequency. The first CW transmission 911 may propagate through the channel 930 associated with a function, $h_f(\omega)$, indicating a channel gain as a function of a frequency, $\omega$. For example, for the CW signal at the first frequency, $f_0^1$, the channel gain is effectively a scalar. Accordingly, the signal received at the energy harvesting device (e.g., the EH device 704) may be the CW signal with a reduced amplitude/power, e.g., received transmission 915. An energy harvesting device (e.g., an RFID tag or IoT device) may shift and spread the received transmission 915 based on the frequency spread 922 and the frequency shift 923 to produce backscattered signal 921. The backscattered signal 921 may be propagated through the channel 930 associated with the function $h_f(\omega)$ to produce the backscatter signal 925 received at a reader (e.g., based on the frequency-dependence of the gain (e.g., $h_f(\omega)$)). The backscatter signal 925 may be used to perform a channel estimation and identify a second frequency 924 (e.g., $f_1^1$) that is associated with a maximum gain (e.g., an energy, power, or amplitude) in a plurality of frequencies in the second sub-band ($B_1$) 902 associated with the backscatter signal 925.

In a second step of the first iteration associated with a second transmission 940 from the reader (similar to first transmission 710) and a first backscatter signal 950 received at the reader (similar to backscatter signal 720). The second transmission, in some aspects, may include a second CW transmission 941 associated with the second frequency 944 ($f_1^1$) in the second frequency sub-band ($B_1$) 902. The second frequency, in some aspects, is based on the last-received backscattered signal (e.g., the backscatter signal 925). The second CW transmission 941 may propagate through the channel 930 associated with the function, $h_f(\omega)$. For example, the CW signal at the second frequency 944, $f_1^1$, for the channel gain is effectively a scalar. Accordingly, the signal received at the energy harvesting device (e.g., the EH device 704) may be the CW signal with a reduced amplitude/power, e.g., received transmission 945. An energy harvesting device (e.g., an RFID tag or IoT device) may shift and spread the received transmission 945 based on the frequency spread 952 and the frequency shift 953 to produce backscattered signal 951. The backscattered signal 951 may be propagated through the channel 930 associated with the function $h_f(\omega)$ to produce the backscatter signal 955 received at a reader (e.g., based on the frequency-dependence of the gain (e.g., $h_f(\omega)$)). The backscatter signal 955 may be used to perform a channel estimation and identify a third frequency 954 (e.g., $f_0^2$) that is associated with a maximum gain (e.g., an energy, power, or amplitude) in a plurality of frequencies in the first sub-band ($B_0$) 901 associated with the backscatter signal 955.

For a first step of a second iteration similar to the first step of the first iteration, the third frequency 954 (e.g., $f_0^2$) (e.g., a frequency based on a last-received backscattered signal) may be associated with a CW signal transmitted from the reader and an additional backscatter signal received based on the CW signal transmitted at the third frequency 954. The reader may determine a fourth frequency (e.g., a second frequency in the second sub-band $f_1^2$) used for a second step of the second iteration similar to the second step of the first iteration. The operations may be iterated until the improvement between iterations is below a threshold, or some other criteria is met. In some aspects, the frequency band associated with the energy harvesting/transfer may be sub-divided into additional sub-bands. An additional sub-band (or each additional sub-band), in some aspects, may be associated with an additional step for each iteration.

Figure 10:
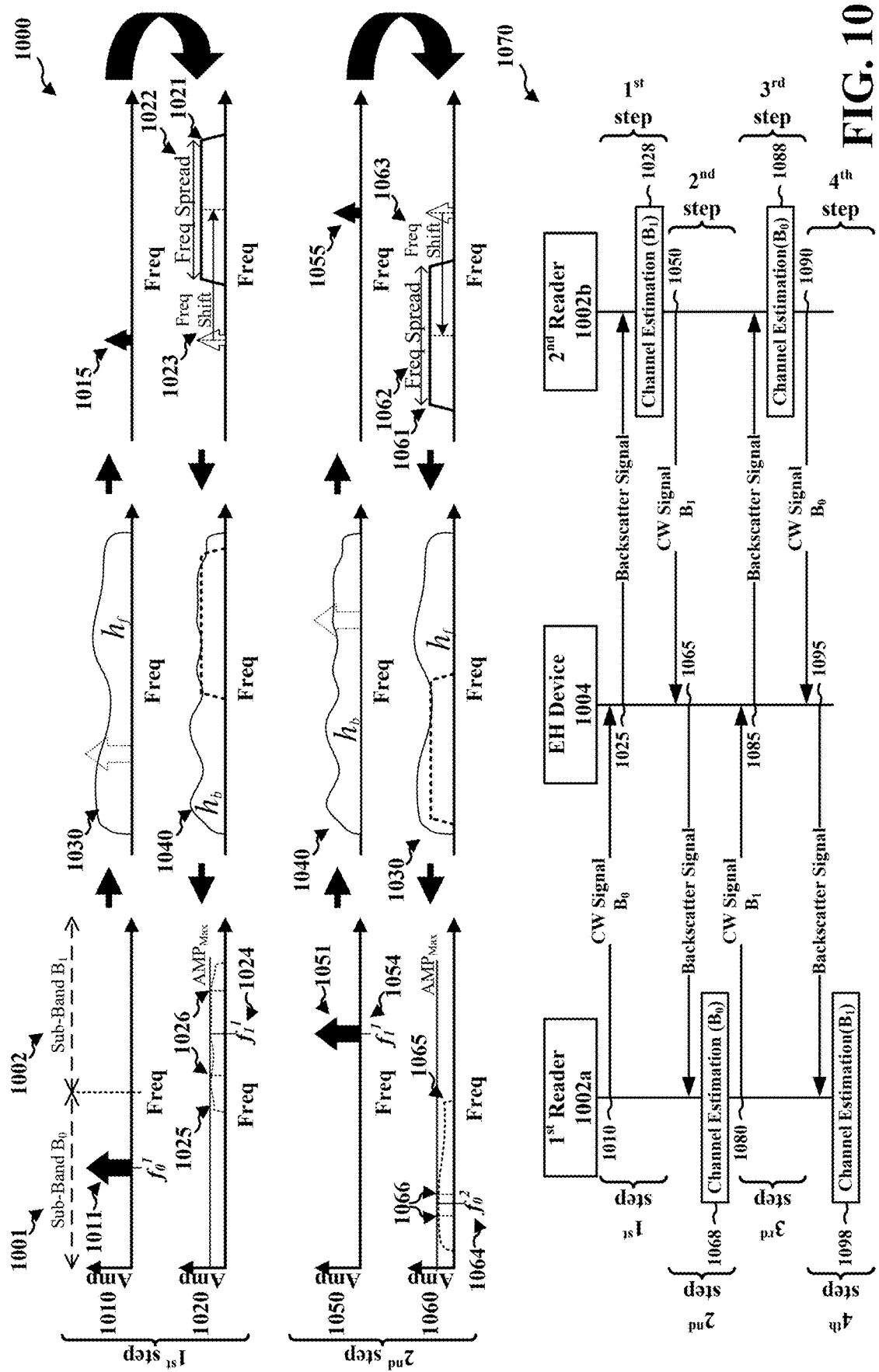
FIG. 10 is a set of related diagrams and illustrating an iterative process for determining a frequency for transmitting an energy transfer signal for a bistatic scenario in accordance with some aspects of the disclosure.

FIG. 10 is a set of related diagrams 1000 and 1070 illustrating an iterative process for determining a frequency for transmitting an energy transfer signal for a bistatic scenario in accordance with some aspects of the disclosure. A first step of a first iteration, in some aspects, may be associated with a first transmission 1010 from a first reader 1002a (corresponding to first transmission 810 from the first reader 802a) and a first transmission and/or backscatter signal 1020 including backscatter signal 1025 received at a second reader 1002b (corresponding to backscatter signal 850 received at the second reader 802b). The first transmission 1010, in some aspects, may include a first CW transmission 1011 associated with a first frequency $f_0^1$ in a first frequency sub-band ($B_0$) 1001. Because the first reader 1002a does not have prior information regarding the channel, the first frequency may be selected 'randomly', e.g., based on a known configuration or a default frequency. The first CW transmission 1011 may propagate through the channel 1030 associated with a function, $h_f(\omega)$, indicating a channel gain as a function of a frequency, $\omega$. For example, for the CW signal at the first frequency, $f_0^1$, the channel gain is effectively a scalar. Accordingly, the signal received at the energy harvesting device 1004 (e.g., the EH device 804) may be the CW signal with a reduced amplitude/power, e.g., received transmission 1015. An energy harvesting device 1004 (e.g., an RFID tag or IoT device) may shift and spread the received transmission 1015 based on the frequency spread 1022 and the frequency shift 1023 to produce backscattered signal 1021. The backscattered signal 1021 may be propagated through the channel 1040 associated with the function $h_b(\omega)$ to produce the backscatter signal 1025 received at the second reader 1002b (e.g., based on the frequency-dependence of the gain (e.g., $h_b(\omega)$)). The backscatter signal 1025 may be used to perform a channel estimation 1028 and identify at least a second frequency 1024 (e.g., $f_1^1$) that is associated with a maximum gain (e.g., an energy, power, or amplitude) in a plurality of frequencies in the second frequency sub-band ($B_1$) 1002 associated with the backscatter signal 1025 and the frequency-dependent gain function, $h_b(\omega)$. The second reader 1002b may identify additional frequencies, e.g., frequencies 1026, associated with a gain that is above a threshold gain or within a threshold percentage of the maximum gain associated with the second frequency 1024, $f_1^1$. In some aspects, along with identifying the second frequency 1024, $f_1^1$, the second reader 1002b may further determine parameters associated with spatial beamforming for an energy transfer signal. The spatial beamforming parameters, in some aspects, may be based on CSI associated with multiple antennas at the second reader 1002b used to receive the backscatter signal 1025.

A second step of the first iteration, in some aspects, may be associated with a second transmission 1050 from the second reader 1002b (similar to first transmission 810 but transmitted from the second reader 802b) and a second transmission and/or backscatter signal 1060 including backscatter signal 1065 received at the first reader 1002a (similar to backscatter signal 850 but backscattered from the EH device 804 to the first reader 802a). The second transmission 1050, in some aspects, may include a second CW transmission 1051 associated with the second frequency 1054 ($f_1^1$) in the second frequency sub-band ($B_1$) 1002. The second CW transmission 1051 may propagate through the channel 1040 associated with the function, $h_b(\omega)$. For example, for the CW signal at the second frequency 1054, $f_1^1$, the channel gain is effectively a scalar. Accordingly, the signal received at the energy harvesting device 1004 (e.g., the EH device 804) may be the CW signal with a reduced amplitude/power, e.g., received transmission 1055. An energy harvesting device 1004 (e.g., an RFID tag or IoT device) may shift and spread the received transmission 1055 based on the frequency spread 1062 and the frequency shift 1063 to produce backscattered signal 1061. The backscattered signal 1061 may be propagated through the channel 1030 associated with the function $h_f(\omega)$ to produce the backscatter signal 1065 (e.g., based on the frequency-dependence of the gain (e.g., $h_f(\omega)$)) received at the reader (e.g., first reader 1002a 802a). The backscatter signal 1065 may be used to perform a channel estimation 1068 and identify a third frequency 1064 (e.g., $f_0^2$) that is associated with a maximum gain (e.g., an energy, power, or amplitude) in a plurality of frequencies in the first frequency sub-band ($B_0$) 1001 associated with the backscatter signal 1065. The first reader 1002a may identify additional frequencies, e.g., frequencies 1066, associated with a gain that is above a threshold gain or within a threshold percentage of the maximum gain associated with the third frequency 1064, $f_0^2$. In some aspects, along with identifying the third frequency 1064, $f_0^2$, the first reader 1002a may further determine parameters associated with spatial beamforming for an energy transfer signal. The spatial beamforming parameters, in some aspects, may be based on CSI associated with multiple antennas at the first reader 1002a used to receive the backscatter signal 1065.

After the first and second steps, a first optimized frequency in the first frequency sub-band ($B_0$) 1001 (i.e., third frequency 1064, $f_0^2$) may be identified for the channel between the first reader 1002a and the EH device 804 and a second optimized frequency in the second frequency sub-band ($B_1$) 1002 (i.e., second frequency 1054, $f_1^1$) may be identified for the channel between the second reader 1002b and the energy harvesting device 1004. In some aspects, a third and fourth step may be associated with the first iteration. The third and fourth steps, in some aspects, may be used to identify a third optimized frequency in the second frequency sub-band ($B_1$) 1002 for the channel between the first reader 1002a and the energy harvesting device 1004 and a fourth optimized frequency in the first frequency sub-band ($B_0$) 1001 for the channel between the second reader 1002b and the energy harvesting device 1004.

As for the first step of the first iteration, the third step may be associated with a third transmission 1080 from the first reader 1002a (corresponding to first transmission 810 from the first reader 1002a 802a) and a backscatter signal 1085 received at the second reader 1002b (corresponding to backscatter signal 850 received at the second reader 802b). The third transmission, in some aspects, may include a third CW transmission associated with a fourth frequency, $f_2^2$, in the second frequency sub-band ($B_1$) 1002. Because the first reader 1002a does not have prior information regarding the second frequency sub-band ($B_1$) 1002 of the channel between itself and the energy harvesting device 1004, the fourth frequency, $f_1^2$, may be selected 'randomly', e.g., based on a known configuration or a default frequency, or may be based on an indication of the second frequency 1054, $f_1^1$, received from the second reader 1002b. The third transmission 1080 may propagate through the channel 1030 associated with the function, $h_f(\omega)$. For example, for the CW signal at the fourth frequency, $f_1^2$, the channel gain is effectively a scalar. Accordingly, the signal received at the energy harvesting device 1004 (e.g., the EH device 804) may be the CW signal with a reduced amplitude/power, e.g., a received transmission similar to received transmission 1015. An energy harvesting device 1004 (e.g., an RFID tag or IoT device) may shift and spread the received transmission based on the frequency spread 1062 and the frequency shift 1063 associated with a CW signal received in the second frequency sub-band ($B_1$) 1002, or some other configured frequency spread and shift, to produce a fifth backscattered signal. The fifth backscattered signal may be propagated through the channel 1040 associated with the function $h_b(\omega)$ to produce a backscatter signal 1085 received at the second reader 1002b (e.g., based on the frequency-dependence of the gain (e.g., $h_b(\omega)$)). The backscatter signal 1085 may be used to perform a channel estimation 1088 and identify at least a fifth frequency (e.g., $f_3$) that is associated with a maximum gain (e.g., an energy, power, or amplitude) in a plurality of frequencies in the first frequency sub-band ($B_0$) 1001 associated with the backscatter signal 1085 and the frequency-dependent gain function, $h_b(\omega)$. The second reader 1002b may identify additional frequencies associated with a gain that is above a threshold gain or within a threshold percentage of the maximum gain associated with the fifth frequency, $f_0^3$. In some aspects, along with identifying the fifth frequency, $f_0^3$, the second reader 1002b may further determine or refine the parameters associated with spatial beamforming for an energy transfer signal. The spatial beamforming parameters, in some aspects, may be based on CSI associated with multiple antennas at the second reader 1002b used to receive the backscatter signal 1085.

As for the second step of the first iteration, the fourth step of the first iteration, in some aspects, may be associated with a fourth transmission 1090 from the second reader 1002b (similar to first transmission 810 but transmitted from the second reader 802b) and a backscatter signal 1095 received at the first reader 1002a (similar to backscatter signal 850 but backscattered from the EH device 804 to the first reader 802a). The fourth transmission 1090, in some aspects, may include a fourth CW transmission associated with the fifth frequency, $f_0^3$, in the first frequency sub-band ($B_0$) 1001. The fourth CW transmission may propagate through the channel 1040 associated with the function, $h_b(\omega)$. For example, for the fourth CW signal at the fifth frequency, $f_0^3$, the channel gain is effectively a scalar. Accordingly, the signal received at the energy harvesting device 1004 (e.g., the EH device 804) may be the CW signal with a reduced amplitude/power. An energy harvesting device 1004 (e.g., an RFID tag or IoT device) may shift and spread the received transmission based on the frequency spread 1022 and the frequency shift 1023 associated with a CW signal received in the first frequency sub-band ($B_0$) 1001, or some other configured frequency spread and shift, to produce a seventh backscattered signal. The seventh backscattered signal may be propagated through the channel 1030 associated with the function $h_f(\omega)$ to produce the backscatter signal 1095 (e.g., based on the frequency-dependence of the gain (e.g., $h_f(\omega)$)) received at the first reader 1002a (e.g., first reader 802a). The backscatter signal 1095 may be used to perform a channel estimation 1098 and identify a sixth frequency (e.g., $f_1^3$) that is associated with a maximum gain (e.g., an energy, power, or amplitude) in a plurality of frequencies in the second frequency sub-band ($B_1$) 1002 associated with the backscatter signal 1095. The first reader 1002a may identify additional frequencies, associated with a gain that is above a threshold gain or within a threshold percentage of the maximum gain associated with the sixth frequency, $f_1^3$. In some aspects, along with identifying the sixth frequency, $f_1^3$, the first reader 1002a may further determine or refine parameters associated with spatial beamforming for an energy transfer signal. The spatial beamforming parameters, in some aspects, may be based on CSI associated with multiple antennas at the first reader 1002a used to receive the backscatter signal 1095.

After the third and fourth steps, the third optimized frequency, $f_0^3$, in the first frequency sub-band ($B_0$) 1001 for the channel between the second reader 1002b and the energy harvesting device 1004 and a fourth optimized frequency, $f_1^3$, in the second frequency sub-band ($B_1$) 1002 for the channel between the first reader 1002a and the energy harvesting device 1004. In some aspects, the frequency associated with each of the first four transmissions associated with the four steps of the first iteration may be pre-configured (e.g., not based on the CSI obtained based on the steps of the first iteration). In some such aspects, the method may include a second iteration similar to the first but using the optimized frequencies for the transmissions corresponding to transmissions 1010, 1050, 1080, and 1090 (e.g., frequencies $f_0^2$, $f_1^1$, $f_1^3$, $f_0^3$, respectively). The method may be iterated with each iteration using optimized frequencies determined by a previous iteration until a stopping criteria has been met. For example, the method may be iterated until the improvement between iterations is below a threshold, a number of iterations has been performed, or some other set of criteria is met. In some aspects, the frequency band associated with the energy harvesting/transfer may be subdivided into additional sub-bands. An additional sub-band (or each additional sub-band), in some aspects, may be associated with an additional step for each iteration.

In some aspects, the function $h_f(\omega)$ associated with channel 1030 may be evaluated by the first reader 1002a in a channel estimation operation similar to the operation illustrated in diagram 700. The channel estimation operation for channel 1030, in some aspects, may be performed as a monostatic operation before the bistatic channel estimation or in parallel with the bistatic operation, where the backscatter signal is received at the first reader 1002a as well as the second reader 1002b as shown separately in diagrams 700 and 900, respectively. When performed in parallel with the bistatic channel estimation, the monostatic channel estimation may be used to select the frequency associated with second CW transmission 1051 instead of using the second frequency 1054 optimized for the channel 1040. In some aspects, the function $h_f(\omega)$ associated with channel 1030 may not be directly evaluated and the first reader 1002a may select a set of frequencies for the first and second step of each iteration based on a configured set of frequencies. The configured set of frequencies may include a plurality of frequencies to generate an approximate function for $h_f(\omega)$ using a set of CW signals at different frequencies that experience different frequency shifts and/or spreads to produce a same distribution of frequencies of the backscattered signals such that the differences between the received backscatter signals are based on the differences in the $h_f(\omega)$ for the different frequencies of the set of CW signals.

Figure 11:
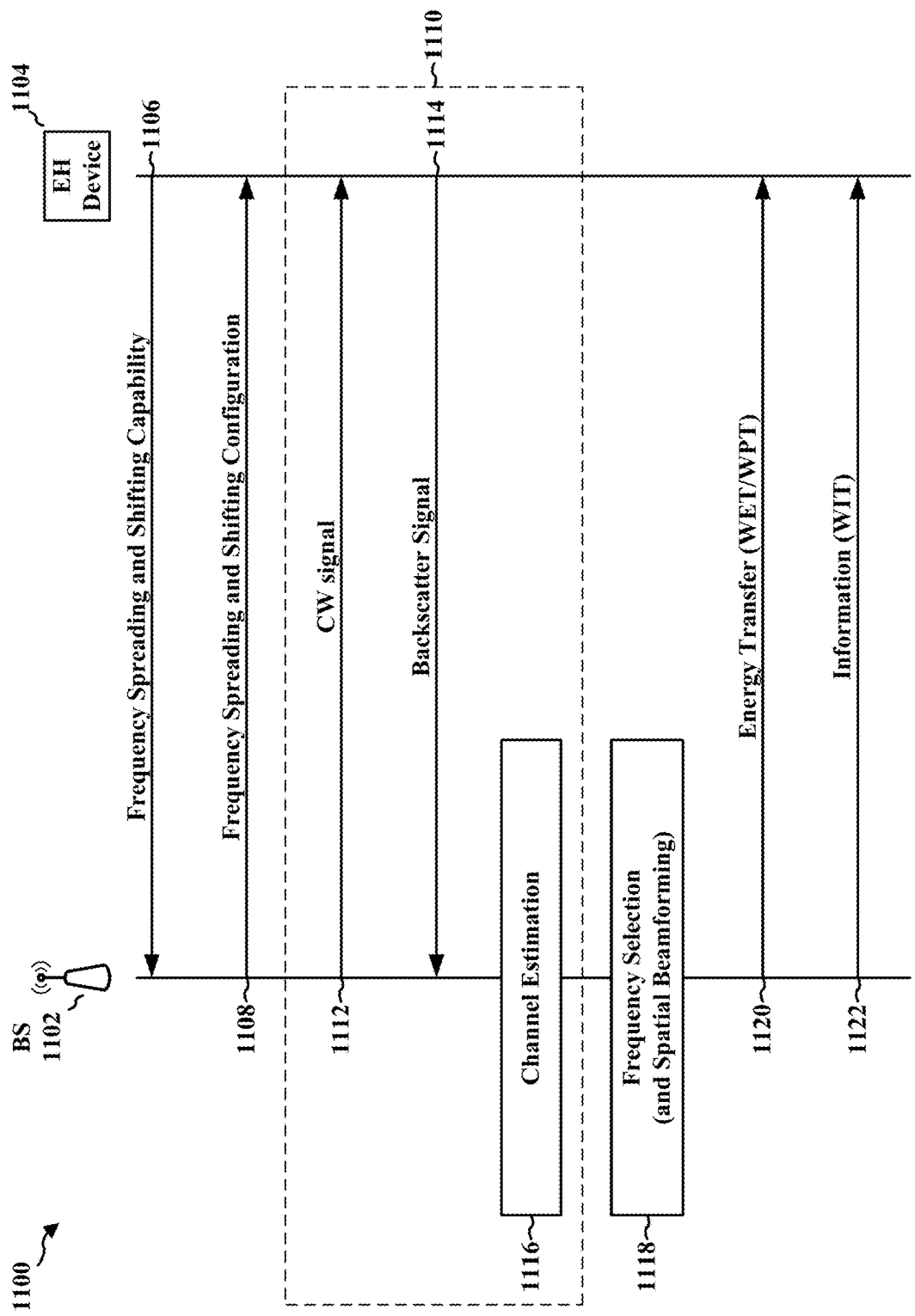
FIG. 11 is a call flow diagram of a method associated with a monostatic scenario in accordance with some aspects of the disclosure.

FIG. 11 is a call flow diagram 1100 of a method associated with a monostatic scenario in accordance with some aspects of the disclosure. The method may be associated with a first reader device, e.g., a base station 1102, and at least one energy harvesting device, e.g., an EH device 1104, that may be an RFID tag, an RFIC, a passive/semi-passive IoT device, an active/semi-active IoT device, or a backscatter device. The EH device 1104, in some aspects, may indicate a frequency spreading and shifting capability 1106. The indication of the capability 1106, in some aspects, may be via a backscattered signal (e.g., the indication may be embedded in the backscattered signal) or an independent transmission. Based on the indication of the capability 1106, the base station 1102 may transmit a frequency spreading and shifting configuration 1108. The configuration 1108, in some aspects, may be specific to the EH device 1104 as will be discussed below in relation to FIG. 13. The content of the configuration 1108, in some aspects, may include an indication of one or more of a set of frequencies (f$^i$) associated with a set of CW signals transmitted by the base station 1102 during a set of n time periods (e.g., time periods, t$^i$, with i∈[1, n]), a set of frequency shifts ($f_{sh}{}^i$), and/or a set of frequency spreads ($f_{sp}{}^i$) as described below in relation to FIG. 14. A frequency spread ($f_{sp}$) may indicate a range of frequencies and/or a distribution of frequencies associated with a frequency spreading operation performed by the EH device 1104. For example, the frequency spread ($f_{sp}$) may indicate one or more of an m-sequence, a PN sequence, a ZC sequence, or other known or configured sequence. An indication of one or more of these parameters may be omitted in some aspects, e.g., if the parameter is not configurable at the EH device 1104 (e.g., the EH device 1104 is not capable of adjusting a pre-configured frequency shift or spread) or does not affect the behavior of the EH device 1104 (e.g., if the frequency of the CW signal does not affect the implementation of the frequency spread or shift performed at the EH device 1104). If the EH device 1104 is not configurable, the indication of the capability 1106 and the configuration 1108, in some aspects, may be omitted by the EH device 1104 and the base station 1102, respectively.

After a configuration, e.g., configuration 1108, is determined at the base station 1102, the base station 1102, in some aspects, may begin a channel estimation operation that may include multiple iterations of a set of configured operations that may include one or more iterations of a set of operations 1110 (e.g., the set of operations described in relation to FIG. 7 or one of the first step or the second step of the first iteration of an iterative process as described in relation to FIG. 9). The set of operations 1110, in some aspects, may include transmitting a CW signal 1112 (e.g., corresponding to first transmission 710, first CW transmission 911, or second CW transmission 941) from the base station 1102 to the EH device 1104. The CW signal 1112 may be backscattered by the EH device 1104, and received at the base station 1102 as backscatter signal 1114 (e.g., backscatter signal 725, 925, or 955). Based on the backscatter signal 1114, the base station 1102 may perform a channel estimation and/or measurement operation 1116 to obtain or acquire CSI for the channel between the base station 1102 and the EH device 1104. The base station 1102, in some aspects, may receive the backscatter signal 1114 via a plurality of antennas and obtain CSI associated with each antenna.

In some aspects, a configuration 1108, may indicate a set of multiple CW signals for being backscattered to perform a channel estimation and/or measurement based on the multiple backscatter signals. For example, a set of three different frequencies in a first sub-band of frequencies associated with a channel estimation may be used for a corresponding set of three CW signals. The three different CW signals may be associated with a corresponding frequency shift to a same plurality of frequencies (a same range of frequencies with a same distribution over the frequencies). Three different frequencies may be used to increase the likelihood that at least one CW signal is received at the EH device 1104 with at least a threshold amplitude/power/energy for backscattering (e.g., that experiences at most a maximum degradation over the channel between the base station 1102 and the EH device 1104). Alternately, or additionally, a same CW signal may be associated with multiple different frequency shifts and/or frequency spreads to explore multiple frequency sub-bands or portions of the frequency sub-bands based on a same forward channel signal. Accordingly, the set of operations 1110 may be performed multiple times based on either of the example configurations including multiple configurations of CW signal frequency, frequency spread, and/or frequency shift.

The set of operations 1110, in some aspects, may be iterated as described in relation to FIG. 9 to obtain CSI for a plurality of sub-bands of frequencies associated with a frequency band associated with the energy harvesting/transfer. After performing one or more iterations of the set of operations 1110, the base station 1102, in some aspects, may perform a frequency selection and/or spatial beamforming operation 1118 based on the one or more obtained CSIs. The frequency selection and/or spatial beamforming operation 1118, in some aspects, may include a selection of a frequency identified as having a highest and/or largest gain (e.g., a frequency with a peak gain in the channel) for energy and/or information transfer. In some aspects, the selection of the frequency may include a plurality of frequencies identified as having a gain above a threshold (or having a highest gain, collectively, compared to other candidate frequencies or sets of frequencies) over which to spread energy so as not to exceed a maximum allowable energy for any particular frequency. In some aspects, the base station 1102 may also select and/or determine spatial beamforming parameters (e.g., may determine a pre-coding matrix based on the CSI obtained by channel estimation and/or measurement operation 1116 for a plurality of antennas). Based on the selected frequency (or set of frequencies) and/or the spatial beamforming, the base station 1102 may transmit one or more of energy transfer signal 1120 (associated with a WET and/or WPT) or information 1122 (e.g., associated with WIT) to the EH device 1104.

Figure 12:
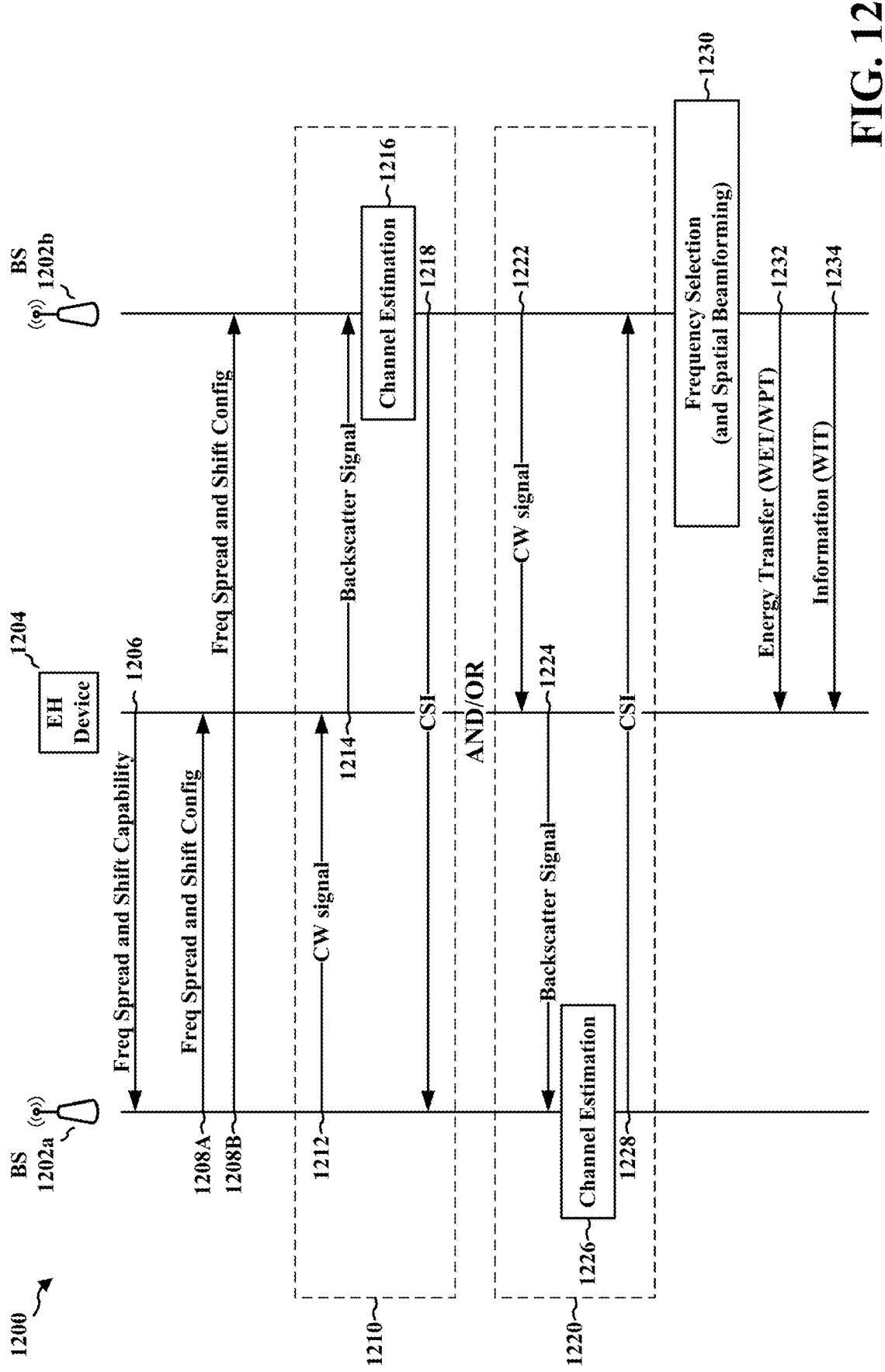
FIG. 12 is a call flow diagram of a method associated with a bistatic scenario in accordance with some aspects of the disclosure.

FIG. 12 is a call flow diagram 1200 of a method associated with a bistatic scenario in accordance with some aspects of the disclosure. The method may be associated with a first reader device, e.g., first base station 1202a, a second reader device, second base station 1202b, and at least one energy harvesting device, e.g., EH device 1204, that may be an RFID tag, an RFIC, a passive/semi-passive IoT device, an active/semi-active IoT device, or a backscatter device. The EH device 1204, in some aspects, may indicate a frequency spreading and shifting capability 1206. The indication of the capability 1206, in some aspects, may be via a backscattered signal (e.g., the indication may be embedded in the backscattered signal) or an independent transmission. While the indication of the capability 1206 is shown as being indicated to the first base station 1202a, in some aspects, the indication of the capability 1206 may be made to the second base station 1202b (and any other base stations within range of the EH device 1204). Based on the indication of the capability 1206, the first base station 1202a may transmit a frequency spreading and shifting configuration 1208A. The configuration 1208A, in some aspects, may be specific to the EH device 1204 as will be discussed below in relation to FIG. 13. The content of the configuration 1208A, in some aspects, may include an indication of one or more of a set of frequencies (f) associated with a set of CW signals transmitted by the first base station 1202a during a set of n time periods (e.g., time periods, $t^i$, with $i \in [1, n]$), a set of frequency shifts ($f_{sh}^i$), and/or a set of frequency spreads ($f_{sp}^i$) as described below in relation to FIG. 14. The frequency spread ($f_{sp}$) may indicate a range of frequencies and/or a distribution of frequencies associated with a frequency spreading operation performed by the EH device 1204. For example, the frequency spread ($f_{sp}$) may indicate one or more of an m-sequence, a PN sequence, a ZC sequence, or other known or configured sequence.

The configuration 1208A, in some aspects may be determined by one of the first base station 1202a, the second base station 1202b, or a network entity associated with both the first base station 1202a and the second base station 1202b. The parameters included in configuration 1208A, in some aspects, may be communicated to the second base station 1202b by the first base station 1202a as configuration 1208B over a wired and/or wireless network or may be communicated with both the first base station 1202a and the second base station 1202b by a network entity associated with the determination of the configuration 1208A. In some aspects, the transmission of configuration 1208A and the configuration 1208B, may be replaced by a transmission of a configuration from the second base station 1202b to the EH device 1204 and the first base station 1202a or from a network entity to each of the first base station 1202a and the second base station 1202b and from one of the first base station 1202a or the second base station 1202b to the EH device 1204. An indication of one or more of these parameters may be omitted in some aspects, e.g., if the parameter is not configurable at the EH device 1204 (e.g., the EH device 1204 is not capable of adjusting a pre-configured frequency shift or spread) or does not affect the behavior of the EH device 1204 (e.g., if the frequency of the CW signal does not affect the implementation of the frequency spread or shift performed at the EH device 1204). If the EH device 1204 is not configurable, the indication of the capability 1206 and the configuration 1208A, in some aspects, may be omitted by the EH device 1204 and the first base station 1202a, respectively.

After a configuration, e.g., configuration 1208A, is determined at the first base station 1202a and/or the second base station 1202b, the first base station 1202a and the second base station 1202b, in some aspects, may begin a channel estimation operation that may include multiple iterations of a set of configured operations that may include one or more iterations of at least one the set of operations 1210 and/or 1220 (e.g., the set of operations described in relation to FIG. 8 or one of the first through fourth steps of an iterative process as described in relation to FIG. 10). The set of operations 1210, in some aspects, may include transmitting a CW signal 1212 (e.g., corresponding to first transmission 810, first transmission 1010, or third transmission 1080) from the first base station 1202a to the EH device 1204. The CW signal 1212 may be backscattered by the EH device 1204, and received at the second base station 1202b as backscatter signal 1214 (e.g., backscatter signal 855, 1025, or 1085). Based on the backscatter signal 1214, the second base station 1202b may perform a channel estimation and/or measurement operation 1216 to obtain or acquire CSI for the channel between the second base station 1202b and the EH device 1204. The second base station 1202b, in some aspects, may receive the backscatter signal 1214 via a plurality of antennas and obtain CSI associated with each antenna. The second base station 1202b may transmit (or otherwise communicate) the CSI 1218 to the first base station 1202a for use in subsequent iterations (e.g., for a subsequent set of operations 1220).

The set of operations 1220, in some aspects, may include transmitting a CW signal 1222 (e.g., corresponding to second transmission 1050, or fourth transmission 1090) from the second base station 1202b to the EH device 1204. The CW signal 1222 may be backscattered by the EH device 1204, and received at the first base station 1202a as backscatter signal 1224 (e.g., backscatter signal 1065 or 1095). Based on the backscatter signal 1224, the first base station 1202a may perform a channel estimation and/or measurement operation 1226 to obtain or acquire CSI for the channel between the first base station 1202a and the EH device 1204. The first base station 1202a, in some aspects, may receive the backscatter signal 1224 via a plurality of antennas and obtain CSI associated with each antenna. The first base station 1202a may transmit (or otherwise communicate) the CSI 1228 to the second base station 1202b for use in subsequent iterations (e.g., for a subsequent set of operations 1210). In some aspects, additional configurations may be transmitted after a set of operations (e.g., sets of operations 1210 and/or 1220) associated with the configuration 1208A to configure additional sets of operations.

In some aspects, the configuration 1208A, may indicate a set of multiple CW signals for being backscattered to perform a channel estimation and/or measurement based on the multiple backscatter signals. For example, the configuration 1208A, may include a configuration associated with one or more iterations of the sets of operations 1210 and/or 1220. For example, the configuration 1208A may include a configuration for a first, second, third, and fourth, set of operations similar to the first, second, third, and fourth step, respectively, of the first iteration described in relation to FIG. 10. In some aspects, each step of the first iteration described in relation to FIG. 10, may be associated with multiple frequencies and/or frequency shifts and spreads as described in relation to configuration 1108 above.

The set of operations 1210 and/or 1220, in some aspects, may be iterated as described in relation to FIG. 10 to obtain CSI for a plurality of sub-bands of frequencies associated with a frequency band associated with the energy harvesting/transfer. After performing one or more iterations of the set of operations 1210 and/or 1220, the second base station 1202b, in some aspects, may perform a frequency selection and/or spatial beamforming operation 1230 based on the one or more obtained CSIs. The frequency selection and/or spatial beamforming operation 1230, in some aspects, may include a selection of a frequency identified as having a highest gain (e.g., a frequency with a peak gain in the channel) for energy and/or information transfer. In some aspects, the selection of the frequency may include a plurality of frequencies identified as having a gain above a threshold (or having a highest gain, collectively, compared to other candidate frequencies or sets of frequencies) over which to spread energy so as not to exceed a maximum allowable energy for any particular frequency. In some aspects, the second base station 1202b may also select and/or determine spatial beamforming parameters (e.g., may determine a pre-coding matrix based on the CSI obtained by channel estimation and/or measurement operation 1216 or 1226 for a plurality of antennas). Based on the selected frequency (or set of frequencies) and/or the spatial beamforming, the second base station 1202b may transmit one or more of energy transfer signal 1232 (associated with a WET and/or WPT) or information 1234 (e.g., associated with WIT) to the EH device 1204.

Figure 13:
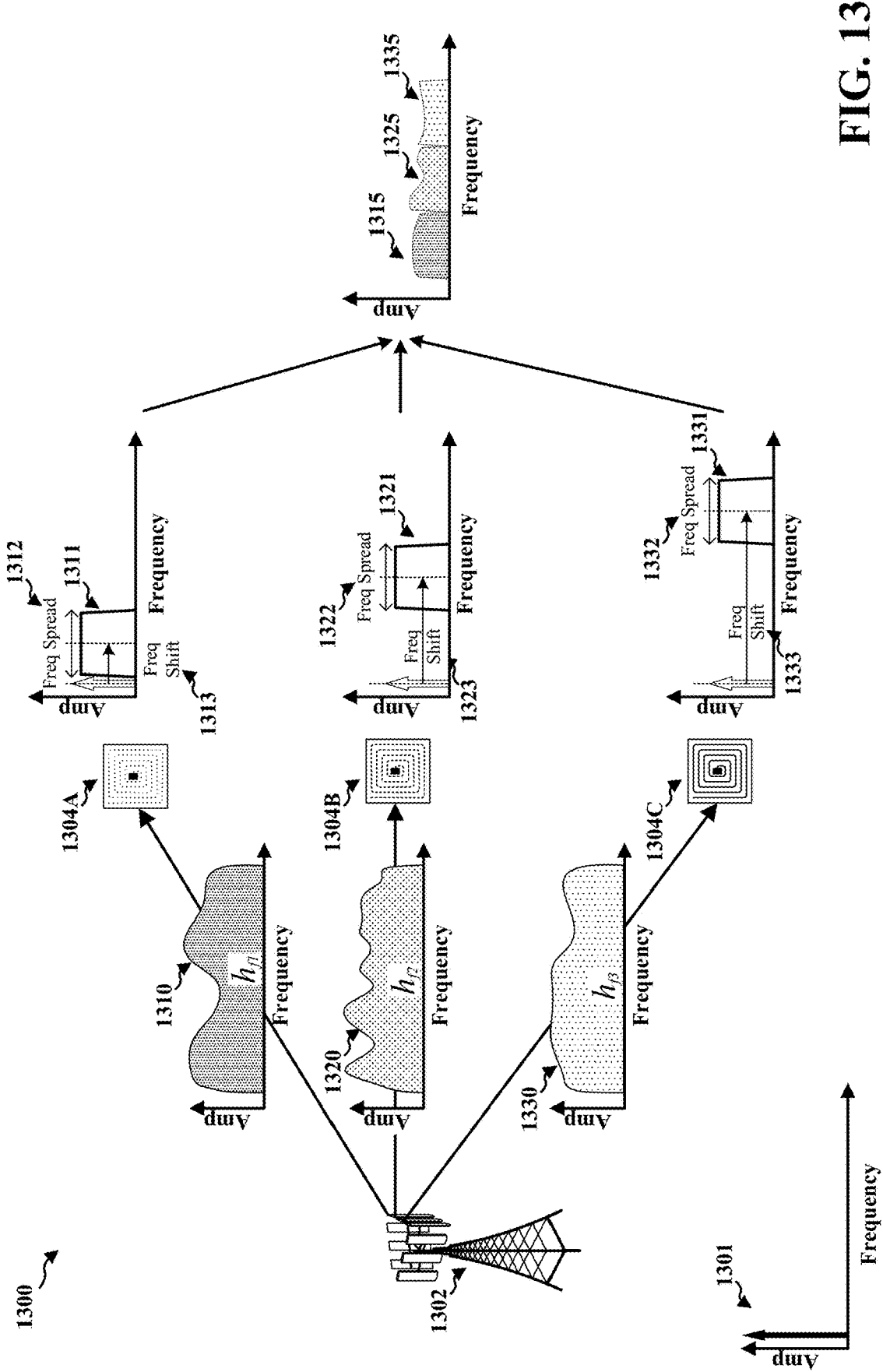
FIG. 13 is a diagram illustrating a multiplexing operation for performing a channel estimation for multiple energy harvesting devices simultaneously in accordance with some aspects of the disclosure.

FIG. 13 is a diagram 1300 illustrating a multiplexing operation for performing a channel estimation for multiple energy harvesting devices simultaneously in accordance with some aspects of the disclosure. The multiplexing operation may be associated with a first reader 1302 (e.g., a base station or other energy transfer device) and multiple EH devices (e.g., including a first EH device 1304A, a second EH device 1304B, or a third EH device 1304C). Each EH device (e.g., the first EH device 1304A, the second EH device 1304B, or the third EH device 1304C), in some aspects, may be associated with a different channel, e.g., a different frequency-dependent function (e.g., $h_{f1}(\omega)$ 1310, $h_{f2}(\omega)$ 1320, or $h_{f3}(\omega)$ 1330, respectively), between the first reader 1302 and the EH device. In some aspects, each EH device may further be associated with a different channel between the EH device and a second reader.

Each EH device may receive a different configuration for a frequency shift and a frequency spread. For example, the first EH device 1304A may receive a configuration including a frequency spread 1312 and a frequency shift 1313 associated with a first signal associated with a CW signal at a first frequency 1301. Similarly, the second EH device 1304B and the third EH device 1304C may receive a set of frequency spread 1322 and frequency shift 1323, and a set of frequency spread 1332 and frequency shift 1333, respectively. The EH devices receiving the CW at the first frequency 1301 may result in a backscattered signal 1311, a backscattered signal 1321, and a backscattered signal 1331. The backscattered signals 1311, 1321, and 1331 may not overlap in frequency such that when they are received at the first reader 1302, or at a second reader, as a backscatter signal 1315, a backscatter signal 1325, and a backscatter signal 1335, they may be used to separately perform a channel estimation associated with each of the EH devices (and the corresponding different channels).

Figure 14:
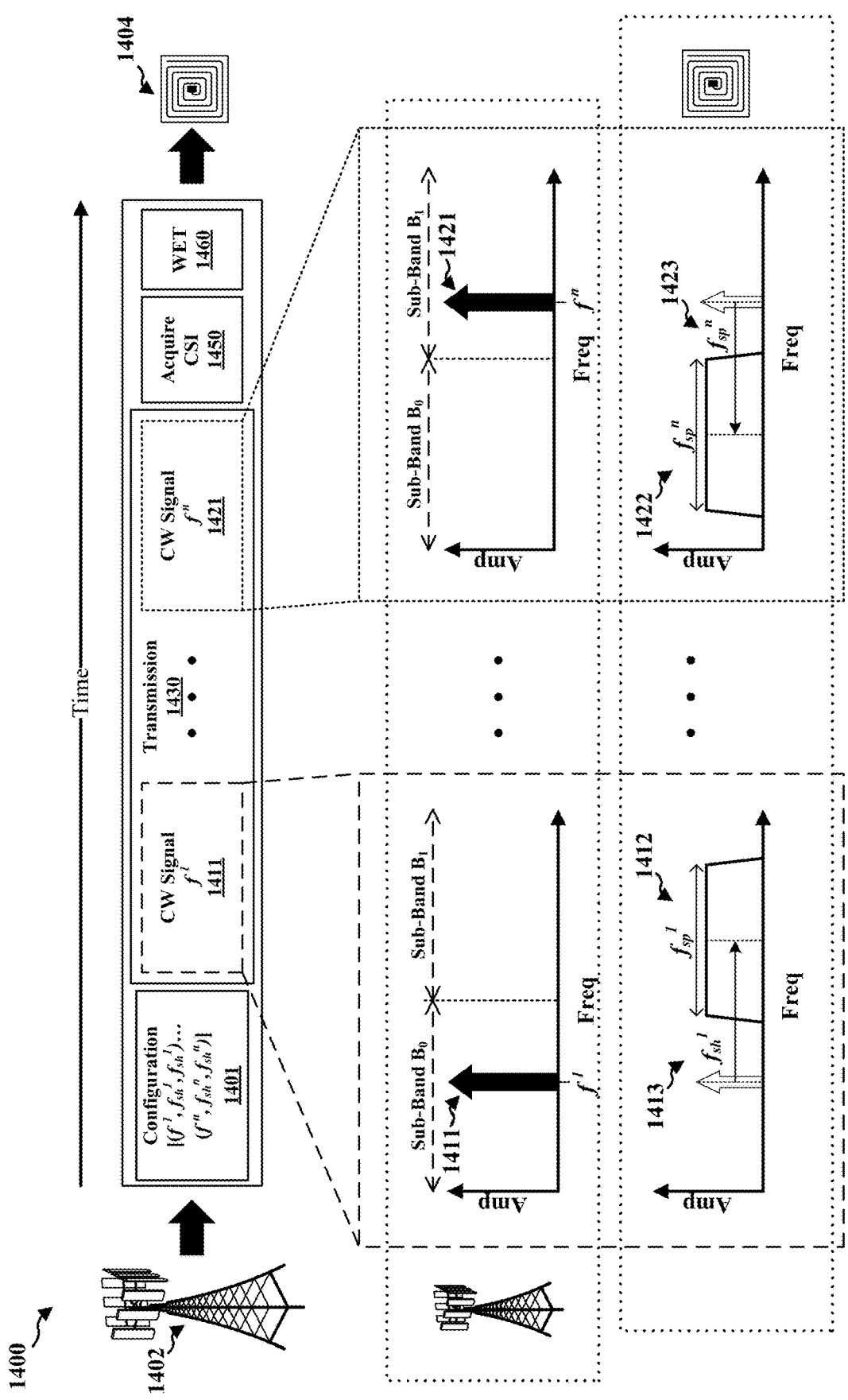
FIG. 14 is a diagram illustrating a configuration and subsequent operations of a reader and an EH device in accordance with some aspects of the disclosure.

FIG. 14 is a diagram 1400 illustrating a configuration 1401 and subsequent operations of a reader 1402 and an EH device 1404 in accordance with some aspects of the disclosure. The configuration 1401 transmitted by reader 1402 to the EH device 1404, in some aspects, may correspond to one or more of configuration 1108 or configuration 1208A transmitted by the base station 1102 or the first base station 1202a to the EH device 1104 or 1204, respectively. The configuration 1401, in some aspects, may indicate sets of parameters ($f^i$, $f_{sp}^i$, $f_{sh}^i$) for a set of time periods, $t^i$, with $i \in [1, n]$. The reader 1402 may then transmit a set of transmissions 1430 including one or more CW signals at one or more indicated frequencies (e.g., CW signal 1411 at $f^1$ through CW signal 1421 at $f^n$) during each of the indicated time periods, $t^i$. The EH device 1404 may backscatter the received CW signal based on a corresponding set of frequency spread and frequency shift parameters (e.g., $f_{sp}^i$ 1412 and $f_{sh}^i$ 1413 through $f_{sp}^n$ 1422 and $f_{sh}^n$ 1423). After the transmission 1430 of the configured CW signals 1411 and 1421, the reader 1402 may perform CSI acquisition 1450 and, based on the CSI acquisition 1450, perform an energy transfer operation, e.g., WET 1460.

Figure 15:
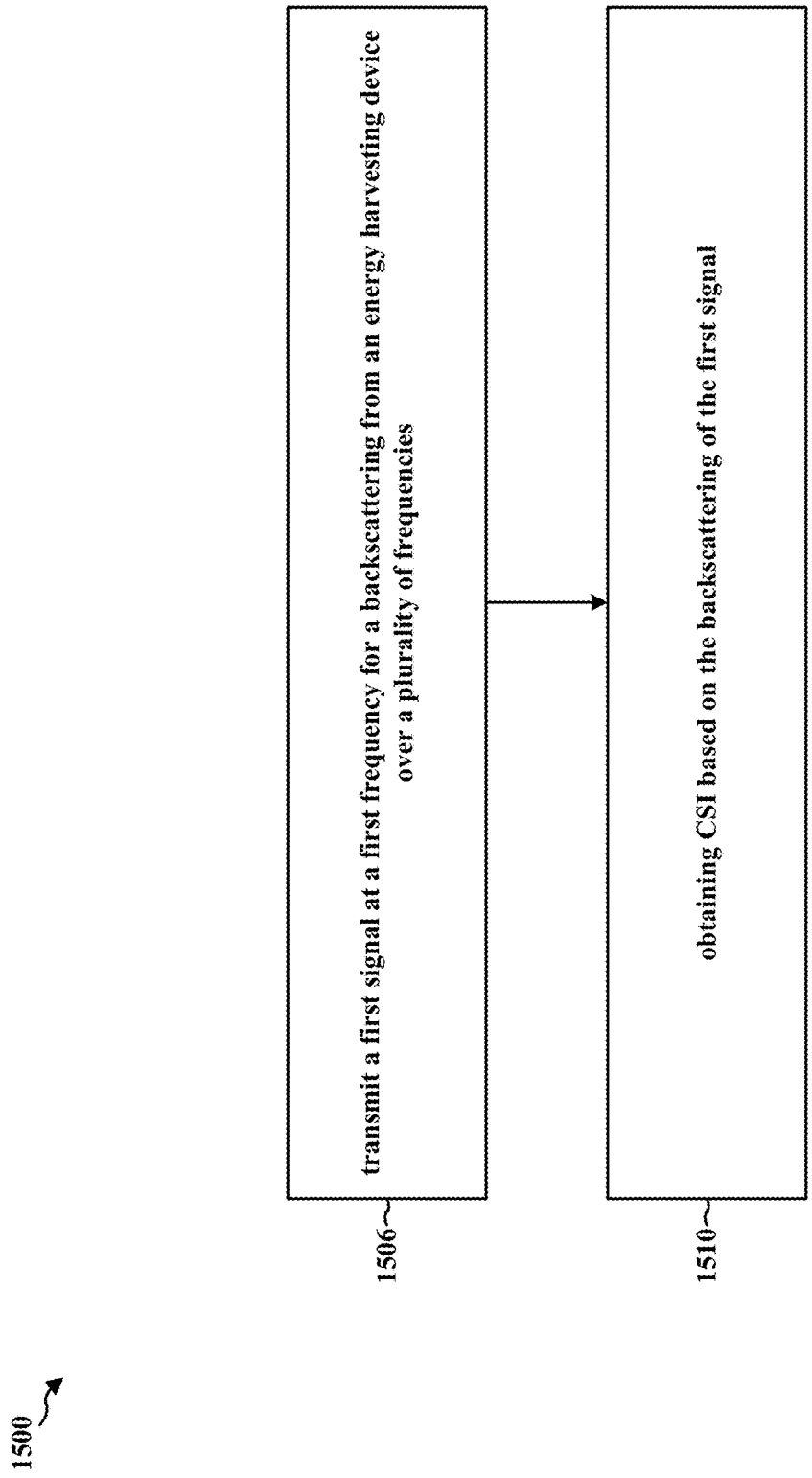
FIG. 15 is a flowchart of a method of wireless communication at a first reader device in accordance with some aspects of the disclosure.
Figure 16:
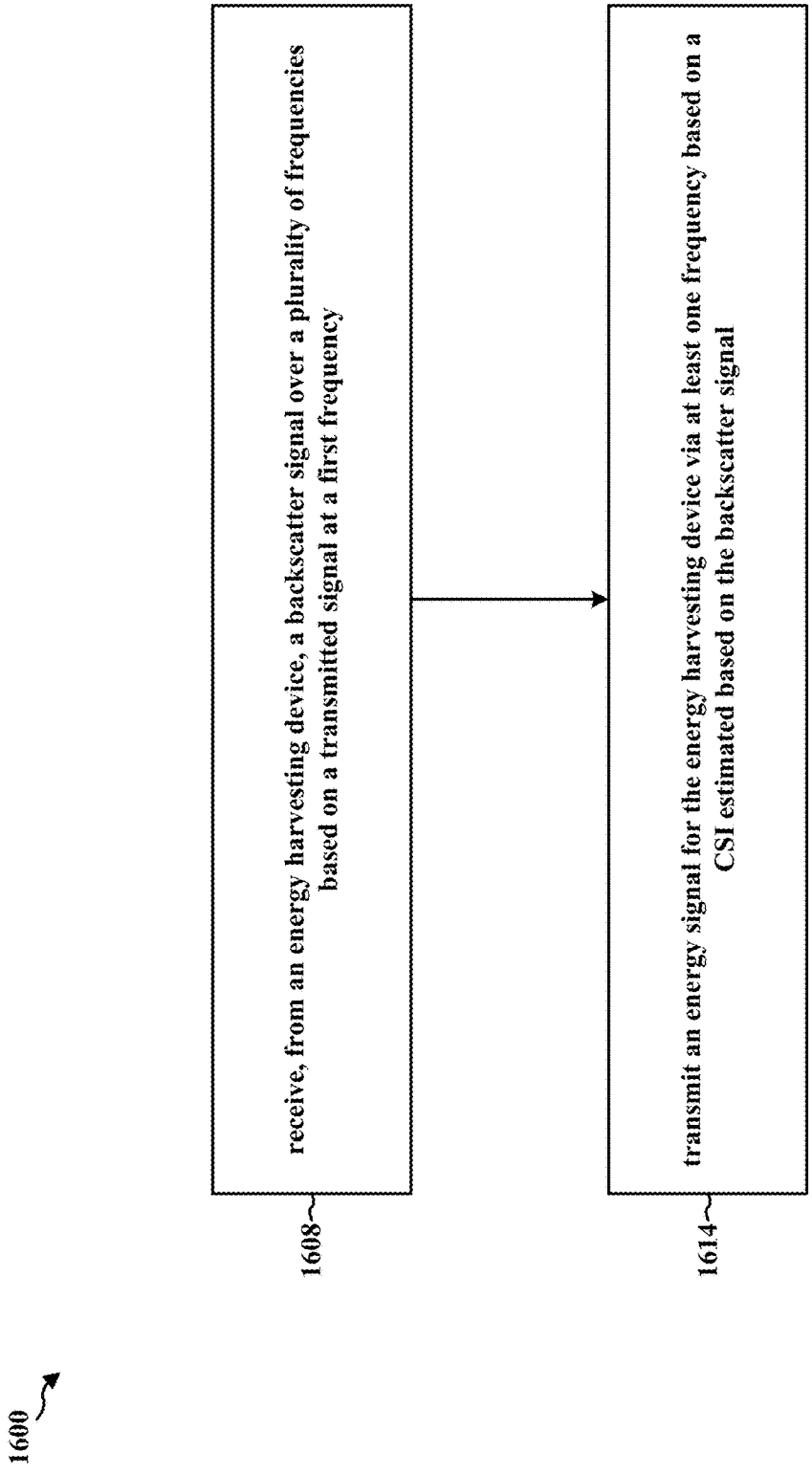
FIG. 16 is a flowchart of a method of wireless communication at a second reader device in accordance with some aspects of the disclosure.

FIG. 15 is a flowchart 1500 of a method of wireless communication at a first reader device in accordance with some aspects of the disclosure. The method may be performed by a reader device (e.g., the UE 104; the base station 102, the base station 1102, the second base station 1202b; the RFID reader 402, the reader 702, the second reader 802b, the second reader 1002b, the first reader 1302, the reader 1402; the apparatus 2004; or the network entity 2002 or 2102). The reader device, in some aspects, may be a base station or user equipment capable of an energy transfer operation and may include multiple antennas that may be used for simultaneous transmission and/or reception. In some aspects, the method may be performed by a second reader device based on a related method performed in concert with a first reader device or may be performed by a single reader device including both the first and second reader devices. Because of the interconnected nature of the method performed by the first and second reader devices FIG. 15 will be discussed in conjunction with FIG. 16 below. FIG. 16 is a flowchart 1600 of a method of wireless communication at a second reader device in accordance with some aspects of the disclosure.

In some aspects, a reader device (e.g., at least one of the first or second reader devices) may receive, from an EH device, an indication of a first (frequency-spreading) capability of the EH device to backscatter a received signal associated with at least a first frequency over at least a frequency band comprising a plurality of frequencies and a second (frequency-shifting) capability of the EH device to backscatter the received signal associated with at least the first frequency with a frequency shift. The indication, in some aspects, may be embedded in a backscattered signal from the EH device received at the reader device and/or may be transmitted by the EH device. The indication of the first capability and the second capability, in some aspects, may further indicate a configurability of the frequency-spreading and/or frequency-shifting capability. The indication of the frequency-spreading capability, in some aspects, may indicate one or more configurable sequences associated with the frequency-spreading and/or a distribution or energies among a plurality of frequencies associated with the frequency-spreading capability. The indication of the frequency-shifting capability, in some aspects, may indicate a maximum and/or minimum frequency-shift that the EH device may produce. For example, referring to FIGS. 11 and 12, the base station 1102, the first base station 1202a, or the second base station 1202b may receive an indication of the capability 1106 or capability 1206 indicating a capability of the EH device 1104 or the EH device 1204 to introduce a frequency shift and/or perform a frequency spreading operation.

The reader device, in some aspects, may transmit an indication of a plurality of frequencies over which to backscatter a first signal at a first frequency at the EH device (e.g., a first EH device). In some aspects, the plurality of frequencies may be a first frequency band of a plurality of non-overlapping frequency bands and the reader device may transmit one or more indications of one or more frequency bands of a plurality of non-overlapping frequency bands over which to backscatter the first signal for a corresponding one or more EH devices including the first EH device. For example, referring to FIGS. 11, 12, and 13, the base station 1102, the first base station 1202*a,* or the first reader 1302, may transmit the configuration 1108 or the configuration 1208A to multiple EH devices, e.g., first EH device 1304A, second EH device 1304B, and third EH device 1304C to indicate the non-overlapping frequency bands associated with backscattered signals 1311, 1321, and 1331.

In some aspects, the reader device may transmit an indication of a plurality of frequency bands over which to backscatter a corresponding plurality of signals at particular frequencies for the first EH device, where the plurality of frequency bands may be the same or different frequency bands and the plurality of signals may be associated with a same or different frequency. For example, a set of three different frequencies in a first sub-band of frequencies associated with a channel estimation may be used for a corresponding set of three CW signals. The three different CW signals may be associated with a corresponding frequency shift to a same plurality of frequencies (a same range of frequencies with a same distribution over the frequencies). Alternately, or additionally, a same CW signal may be associated with multiple different frequency shifts and/or frequency spreads to explore multiple frequency sub-bands or portions of the frequency sub-bands based on a same forward channel signal. For example, referring to FIGS. 11, 12, and 14, the base station 1102, the first base station 1202*a,* or the reader 1402, may transmit the configuration 1108, the configuration 1208A, or configuration 1401 to the EH device 1104, 1204, or 1404 indicating a plurality of frequencies for a plurality of transmitted CW signals, e.g., CW signals 1411 through 1421, and a plurality of sets of frequency spreads and frequency shifts (e.g., $f_{sp}^1$ 1412 and $f_{sh}^1$ 1413 through $f_{sp}^n$ 1422 and $f_{sh}^n$ 1423) for the corresponding plurality of transmitted CW signals.

At 1506, the first reader device may transmit a first signal at a first frequency for a backscattering from the (first) EH device over a plurality of frequencies. In some aspects, the first signal may be transmitted based on the indication of the plurality of frequencies over which to backscatter the first signal at the first frequency at the EH device. For example, 1506 may be performed by antennas 2080, one or more transceivers 2022, cellular baseband processor 2024, antennas 2180, one or more transceivers 2146, CU processor 2112, DU processor 2132, RU processor 2142, or CSI acquisition component 199 of FIGS. 20 and 21. In some aspects, the reader device may, at 1506, transmit a plurality of signals (including the first signal) indicated by the indication transmitted at 1504. For example, referring to FIGS. 7, 8, 11, 12 and 14, the reader 702, the first reader 802*a,* the base station 1102, the first base station 1202*a,* or the reader 1402 may transmit, and the EH device 704, 804, 1104, 1204, or 1404 may receive, the first transmission 710 or 810 or the CW signal 1112, 1212, 1411, or 1421.

At 1608, the second reader device may receive, from the (first) EH device, a backscatter signal over a plurality of frequencies based on the transmitted signal at the first frequency. For example, 1608 may be performed by antennas 2080, one or more transceivers 2022, cellular baseband processor 2024, antennas 2180, one or more transceivers 2146, CU processor 2112, DU processor 2132, RU processor 2142, or CSI acquisition component 199 of FIGS. 20 and 21. In some aspects, the plurality of frequencies comprises a frequency band with a detectable, or known, backscatter (or backscattering) signal strength (or energy distribution over the plurality of frequencies) from the EH device. The detectable, or known, distribution of energies, in some aspects, may allow the reader device to identify the frequency-dependent function associated with the channel between the reader device and the EH device. The frequency band, in some aspects, may be associated with a flat distribution over the plurality of frequencies. For example, referring to FIGS. 7, 8, 11, and 12, the reader 702, the second reader 802*b,* the base station 1102, or the first base station 1202*a* may receive a backscatter signal 720, 850, 1114, 1214, or 1224.

In some aspects, the reader device may receive, at 1608, one or more additional backscatter signals over one or more additional frequency bands of a plurality of non-overlapping frequency bands based on the transmitted signal at the first frequency at 1506. In some aspects, each of the one or more additional backscatter signals may be received from a corresponding one or more additional EH devices. For example, referring to FIG. 13, the first reader 1302 or a second reader may receive the backscatter signals 1315, 1325, and 1335 (associated with non-overlapping frequency bands) from first EH device 1304A, second EH device 1304B, and third EH device 1304C, respectively. The second reader device may receive, at 1608, from an EH device, one or more additional backscatter signals over the plurality of frequencies based on additional signals transmitted at different frequencies for a CSI estimation. For example, referring to FIG. 10, the second reader 1002*b* may receive the backscatter signals 1025 and 1085.

Based on the backscatter signal(s) received at 1608, the first (and second) reader device may obtain, at 1510, CSI associated with at least the (first) EH device, e.g., associated with a channel between the reader device and the (first) EH device. For example, 1510 may be performed by antennas 2080, one or more transceivers 2022, cellular baseband processor 2024, antennas 2180, one or more transceivers 2146, CU processor 2112, DU processor 2132, RU processor 2142, or CSI acquisition component 199 of FIGS. 20 and 21. The CSI may be obtained, at 1510, based on a channel estimation and/or measurement made on the backscatter signals received from the (first) EH device. In some aspects, the first reader device may obtain the CSI, at 1510, from the second reader device over a network to which they both connect based on measurements and/or a channel estimation made at the second reader device on the backscatter signals received at 1608. For example, referring to FIGS. 11 and 12, the base station 1102 or the second base station 1202*b* may receive backscatter signal 1114 or 1214 and perform the channel estimation and/or measurement operation 1116 or 1216, respectively, to obtain CSI for a related channel or first base station 1202*a* may receive CSI 1218 from second base station 1202*b* after the channel estimation and/or measurement operation 1216.

In some aspects, the first reader device may obtain, at 1510, one or more CSI associated with the one or more EH devices based on the backscattering of the first signal from each of the one or more EH devices. For example, referring to FIGS. 11-13, the base station 1102 or the second base station 1202*b* may obtain CSI for channels associated with frequency dependent functions $h_{f_1}(\omega)$ 1310, $h_{f_2}(\omega)$ 1320, or $h_{f_3}(\omega)$ 1330 based on the backscatter signals 1315, 1325, and 1335, respectively, and the second base station 1202*b* may provide the CSI to the first base station 1202*a.* The first reader device, at 1510, may also determine and/or obtain a pre-coding matrix for transmitting an energy signal for an EH device based on the backscatter signal from the EH device received via a plurality of antennas of the reader device.

The first reader device (or a network entity associated with the first radar device) may determine whether to transmit additional CW signals (e.g., whether to perform another iteration of the channel estimation operations) based on a set of criteria. In some aspects, the determination may be based on the CSI obtained at 1510, a number of iterations, a number of CW signals transmitted, based on a strength of the backscatter signals, or based on an incremental improvement in the strength of the backscatter signals between a previous iteration and current iteration. If the reader device determines to transmit an additional CW signal (or signals), the first reader device may proceed to transmit an additional indication of a configuration associated with the additional CW signal(s) or, if a current configuration is acceptable, the reader device may proceed to 1506 to transmit the additional CW signal(s).

If the reader device determines to not transmit additional CW signals, the second reader device may, at 1614, transmit at least one energy transfer signal to the (first) EH device. For example, 1614 may be performed by antennas 2080, one or more transceivers 2022, cellular baseband processor 2024, antennas 2180, one or more transceivers 2146, CU processor 2112, DU processor 2132, RU processor 2142, or CSI acquisition component 199 of FIGS. 20 and 21. The energy transfer signal, in some aspects, may further be based on the pre-coding matrix determined and/or obtained at 1510. In some aspects, the reader device may, at 1614, transmit additional energy transfer signals for the one or more additional energy harvesting devices via one or more corresponding frequencies based on a corresponding one or more CSI estimated based on a corresponding backscatter signal of the one or more additional backscatter signals.

Figure 17:
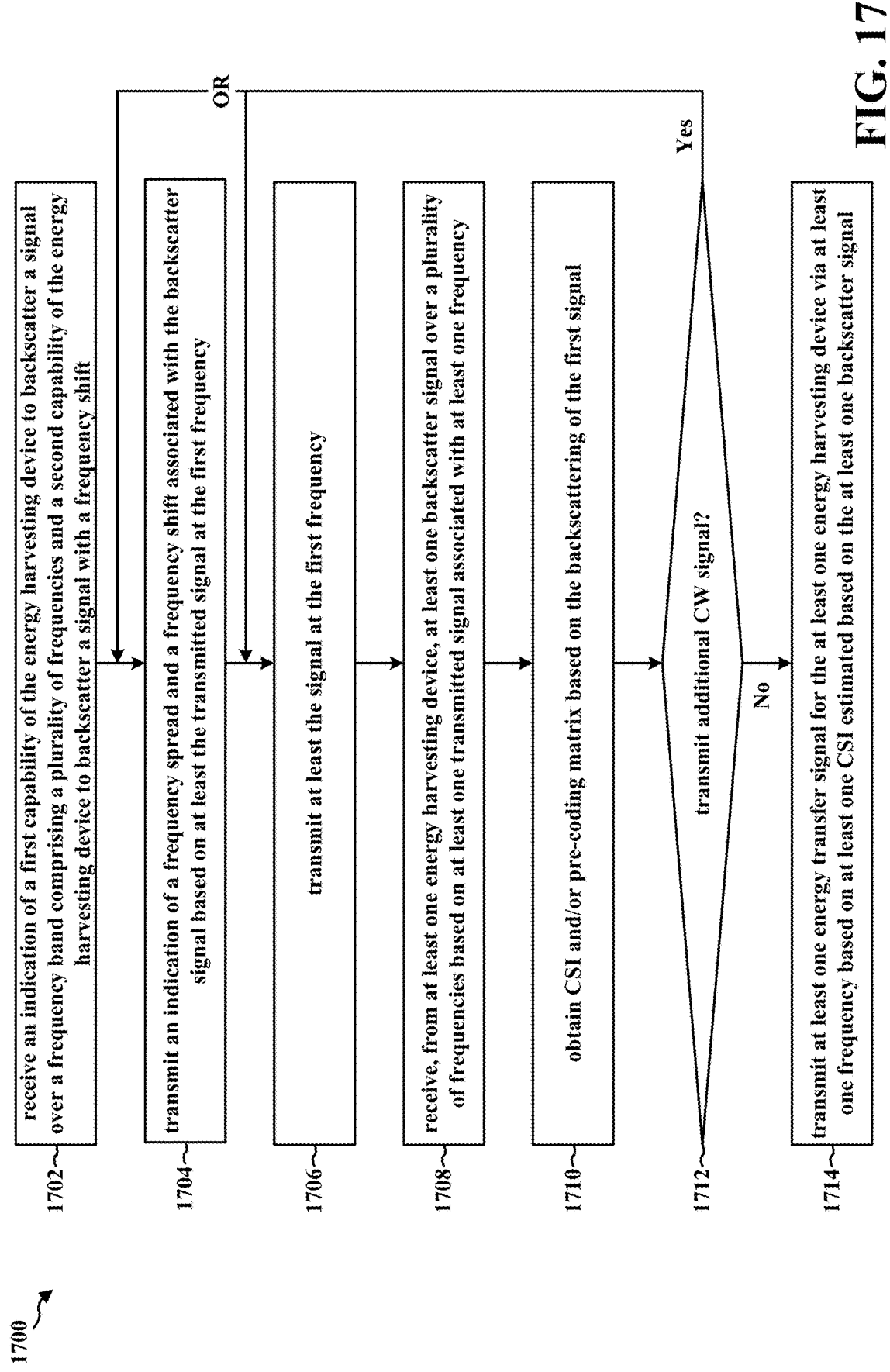
FIG. 17 is a flowchart of a method of wireless communication.

FIG. 17 is a flowchart 1700 of a method of wireless communication. The method may be performed by a reader device (e.g., the UE 104; the base station 102, the base station 1102, the first base station 1202a, the second base station 1202b; the RFID reader 402, the reader 702, the first reader 802a, the second reader 802b, the first reader 1002a, the second reader 1002b, the first reader 1302, the reader 1402; the apparatus 2004; or the network entity 2002 or 2102). The reader device, in some aspects, may be a base station or user equipment capable of an energy transfer operation and may include multiple antennas that may be used for simultaneous transmission and/or reception. For the purpose of the following description, a unified reader device is assumed, however, in some aspects, some operations may be performed by a first reader device as described in relation to FIG. 15, others operations may be performed by a second, related reader device as described in relation to FIG. 16, while some operations may be performed by both the first reader device and the second reader device as described in relation to the bistatic scenario and/or configuration illustrated in FIG. 12.

At 1702, the reader device may receive, from an EH device, an indication of a first (frequency-spreading) capability of the EH device to backscatter a signal associated with at least a first frequency over at least a frequency band comprising a plurality of frequencies and a second (frequency-shifting) capability of the EH device to backscatter the signal associated with at least the first frequency with a frequency shift. For example, 1702 may be performed by antennas 2080, one or more transceivers 2022, cellular baseband processor 2024, antennas 2180, one or more transceivers 2146, CU processor 2112, DU processor 2132, RU processor 2142, or CSI acquisition component 199 of FIGS. 20 and 21. The indication, in some aspects, may be embedded in a backscattered signal from the EH device received at the reader device and/or may be transmitted by the EH device. The indication of the first capability and the second capability received at 1702, in some aspects, may further indicate a configurability of the frequency-spreading and/or frequency-shifting capability. The indication of the frequency-spreading capability, in some aspects, may indicate a sequence associated with the frequency-spreading and/or a distribution or energies among a plurality of frequencies associated with the frequency-spreading capability. The indication of the frequency-shifting capability, in some aspects, may indicate a maximum and/or minimum frequency-shift that the EH device may produce. For example, referring to FIGS. 11 and 12, the base station 1102, the first base station 1202a, or the second base station 1202b may receive an indication of the capability 1106 or capability 1206 indicating a capability of the EH device 1104 or the EH device 1204 to introduce a frequency shift and/or perform a frequency spreading operation.

At 1704, the reader device may transmit an indication of a plurality of frequencies over which to backscatter a first signal at a first frequency at the EH device (e.g., a first EH device). For example, 1704 may be performed by antennas 2080, one or more transceivers 2022, cellular baseband processor 2024, antennas 2180, one or more transceivers 2146, CU processor 2112, DU processor 2132, RU processor 2142, or CSI acquisition component 199 of FIGS. 20 and 21. In some aspects, the plurality of frequencies may be a first frequency band of a plurality of non-overlapping frequency bands and the reader device may, at 1704, transmit one or more indications of one or more frequency bands of a plurality of non-overlapping frequency bands over which to backscatter the first signal for a corresponding one or more EH devices including the first EH device. For example, referring to FIGS. 11, 12, and 13, the base station 1102, the first base station 1202a, or the first reader 1302, may transmit the configuration 1108 or the configuration 1208A to multiple EH devices, e.g., first EH device 1304A, second EH device 1304B, and third EH device 1304C to indicate the non-overlapping frequency bands associated with backscattered signals 1311, 1321, and 1331.

In some aspects, the reader device may, at 1704, transmit an indication of a plurality of frequency bands over which to backscatter a corresponding plurality of signals at particular frequencies for the first EH device, where the plurality of frequency bands may be the same or different frequency bands and the plurality of signals may be associated with a same or different frequency. For example, a set of three different frequencies in a first sub-band of frequencies associated with a channel estimation may be used for a corresponding set of three CW signals. The three different CW signals may be associated with a corresponding frequency shift to a same plurality of frequencies (a same range of frequencies with a same distribution over the frequencies). Alternately, or additionally, a same CW signal may be associated with multiple different frequency shifts and/or frequency spreads to explore multiple frequency sub-bands or portions of the frequency sub-bands based on a same forward channel signal. For example, referring to FIGS. 11, 12, and 14, the base station 1102, the first base station 1202a, or the reader 1402, may transmit the configuration 1108, the configuration 1208A, or configuration 1401 to the EH device 1104, 1204, or 1404 indicating a plurality of frequencies for a plurality of transmitted CW signals, e.g., CW signals 1411 through 1421, and a plurality of sets of frequency spreads and frequency shifts (e.g., $f_{sp}^1$ 1412 and $f_{sh}^1$ 1413 through $f_{sp}^n$ 1422 and $f_{sh}^n$ 1423) for the corresponding plurality of transmitted CW signals.

At 1706, the reader device may transmit a first signal at a first frequency for a backscattering from the (first) EH device over a plurality of frequencies. In some aspects, the first signal may be transmitted based on the indication transmitted at 1704. For example, 1706 may be performed by antennas 2080, one or more transceivers 2022, cellular baseband processor 2024, antennas 2180, one or more transceivers 2146, CU processor 2112, DU processor 2132, RU processor 2142, or CSI acquisition component 199 of FIGS. 20 and 21. In some aspects, the reader device may, at 1706, transmit a plurality of signals (including the first signal) indicated by the indication transmitted at 1704. For example, referring to FIGS. 7, 8, 11, 12 and 14, the reader 702, the first reader 802*a*, the base station 1102, the first base station 1202*a*, or the reader 1402 may transmit, and the EH device 704, 804, 1104, 1204, or 1404 may receive, the first transmission 710 or 810 or the CW signal 1112, 1212, 1411, or 1421.

At 1708, the reader device may receive, from the (first) EH device, a backscatter signal over a plurality of frequencies based on the transmitted signal at the first frequency. For example, 1708 may be performed by antennas 2080, one or more transceivers 2022, cellular baseband processor 2024, antennas 2180, one or more transceivers 2146, CU processor 2112, DU processor 2132, RU processor 2142, or CSI acquisition component 199 of FIGS. 20 and 21. In some aspects, the plurality of frequencies comprises a frequency band with a detectable, or known, backscatter (or backscattering) signal strength (or energy distribution over the plurality of frequencies) from the EH device. The detectable, or known, distribution of energies, in some aspects, may allow the reader device to identify the frequency-dependent function associated with the channel between the reader device and the EH device. The frequency band, in some aspects, may be associated with a flat distribution over the plurality of frequencies. For example, referring to FIGS. 7, 8, 11, and 12, the reader 702, the second reader 802*b*, the base station 1102, or the first base station 1202*a* may receive a backscatter signal 720, 850, 1114, 1214, or 1224.

In some aspects, the reader device may receive, at 1708, one or more additional backscatter signals over one or more additional frequency bands of a plurality of non-overlapping frequency bands based on the transmitted signal at the first frequency at 1706. In some aspects, each of the one or more additional backscatter signals may be received from a corresponding one or more additional EH devices. For example, referring to FIG. 13, the first reader 1302 or a second reader may receive the backscatter signals 1315, 1325, and 1335 (associated with non-overlapping frequency bands) from first EH device 1304A, second EH device 1304B, and third EH device 1304C, respectively. The reader device may receive, at 1708, from an EH device, one or more additional backscatter signals over the plurality of frequencies based on additional signals transmitted at different frequencies for a CSI estimation. For example, referring to FIG. 10, the first reader 1002*a* or the second reader 1002*b* may receive backscatter signals 1065 and 1095 or the backscatter signals 1025 and 1085, respectively.

Based on the backscatter signal(s) received at 1708, the reader device may obtain, at 1710, CSI associated with at least the (first) EH device, e.g., associated with a channel between the reader device and the (first) EH device. For example, 1710 may be performed by antennas 2080, one or more transceivers 2022, cellular baseband processor 2024, antennas 2180, one or more transceivers 2146, CU processor 2112, DU processor 2132, RU processor 2142, or CSI acquisition component 199 of FIGS. 20 and 21. The CSI may be obtained, at 1710, based on a channel estimation and/or measurement made on the backscatter signals received from the (first) EH device. In some aspects, the reader device may obtain the CSI, at 1710, from another reader device over a network to which they both connect based on measurements made at the other reader device on the backscatter signals received at 1708. For example, referring to FIGS. 11 and 12, the base station 1102 or the second base station 1202*b* may receive backscatter signal 1114 or 1214 and perform the channel estimation and/or measurement operation 1116 or 1216, respectively, to obtain CSI for a related channel or first base station 1202*a* may receive CSI 1218 from the second base station 1202*b* after the channel estimation and/or measurement operation 1216.

In some aspects, the reader device may obtain, at 1710, one or more CSI associated with the one or more EH devices based on the backscattering of the first signal from each of the one or more EH devices. For example, referring to FIGS. 11-13, the base station 1102 or the second base station 1202*b* may obtain CSI for channels associated with frequency dependent functions $h_{f1}(\omega)$ 1310, $h_{f2}(\omega)$ 1320, or $h_{f3}(\omega)$ 1330 based on the backscatter signals 1315, 1325, and 1335, respectively, and the second base station 1202*b* may provide the CSI to the first base station 1202*a*. The reader device, at 1710, may also determine and/or obtain a pre-coding matrix for transmitting an energy signal for an EH device based on the backscatter signal from the EH device received via a plurality of antennas of the reader device.

At 1712, the reader device may determine whether to transmit additional CW signals (e.g., whether to perform another iteration of the channel estimation operations) based on a set of criteria. For example, 1712 may be performed by a cellular baseband processor 2024, CU processor 2112, DU processor 2132, RU processor 2142, or CSI acquisition component 199 of FIGS. 20 and 21. In some aspects, the determination may be based on the CSI obtained at 1710, a number of iterations, a number of CW signals transmitted, based on a strength of the backscatter signals, or based on an incremental improvement in the strength of the backscatter signals between a previous iteration and current iteration. If the reader device determines, at 1712, to transmit an additional CW signal (or signals), the reader device may proceed to transmit an additional indication of a configuration associated with the additional CW signal(s) at 1704 or, if a current configuration is acceptable, the reader device may proceed to 1706 to transmit the additional CW signal(s).

If the reader device determines, at 1712, to not transmit additional CW signals, the reader device may, at 1714, transmit at least one energy transfer signal to the (first) EH device. For example, 1714 may be performed by antennas 2080, one or more transceivers 2022, cellular baseband processor 2024, antennas 2180, one or more transceivers 2146, CU processor 2112, DU processor 2132, RU processor 2142, or CSI acquisition component 199 of FIGS. 20 and 21. The energy transfer signal, in some aspects, may further be based on the pre-coding matrix determined and/or obtained at 1710. In some aspects, the reader device may, at 1714, transmit additional energy transfer signals for the one or more additional energy harvesting devices via one or more corresponding frequencies based on a corresponding one or more CSI estimated based on a corresponding backscatter signal of the one or more additional backscatter signals.

Figure 18:
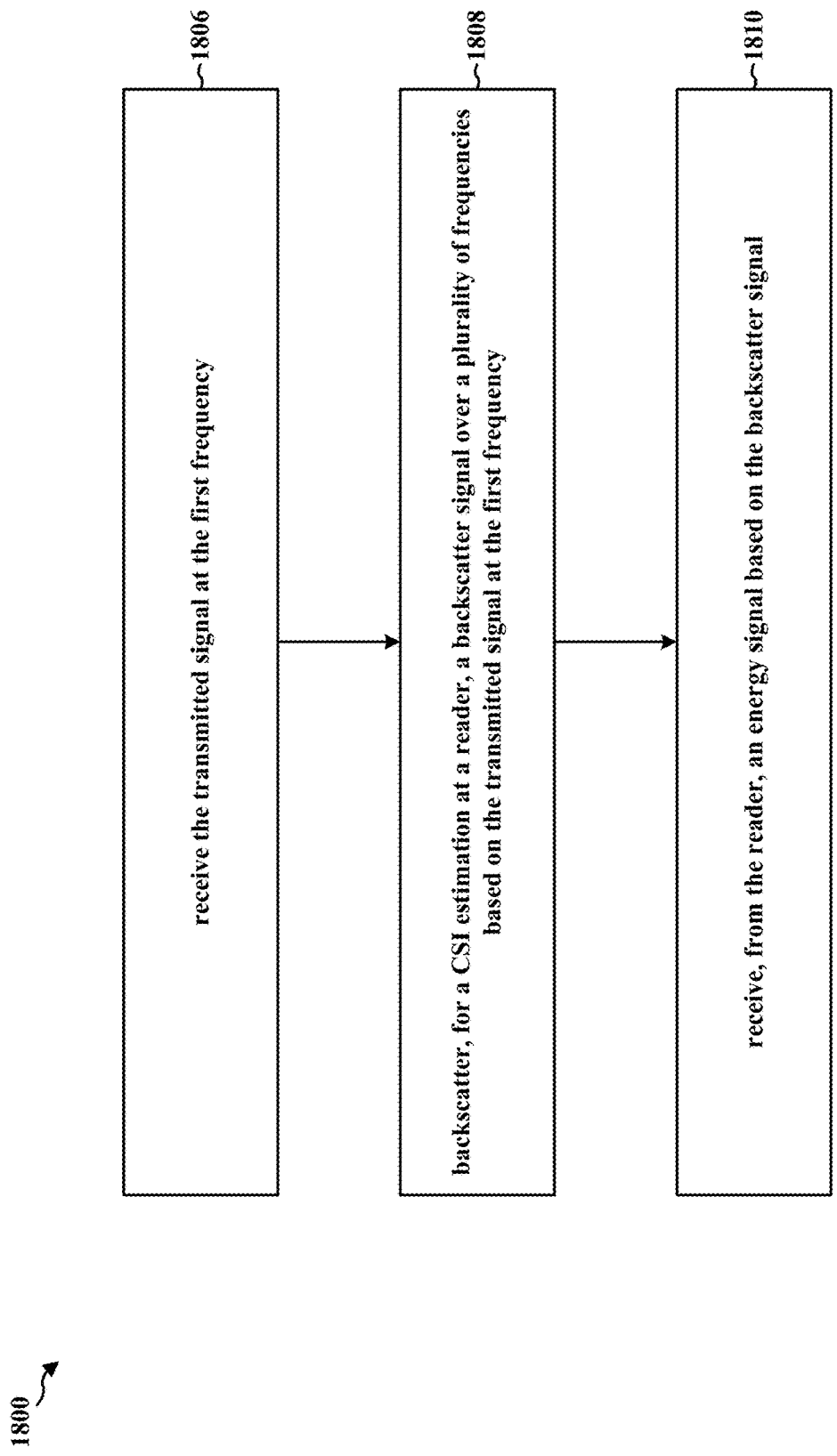
FIG. 18 is a flowchart of a method of wireless communication.

FIG. 18 is a flowchart 1800 of a method of wireless communication. The method may be performed by an EH device (e.g., the UE 104; the RFID tag 404; the power harvesting circuit 500; the EH device 704, 804, 1104, 1204, or 1404; the first EH device 1304A, the second EH device 1304B, or the third EH device 1304C; the apparatus 2004 or 2204). The EH device, in some aspects, may be an RFID tag, an RFIC, a passive/semi-passive IoT device, an active/semi-active IoT device, a backscatter device, or a user equipment capable of an energy harvesting operation. In some aspects, the EH device may transmit, or include in a backscattered signal, an indication of a first (frequency-spreading) capability of the EH device to backscatter a signal associated with at least a first frequency over at least a frequency band comprising a plurality of frequencies and a second (frequency-shifting) capability of the EH device to backscatter the signal associated with at least the first frequency with a frequency shift. The indication of the first capability and the second capability transmitted or indicated, in some aspects, may further indicate a configurability of the frequency-spreading and/or frequency-shifting capability. The indication of the frequency-spreading capability, in some aspects, may indicate a sequence associated with the frequency-spreading and/or a distribution or energies among a plurality of frequencies associated with the frequency-spreading capability. The indication of the frequency-shifting capability, in some aspects, may indicate a maximum and/or minimum frequency-shift that the EH device may produce. For example, referring to FIGS. 11 and 12, an indication of the capability 1106 or capability 1206 may be transmitted or indicated by the EH device 1104 or 1204 to the base station 1102 or to the first base station 1202*a* (or the second base station 1202*b*), respectively, indicating a capability of the EH device 1104 or the EH device 1204 to introduce a frequency shift and/or perform a frequency spreading operation.

Based on the indication of the first and second capability of the EH device, the EH device may receive an indication of a plurality of frequencies over which to backscatter a first signal at a first frequency. In some aspects, the plurality of frequencies may be a first frequency band of a plurality of non-overlapping frequency bands and the EH device may receive an EH-device specific indication that is different from an indication for of one or more frequency bands of a plurality of non-overlapping frequency bands over which to backscatter the first signal for a corresponding one or more EH devices. For example, referring to FIGS. 11, 12, and 13, the EH device 1104, 1204, or the first EH device 1304A may receive, from the base station 1102, the first base station 1202*a*, or the first reader 1302, the configuration 1108 or the configuration 1208A indicating the non-overlapping frequency bands associated with backscatter signals 1114, 1214, 1224, or 1315 in a configuration for multiple EH devices, e.g., the first EH device 1304A, the second EH device 1304B, and the third EH device 1304C.

In some aspects, the EH device may receive an indication of a plurality of frequency bands over which to backscatter a corresponding plurality of signals at particular frequencies, where the plurality of frequency bands may be the same or different frequency bands and the plurality of signals may be associated with a same or different frequency. For example, a set of three different frequencies in a first sub-band of frequencies associated with a channel estimation may be used for a corresponding set of three CW signals. The three different CW signals may be associated with a corresponding frequency shift to a same plurality of frequencies (a same range of frequencies with a same distribution over the frequencies). Alternately, or additionally, a same CW signal may be associated with multiple different frequency shifts and/or frequency spreads to explore multiple frequency sub-bands or portions of the frequency sub-bands based on a same forward channel signal. For example, referring to FIGS. 11, 12, and 14, the EH device 1104, 1204, or 1404 may receive, from the base station 1102, the first base station 1202*a*, or the reader 1402, the configuration 1108, the configuration 1208A, or configuration 1401 indicating a plurality of frequencies for a plurality of transmitted CW signals, e.g., CW signals 1411 through 1421, and a plurality of sets of frequency spreads and frequency shifts (e.g., $f_{sp}^{1}$ 1412 and $f_{sh}^{1}$ 1413 through $f_{sp}^{n}$ 1422 and $f_{sh}^{n}$ 1423) for the corresponding plurality of transmitted CW signals.

At 1806, the EH device may receive a first signal at a first frequency for a backscattering from the (first) EH device over a plurality of frequencies. In some aspects, the first signal may be received based on the received indication of the plurality of frequencies over which to backscatter a first signal at a first frequency. For example, 1806 may be performed by backscatter configuration component 198 of an EH device. In some aspects, the EH device may, at 1806, receive a plurality of signals (including the first signal) indicated by the received indication of the plurality of frequency bands over which to backscatter a corresponding plurality of signals at particular frequencies. For example, referring to FIGS. 7, 8, 11, 12 and 14, the EH device 704, 804, 1104, 1204, or 1404 may receive, the first transmission 710 or 810 or the CW signal 1112, 1212, 1411, or 1421 from a corresponding one of the reader 702, the first reader 802*a*, the base station 1102, the first base station 1202*a*, or the reader 1402 may transmit.

At 1808, the EH device may backscatter a backscatter (or backscattered) signal over a plurality of frequencies based on the signal at the first frequency received at 1806. For example, 1808 may be performed by backscatter configuration component 198 of an EH device. In some aspects, the plurality of frequencies comprises a frequency band with a detectable, or known, backscatter (or backscattering) signal strength (or energy distribution over the plurality of frequencies) from the EH device. The detectable, or known, distribution of energies, in some aspects, may allow the reader device to identify the frequency-dependent function associated with the channel between the reader device and the EH device. The frequency band, in some aspects, may be associated with a flat distribution over the plurality of frequencies. For example, referring to FIGS. 7, 8, 11, and 12, the EH device 704, 804, 1104, 1204, or 1404 may backscatter, and the reader 702, the second reader 802*b*, the base station 1102, the second base station 1202*b*, or the first base station 1202*a* may receive, backscatter signal 720, 850, 1114, 1214, or 1224, respectively. The EH device may backscatter, at 1808, one or more additional backscatter signals over the plurality of frequencies (or other pluralities of frequencies) based on additional signals transmitted at a same, or different, frequencies for a CSI estimation. For example, referring to FIG. 10, the first reader 1002*a* or the second reader 1002*b* may receive backscatter signals 1065 and 1095 or the backscatter signals 1025 and 1085, respectively.

Based on the backscatter (or backscattered) signal(s) backscattered at 1808, an associated reader device may obtain CSI associated with the EH device, e.g., associated with a channel between the reader device and the EH device. The associated reader device may also determine and/or obtain a pre-coding matrix for transmitting an energy signal for an EH device based on the backscatter signal from the EH device received via a plurality of antennas of the reader device.

The EH device may, at 1810, receive at least one energy transfer signal from a reader device. For example, 1810 may be performed by backscatter configuration component 198 of an EH device. In some aspects, the energy transfer signal received at 1810 is at a frequency (or set of frequencies) determined by the reader device to be associated with a highest gain for the channel based on the backscatter (or backscattered) signals backscattered at 1808. The energy transfer signal, in some aspects, may further be based on the pre-coding matrix determined and/or obtained by the reader device based on the backscatter (or backscattered) signals backscattered at 1808.

Figure 19:
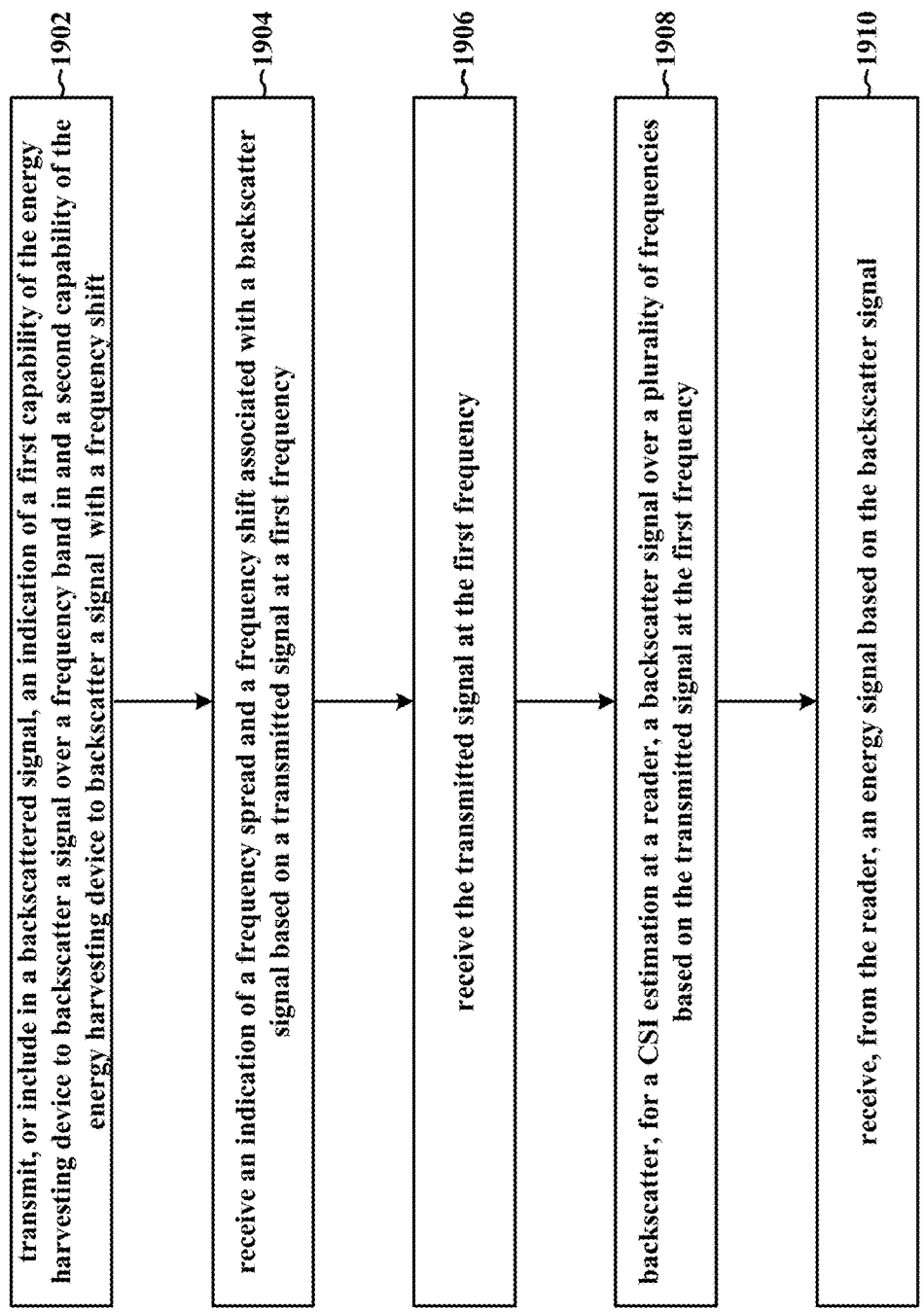
FIG. 19 is a flowchart of a method of wireless communication.

FIG. 19 is a flowchart 1900 of a method of wireless communication. The method may be performed by an EH device (e.g., the UE 104; the RFID tag 404; the power harvesting circuit 500; the EH device 704, 804, 1104, 1204, or 1404; the first EH device 1304A, the second EH device 1304B, or the third EH device 1304C; the apparatus 2004 or 2204). The EH device, in some aspects, may be an RFID tag, an RFIC, a passive/semi-passive IoT device, an active/semi-active IoT device, a backscatter device, or a user equipment capable of an energy harvesting operation. At 1902, the EH device may transmit, or include in a backscattered signal, an indication of a first (frequency-spreading) capability of the EH device to backscatter a signal associated with at least a first frequency over at least a frequency band comprising a plurality of frequencies and a second (frequency-shifting) capability of the EH device to backscatter the signal associated with at least the first frequency with a frequency shift. For example, 1902 may be performed by backscatter configuration component 198 of an EH device. The indication of the first capability and the second capability transmitted or indicated at 1902, in some aspects, may further indicate a configurability of the frequency-spreading and/or frequency-shifting capability. The indication of the frequency-spreading capability, in some aspects, may indicate a sequence associated with the frequency-spreading and/or a distribution or energies among a plurality of frequencies associated with the frequency-spreading capability. The indication of the frequency-shifting capability, in some aspects, may indicate a maximum and/or minimum frequency-shift that the EH device may produce. For example, referring to FIGS. 11 and 12, an indication of the capability 1106 or capability 1206 may be transmitted or indicated by the EH device 1104 or 1204 to the base station 1102 or to the first base station 1202a (or the second base station 1202b), respectively, indicating a capability of the EH device 1104 or the EH device 1204 to introduce a frequency shift and/or perform a frequency spreading operation.

At 1904, the EH device may receive an indication of a plurality of frequencies over which to backscatter a first signal at a first frequency. For example, 1904 may be performed by backscatter configuration component 198 of an EH device. In some aspects, the plurality of frequencies may be a first frequency band of a plurality of non-overlapping frequency bands and the EH device may, at 1904, receive an EH-device specific indication that is different from an indication for of one or more frequency bands of a plurality of non-overlapping frequency bands over which to backscatter the first signal for a corresponding one or more EH devices. For example, referring to FIGS. 11, 12, and 13, the EH device 1104, 1204, or the first EH device 1304A may receive, from the base station 1102, the first base station 1202a, or the first reader 1302, the configuration 1108 or the configuration 1208A indicating the non-overlapping frequency bands associated with backscatter signals 1114, 1214, 1224, or 1315 in a configuration for multiple EH devices, e.g., the first EH device 1304A, the second EH device 1304B, and the third EH device 1304C.

In some aspects, the EH device may, at 1904, receive an indication of a plurality of frequency bands over which to backscatter a corresponding plurality of signals at particular frequencies, where the plurality of frequency bands may be the same or different frequency bands and the plurality of signals may be associated with a same or different frequency. For example, a set of three different frequencies in a first sub-band of frequencies associated with a channel estimation may be used for a corresponding set of three CW signals. The three different CW signals may be associated with a corresponding frequency shift to a same plurality of frequencies (a same range of frequencies with a same distribution over the frequencies). Alternately, or additionally, a same CW signal may be associated with multiple different frequency shifts and/or frequency spreads to explore multiple frequency sub-bands or portions of the frequency sub-bands based on a same forward channel signal. For example, referring to FIGS. 11, 12, and 14, the EH device 1104, 1204, or 1404 may receive, from the base station 1102, the first base station 1202a, or the reader 1402, the configuration 1108, the configuration 1208A, or configuration 1401 indicating a plurality of frequencies for a plurality of transmitted CW signals, e.g., CW signals 1411 through 1421, and a plurality of sets of frequency spreads and frequency shifts (e.g., $f_{sp}^1$ 1412 and $f_{sh}^1$ 1413 through $f_{sp}^n$ 1422 and $f_{sh}^n$ 1423) for the corresponding plurality of transmitted CW signals.

At 1906, the EH device may receive a first signal at a first frequency for a backscattering from the (first) EH device over a plurality of frequencies. In some aspects, the first signal may be received based on the indication received at 1904. For example, 1906 may be performed by backscatter configuration component 198 of an EH device. In some aspects, the EH device may, at 1906, receive a plurality of signals (including the first signal) indicated by the indication received at 1904. For example, referring to FIGS. 7, 8, 11, 12 and 14, the EH device 704, 804, 1104, 1204, or 1404 may receive, the first transmission 710 or 810 or the CW signal 1112, 1212, 1411, or 1421 from a corresponding one of the reader 702, the first reader 802a, the base station 1102, the first base station 1202a, or the reader 1402 may transmit.

At 1908, the EH device may backscatter a backscatter (or backscattered) signal over a plurality of frequencies based on the signal at the first frequency received at 1906. For example, 1908 may be performed by backscatter configuration component 198 of an EH device. In some aspects, the plurality of frequencies comprises a frequency band with a detectable, or known, backscatter (or backscattering) signal strength (or energy distribution over the plurality of frequencies) from the EH device. The detectable, or known, distribution of energies, in some aspects, may allow the reader device to identify the frequency-dependent function associated with the channel between the reader device and the EH device. The frequency band, in some aspects, may be associated with a flat distribution over the plurality of frequencies. For example, referring to FIGS. 7, 8, 11, and 12, the EH device 704, 804, 1104, 1204, or 1404 may backscatter, and the reader 702, the second reader 802b, the base station 1102, the second base station 1202b, or the first base station 1202a may receive, backscatter signal 720, 850, 1114, 1214, or 1224, respectively. The EH device may backscatter, at 1908, one or more additional backscatter signals over the plurality of frequencies (or other pluralities of frequencies) based on additional signals transmitted at a same, or different, frequencies for a CSI estimation. For example, referring to FIG. 10, the first reader 1002a or the second reader 1002b may receive backscatter signals 1065 and 1095 or the backscatter signals 1025 and 1085, respectively.

Based on the backscatter (or backscattered) signal(s) backscattered at 1908, an associated reader device may obtain CSI associated with the EH device, e.g., associated with a channel between the reader device and the EH device. The associated reader device may also determine and/or obtain a pre-coding matrix for transmitting an energy signal for an EH device based on the backscatter signal from the EH device received via a plurality of antennas of the reader device.

The EH device may, at 1910, receive at least one energy transfer signal from a reader device. For example, 1910 may be performed by backscatter configuration component 198 of an EH device. In some aspects, the energy transfer signal received at 1910 is at a frequency (or set of frequencies) determined by the reader device to be associated with a highest gain for the channel based on the backscatter (or backscattered) signals backscattered at 1908. The energy transfer signal, in some aspects, may further be based on the pre-coding matrix determined and/or obtained by the reader device based on the backscatter (or backscattered) signals backscattered at 1908.

Figure 20:
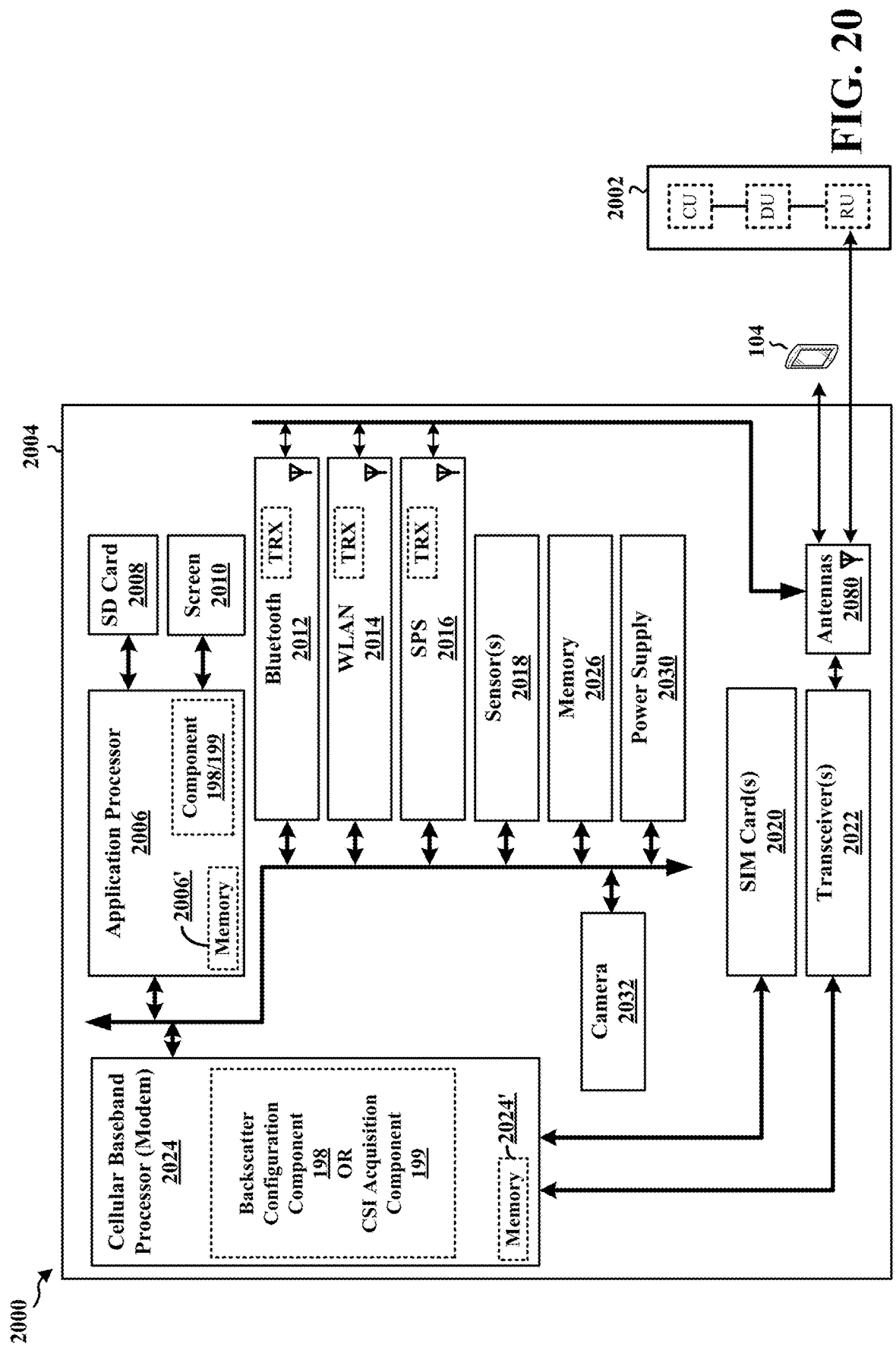
FIG. 20 is a diagram illustrating an example of a hardware implementation for an example apparatus and/or network entity.

FIG. 20 is a diagram 2000 illustrating an example of a hardware implementation for an apparatus 2004. The apparatus 2004 may be a UE, a component of a UE, or may implement UE functionality. In some aspects, the apparatus 2004 may include a cellular baseband processor 2024 (also referred to as a modem) coupled to one or more transceivers 2022 (e.g., cellular RF transceiver). The cellular baseband processor 2024 may include on-chip memory 2024'. In some aspects, the apparatus 2004 may further include one or more subscriber identity modules (SIM) cards 2020 and an application processor 2006 coupled to a secure digital (SD) card 2008 and a screen 2010. The application processor 2006 may include on-chip memory 2006'. In some aspects, the apparatus 2004 may further include a Bluetooth module 2012, a WLAN module 2014, an SPS module 2016 (e.g., GNSS module), one or more sensor modules 2018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2026, a power supply 2030, and/or a camera 2032. The Bluetooth module 2012, the WLAN module 2014, and the SPS module 2016 may include an on-chip transceiver (TRX) (or in some cases, just a receiver (RX)). The Bluetooth module 2012, the WLAN module 2014, and the SPS module 2016 may include their own dedicated antennas and/or utilize the antennas 2080 for communication. The cellular baseband processor 2024 communicates through the transceiver(s) 2022 via one or more antennas 2080 with the UE 104 and/or with an RU associated with a network entity 2002. The cellular baseband processor 2024 and the application processor 2006 may each include a computer-readable medium/memory 2024', 2006', respectively. The additional memory modules 2026 may also be considered a computer-readable medium/memory. Each computer-readable medium/memory 2024', 2006', 2026 may be non-transitory. The cellular baseband processor 2024 and the application processor 2006 are each responsible for general processing, including the execution of software stored on the computer-readable medium/memory. The software, when executed by the cellular baseband processor 2024/application processor 2006, causes the cellular baseband processor 2024/application processor 2006 to perform the various functions described supra. The computer-readable medium/memory may also be used for storing data that is manipulated by the cellular baseband processor 2024/application processor 2006 when executing software. The cellular baseband processor 2024/application processor 2006 may be a component of the UE 350 and may include the memory 360 and/or at least one of the TX processor 368, the RX processor 356, and the controller/processor 359. In one configuration, the apparatus 2004 may be a processor chip (modem and/or application) and include just the cellular baseband processor 2024 and/or the application processor 2006, and in another configuration, the apparatus 2004 may be the entire UE (e.g., see UE 350 of FIG. 3) and include the additional modules of the apparatus 2004.

As discussed supra, the backscatter configuration component 198 that may be configured to receive a transmitted signal at a first frequency and backscatter, for a CSI estimation at a reader, a backscatter signal over a plurality of frequencies based on the transmitted signal at the first frequency. The backscatter configuration component 198 may further be configured to receive, from the reader, an energy signal based on the backscatter signal. As discussed supra, the CSI acquisition component 199 may be configured to receive, from an EH device, a backscatter signal over a plurality of frequencies based on a transmitted signal at a first frequency. The CSI acquisition component 199 may also be configured to transmit an energy signal for the EH device via at least one frequency based on a CSI estimated based on the backscatter signal. The CSI acquisition component 199 may be configured to transmit a first signal at a first frequency for a backscattering from an energy harvesting device over a plurality of frequencies. The CSI acquisition component 199 may also be configured to obtain CSI based on the backscattering of the first signal. The backscatter configuration component 198 and/or the CSI acquisition component 199 may be within the cellular baseband processor 2024, the application processor 2006, or both the cellular baseband processor 2024 and the application processor 2006. The backscatter configuration component 198 and/or the CSI acquisition component 199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2004 may include a variety of components configured for various functions. In one configuration, the apparatus 2004, and in particular the cellular baseband processor 2024 and/or the application processor 2006, may include means for receiving, from an energy harvesting device, a backscatter signal over a plurality of frequencies based on a transmitted signal at a first frequency. The apparatus 2004, and in particular the cellular baseband processor 2024 and/or the application processor 2006, may include means for transmitting an energy signal for the energy harvesting device via at least one frequency based on a CSI estimated based on the backscatter signal. The apparatus 2004, and in particular the cellular baseband processor 2024 and/or the application processor 2006, may include means for receiving one or more additional backscatter signals over one or more additional frequency bands of the plurality of non-overlapping frequency bands based on the transmitted signal at the first frequency. The apparatus 2004, and in particular the cellular baseband processor 2024 and/or the application processor 2006, may include means for transmitting additional energy signals for the one or more additional energy harvesting devices via one or more corresponding frequencies based on a corresponding one or more CSI estimated based on a corresponding backscatter signal of the one or more additional backscatter signals. The apparatus 2004, and in particular the cellular baseband processor 2024 and/or the application processor 2006, may include means for receiving, from the energy harvesting device, one or more additional backscatter signals over the plurality of frequencies based on the transmitted signal at the first frequency. The apparatus 2004, and in particular the cellular baseband processor 2024 and/or the application processor 2006, may include means for determining a precoding matrix for transmitting the energy signal for the energy harvesting device based on the backscatter signal received via the plurality of antennas. The apparatus 2004, and in particular the cellular baseband processor 2024 and/or the application processor 2006, may include means for iteratively, until a set of criteria is met, receiving an additional backscatter signal via a second plurality of frequencies based on an additional signal at an additional frequency in an additional plurality of frequencies associated with a last-received backscatter signal. The apparatus 2004, and in particular the cellular baseband processor 2024 and/or the application processor 2006, may include means for transmitting the transmitted signal at the first frequency. The apparatus 2004, and in particular the cellular baseband processor 2024 and/or the application processor 2006, may include means for transmitting an indication of a frequency spread and a frequency shift associated with the backscatter signal based on the transmitted signal at the first frequency. The apparatus 2004, and in particular the cellular baseband processor 2024 and/or the application processor 2006, may include means for transmitting a first signal at a first frequency for a backscattering from an energy harvesting device over a plurality of frequencies. The apparatus 2004, and in particular the cellular baseband processor 2024 and/or the application processor 2006, may include means for obtaining CSI based on the backscattering of the first signal. The apparatus 2004, and in particular the cellular baseband processor 2024 and/or the application processor 2006, may include means for transmitting one or more additional signals at one or more additional frequencies based on the obtained CSI. The apparatus 2004, and in particular the cellular baseband processor 2024 and/or the application processor 2006, may include means for receiving an indication of a first capability of the energy harvesting device to backscatter a signal associated with at least the first frequency over at least a frequency band comprising the plurality of frequencies and a second capability of the energy harvesting device to backscatter a signal associated with at least the first frequency with a frequency shift. The apparatus 2004, and in particular the cellular baseband processor 2024 and/or the application processor 2006, may include means for transmitting an indication of the plurality of frequencies over which to backscatter the first signal. The apparatus 2004, and in particular the cellular baseband processor 2024 and/or the application processor 2006, may include means for transmitting one or more indications of one or more frequency bands of the plurality of non-overlapping frequency bands over which to backscatter the first signal for a corresponding one or more energy harvesting devices. The apparatus 2004, and in particular the cellular baseband processor 2024 and/or the application processor 2006, may include means for obtaining one or more CSI associated with the one or more energy harvesting devices based on the backscattering of the first signal from each of the one or more energy harvesting devices. The apparatus 2004, and in particular the cellular baseband processor 2024 and/or the application processor 2006, may include means for receiving a transmitted signal at a first frequency. The apparatus 2004, and in particular the cellular baseband processor 2024 and/or the application processor 2006, may include means for backscattering, for a CSI estimation at a reader, a backscatter signal over a plurality of frequencies based on the transmitted signal at the first frequency. The apparatus 2004, and in particular the cellular baseband processor 2024 and/or the application processor 2006, may include means for receiving, from the reader, an energy signal based on the backscatter signal. The apparatus 2004, and in particular the cellular baseband processor 2024 and/or the application processor 2006, may include means for transmitting, or including in a previously backscattered signal, an indication of a first capability of the energy harvesting device to backscatter a signal associated with at least the first frequency over at least a frequency band comprising the plurality of frequencies and a second capability of the energy harvesting device to backscatter a signal associated with at least the first frequency with a frequency shift. The apparatus 2004, and in particular the cellular baseband processor 2024 and/or the application processor 2006, may include means for receiving an indication of the plurality of frequencies over which to backscatter the transmitted signal at the first frequency. The means may be the backscatter configuration component 198 and/or the CSI acquisition component 199 of the apparatus 2004 configured to perform the functions recited by the means or as described in relation to FIGS. 15-19. As described supra, the apparatus 2004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 21:
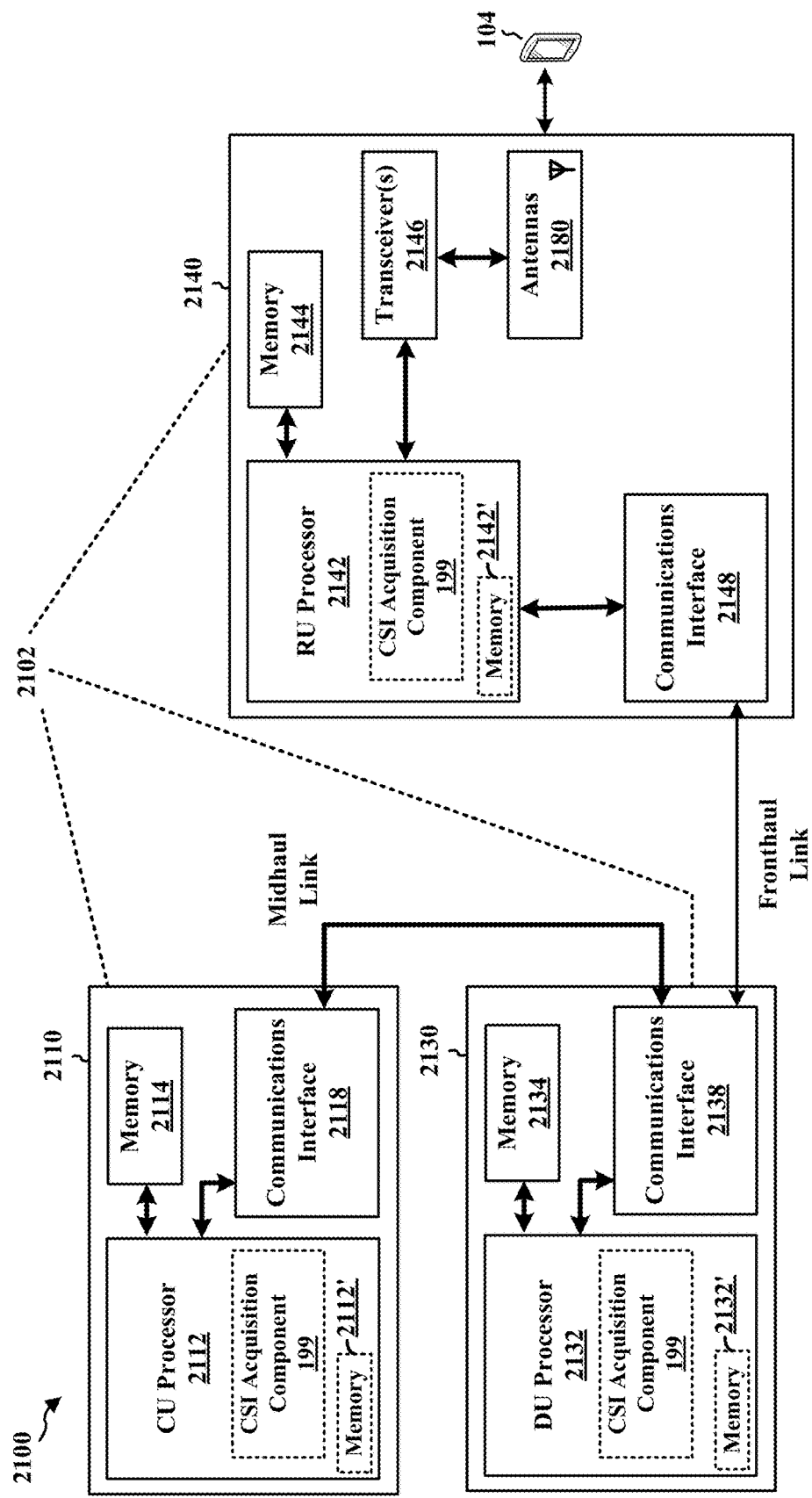
FIG. 21 is a diagram illustrating an example of a hardware implementation for an example network entity.

FIG. 21 is a diagram 2100 illustrating an example of a hardware implementation for a network entity 2102. The network entity 2102 may be a BS, a component of a BS, or may implement BS functionality. The network entity 2102 may include at least one of a CU 2110, a DU 2130, or an RU 2140. For example, depending on the layer functionality handled by the component 199, the network entity 2102 may include the CU 2110; both the CU 2110 and the DU 2130; each of the CU 2110, the DU 2130, and the RU 2140; the DU 2130; both the DU 2130 and the RU 2140; or the RU 2140. The CU 2110 may include a CU processor 2112. The CU processor 2112 may include on-chip memory 2112'. In some aspects, the CU 2110 may further include additional memory modules 2114 and a communications interface 2118. The CU 2110 communicates with the DU 2130 through a midhaul link, such as an F1 interface. The DU 2130 may include a DU processor 2132. The DU processor 2132 may include on-chip memory 2132'. In some aspects, the DU 2130 may further include additional memory modules 2134 and a communications interface 2138. The DU 2130 communicates with the RU 2140 through a fronthaul link. The RU 2140 may include an RU processor 2142. The RU processor 2142 may include on-chip memory 2142'. In some aspects, the RU 2140 may further include additional memory modules 2144, one or more transceivers 2146, antennas 2180, and a communications interface 2148. The RU 2140 communicates with the UE 104. The on-chip memory 2112', 2132', 2142' and the additional memory modules 2114, 2134, 2144 may each be considered a computer-readable medium/memory. Each computer-readable medium/memory may be non-transitory. Each of the processors 2112, 2132, 2142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the CSI acquisition component 199 may be configured to receive, from an EH device, a backscatter signal over a plurality of frequencies based on a transmitted signal at a first frequency. The CSI acquisition component 199 may also be configured to transmit an energy signal for the EH device via at least one frequency based on a CSI estimated based on the backscatter signal. The CSI acquisition component 199 may be configured to transmit a first signal at a first frequency for a backscattering from an energy harvesting device over a plurality of frequencies. The CSI acquisition component 199 may also be configured to obtain CSI based on the backscattering of the first signal. The component 199 may be within one or more processors of one or more of the CU 2110, DU 2130, and the RU 2140. The CSI acquisition component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2102 may include a variety of components configured for various functions. In one configuration, the network entity 2102 may include means for receiving, from an energy harvesting device, a backscatter signal over a plurality of frequencies based on a transmitted signal at a first frequency. The network entity 2102 may include means for transmitting an energy signal for the energy harvesting device via at least one frequency based on a CSI estimated based on the backscatter signal. The network entity 2102 may include means for receiving one or more additional backscatter signals over one or more additional frequency bands of the plurality of non-overlapping frequency bands based on the transmitted signal at the first frequency. The network entity 2102 may include means for transmitting additional energy signals for the one or more additional energy harvesting devices via one or more corresponding frequencies based on a corresponding one or more CSI estimated based on a corresponding backscatter signal of the one or more additional backscatter signals. The network entity 2102 may include means for receiving, from the energy harvesting device, one or more additional backscatter signals over the plurality of frequencies based on the transmitted signal at the first frequency. The network entity 2102 may include means for determining a precoding matrix for transmitting the energy signal for the energy harvesting device based on the backscatter signal received via the plurality of antennas. The network entity 2102 may include means for iteratively, until a set of criteria is met, receiving an additional backscatter signal via a second plurality of frequencies based on an additional signal at an additional frequency in an additional plurality of frequencies associated with a last-received backscatter signal. The network entity 2102 may include means for transmitting the transmitted signal at the first frequency. The network entity 2102 may include means for transmitting an indication of a frequency spread and a frequency shift associated with the backscatter signal based on the transmitted signal at the first frequency. The network entity 2102 may include means for transmitting a first signal at a first frequency for a backscattering from an energy harvesting device over a plurality of frequencies. The network entity 2102 may include means for obtaining CSI based on the backscattering of the first signal. The network entity 2102 may include means for transmitting one or more additional signals at one or more additional frequencies based on the obtained CSI. The network entity 2102 may include means for receiving an indication of a first capability of the energy harvesting device to backscatter a signal associated with at least the first frequency over at least a frequency band comprising the plurality of frequencies and a second capability of the energy harvesting device to backscatter a signal associated with at least the first frequency with a frequency shift. The network entity 2102 may include means for transmitting an indication of the plurality of frequencies over which to backscatter the first signal. The network entity 2102 may include means for transmitting one or more indications of one or more frequency bands of the plurality of non-overlapping frequency bands over which to backscatter the first signal for a corresponding one or more energy harvesting devices. The network entity 2102 may include means for obtaining one or more CSI associated with the one or more energy harvesting devices based on the backscattering of the first signal from each of the one or more energy harvesting devices. The means may be the CSI acquisition component 199 of the network entity 2102 configured to perform the functions recited by the means or described in relation to any of FIGS. 15-17. As described supra, the network entity 2102 may include the TX processor 316, the RX processor 370, and the controller/processor 375. As such, in one configuration, the means may be the TX processor 316, the RX processor 370, and/or the controller/processor 375 configured to perform the functions recited by the means.

Figure 22:
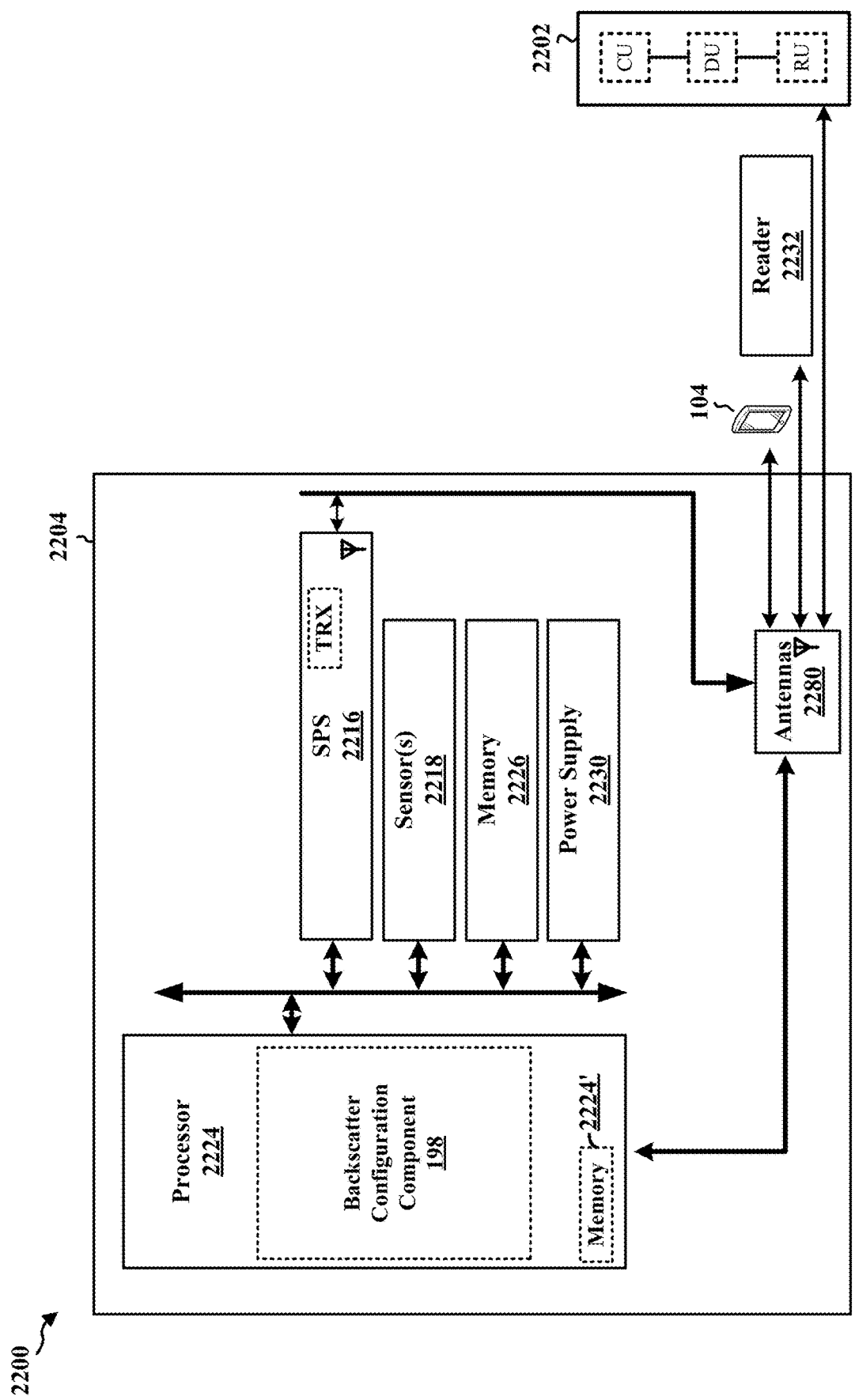
FIG. 22 is a diagram illustrating an example of a hardware implementation for an example apparatus.

FIG. 22 is a diagram 2200 illustrating an example of a hardware implementation for an apparatus 2204. The apparatus may be an energy harvesting device (e.g., a backscatter device, a tag, etc.). The apparatus may include aspects described in connection with FIGS. 4 and 5, among other examples. In some aspects, the apparatus 2204 may be a UE, a component of a UE, or may implement UE functionality, similar to the apparatus described in connection with FIG. 20. In some aspects, the apparatus 2204 may include a processor 2224 coupled to one or more antennas 2280. The processor 2224 may provide an energy harvesting component, such as described in connection with FIGS. 4 and 5. The processor 2224 may include memory 2224'. In some aspects, the apparatus 2204 may further include an SPS module 2216 (e.g., GNSS module), one or more sensor modules 2218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2226, and/or a power supply or storage device 2230. The SPS module 2216 may include an on-chip transceiver (TRX) (or in some cases, just a receiver (RX)). The SPS module 2216 may include its own dedicated antennas and/or utilize the antennas 2280 for communication. The processor 2224 receives a signal, such as a backscatter signal, and harvest energy from the receive signal. The processor 2224 receives the signal via the one or more antennas 2280 from the UE 104, reader 2232 and/or with an RU associated with a network entity 2202. The processor 2224 may include a computer-readable medium/memory 2224'. The additional memory modules 2226 may also be considered a computer-readable medium/memory. Each computer-readable medium/memory 2224', 2226 may be non-transitory. The processor 2224 is responsible for general processing, including the execution of software stored on the computer-readable medium/memory. The software, when executed by the processor 2224, causes the processor 2224 to perform the various functions described supra. The computer-readable medium/memory may also be used for storing data that is manipulated by the processor 2224 when executing software. In some aspects, the processor 2224 may be a component of the UE 350, or other energy harvesting device, and may include the memory 360 and/or at least one of the TX processor 368, the RX processor 356, and the controller/processor 359. In one configuration, the apparatus 2204 may be an energy harvesting device. In other configurations, the apparatus 2204 may be an energy harvesting component of a device.

As discussed supra, the backscatter configuration component 198 that may be configured to receive a transmitted signal at a first frequency and backscatter, for a CSI estimation at a reader, a backscatter signal over a plurality of frequencies based on the transmitted signal at the first frequency. The backscatter configuration component 198 may further be configured to receive, from the reader, an energy signal based on the backscatter signal. The backscatter configuration component 198 may be within the processor 2224. The backscatter configuration component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2204 may include a variety of components configured for various functions. In one configuration, the apparatus 2204, and in particular the processor 2224, may include means for receiving a transmitted signal at a first frequency. The apparatus 2204, and in particular the processor 2224, may include means for backscattering, for a CSI estimation at a reader, a backscatter signal over a plurality of frequencies based on the transmitted signal at the first frequency. The apparatus 2204, and in particular the processor 2224, may include means for receiving, from the reader, an energy signal based on the backscatter signal. The apparatus 2204, and in particular the processor 2224, may include means for transmitting, or including in a previously backscattered signal, an indication of a first capability of the energy harvesting device to backscatter a signal associated with at least the first frequency over at least a frequency band comprising the plurality of frequencies and a second capability of the energy harvesting device to backscatter a signal associated with at least the first frequency with a frequency shift. The apparatus 2204, and in particular the processor 2224, may include means for receiving an indication of the plurality of frequencies over which to backscatter the transmitted signal at the first frequency. The means may be the backscatter configuration component 198 of the apparatus 2204 configured to perform the functions recited by the means or as described in relation to FIGS. 18 and 19. As described supra, in some aspects, the apparatus 2204 may include the TX processor 368, the RX processor 356, and the controller/processor 359. As such, in one configuration, the means may be the TX processor 368, the RX processor 356, and/or the controller/processor 359 configured to perform the functions recited by the means. In some aspects, the means may include the processor 2224 and/or the antennas 2280.

Some aspects of the disclosure provide a method and apparatus for obtaining a CSI (e.g., performing a channel estimation and/or measurement) for a channel associated with an energy transfer signal from a reader to an RFID tag through frequency spreading and shifting at the RFID tag. For example, a first reader may transmit a continuous wave signal at a first frequency in a first frequency band (or sub-band) that is backscattered by an RFID tag with a frequency shift and spread (such that the first frequency, or the first frequency band, is not included in, or overlapping with, a frequency range of the backscattered signal) and received by one of the first reader or a second reader associated with the first reader for channel estimation. After receiving one or more backscatter signals based on one or more backscattered signals, the reader receiving the one or more backscatter signals (e.g., the first reader in a monostatic scenario or the second reader in a bistatic scenario), in some aspects, may determine a frequency to use for an energy transfer signal and transmit energy via the selected frequency.

The method and apparatus, in some aspects, of the disclosure may avoid problems associated with measuring a backscatter signal based on a backscattered signal at a same frequency as a CSI-RS as discussed above. Various aspects relate generally to energy harvesting. Some aspects more specifically relate to identifying optimized parameters (e.g., related to frequency and beamforming) for WET, WPT, and/or WIT. The disclosure provides for channel estimation without additional undue energy expenditures at an EH device associated with the channel estimation and for improved energy (or information) transfer using optimized WET, WPT, and/or WIT parameters.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a reader device, including receiving, from an energy harvesting device, a backscatter signal over a plurality of frequencies based on a transmitted signal at a first frequency and transmitting an energy signal for the energy harvesting device via at least one frequency based on a channel state information (CSI) estimated based on the backscatter signal.

Aspect 2 is the method of aspect 1, where transmitting the energy signal includes transmitting energy over a channel with a largest gain associated with the plurality of frequencies.

Aspect 3 is the method of any of aspects 1 and 2, where the plurality of frequencies includes a frequency band with a detectable backscatter signal strength from the energy harvesting device.

Aspect 4 is the method of aspect 3, where the frequency band does not include the first frequency.

Aspect 5 is the method of any of aspects 1 to 4, where the plurality of frequencies is a first frequency band in a plurality of non-overlapping frequency bands, the method further including receiving one or more additional backscatter signals, from a corresponding one or more additional energy harvesting devices, over one or more additional frequency bands of the plurality of non-overlapping frequency bands based on the transmitted signal at the first frequency and transmitting additional energy signals for the one or more additional energy harvesting devices via one or more corresponding frequencies based on a corresponding one or more CSI estimated based on a corresponding backscatter signal of the one or more additional backscatter signals.

Aspect 6 is the method of aspect 5, where the one or more additional energy harvesting devices are configured to backscatter over the one or more additional frequency bands by at least one of the reader or a device that transmits the transmitted signal at the first frequency.

Aspect 7 is the method of any of aspects 1 to 6, further including receiving, from the energy harvesting device, one or more additional backscatter signals over the plurality of frequencies based on one or more transmitted signals at a corresponding one or more additional frequencies, where the CSI is further estimated based on the one or more additional backscatter signals.

Aspect 8 is the method of any of aspects 1 to 7, where receiving the backscatter signal includes receiving the backscatter signal via a plurality of antennas, the method further including determining a precoding matrix for transmitting the energy signal for the energy harvesting device based on the backscatter signal received via the plurality of antennas, where transmitting the energy signal includes using the precoding matrix to transmit the energy signal.

Aspect 9 is the method of any of aspects 1 to 3, iteratively, until a set of criteria is met, receiving an additional backscatter signal via a second plurality of frequencies based on an additional signal at an additional frequency in an additional plurality of frequencies associated with a last-received backscatter signal, where the additional frequency is based on an additional CSI estimation based on the last-received backscatter signal, and where the at least one frequency used to transmit energy for the energy harvesting device is further based on a set of additional CSI estimations associated with the additional backscatter signal received during a set of iterations performed before meeting the set of criteria.

Aspect 10 is the method of any of aspects 1 to 9, further including transmitting the transmitted signal at the first frequency.

Aspect 11 is the method of any of aspects 1 to 10, further including transmitting an indication of a frequency spread and a frequency shift associated with the backscatter signal based on the transmitted signal at the first frequency.

Aspect 12 is a method of wireless communication at a EH device, including receiving a transmitted signal at a first frequency; backscattering, for a CSI estimation at a reader, a backscatter signal over a plurality of frequencies based on the transmitted signal at the first frequency; and receiving, from the reader, an energy signal based on the backscatter signal.

Aspect 13 is the method of aspect 12, further including transmitting, or including in a previously backscattered signal, an indication of a first capability of the energy harvesting device to backscatter a received signal associated with at least the first frequency over at least a frequency band including the plurality of frequencies and a second capability of the energy harvesting device to backscatter the received signal associated with at least the first frequency with a frequency shift.

Aspect 14 is the method of any of aspects 12 or 13, further including receiving an indication of the plurality of frequencies over which to backscatter the transmitted signal at the first frequency.

Aspect 15 is the method of any of aspects 12 to 14, where backscattering the backscatter signal includes backscattering the backscatter signal over the plurality of frequencies with a detectable backscatter signal strength.

Aspect 16 is the method of aspect 15, where the plurality of frequencies does not include the first frequency.

Aspect 17 is the method of any of aspects 12 to 16, where the energy harvesting device is one of a passive IoT device, a backscatter device, or an RFIC.

Aspect 18 is a method of wireless communication at a reader device, including transmitting a first signal at a first frequency for a backscattering from an energy harvesting device over a plurality of frequencies; and obtaining CSI based on the backscattering of the first signal.

Aspect 19 is the method of aspect 18, further including transmitting one or more additional signals at one or more additional frequencies based on the obtained CSI.

Aspect 20 is the method of any of aspects 18 or 19, further including receiving an indication of a first capability of the energy harvesting device to backscatter a received signal associated with at least the first frequency over at least a frequency band including the plurality of frequencies and a second capability of the energy harvesting device to backscatter the received signal associated with at least the first frequency with a frequency shift; and transmitting an indication of the plurality of frequencies over which to backscatter the first signal.

Aspect 21 is the method of aspect 1, where the plurality of frequencies is a first frequency band of a plurality of non-overlapping frequency bands, the method further including transmitting one or more indications of one or more frequency bands of the plurality of non-overlapping frequency bands over which to backscatter the first signal for a corresponding one or more energy harvesting devices; and obtaining one or more CSI associated with the one or more energy harvesting devices based on the backscattering of the first signal from each of the one or more energy harvesting devices.

Aspect 22 is an apparatus for wireless communication at a device including a memory and at least one processor coupled to the memory and, based at least in part on information stored in the memory, the at least one processor is configured to implement any of aspects 1 to 21.

Aspect 23 is the method of aspect 22, further including a transceiver or an antenna coupled to the at least one processor.

Aspect 24 is an apparatus for wireless communication at a device including means for implementing any of aspects 1 to 21.

Aspect 25 is a computer-readable medium (e.g., a non-transitory computer-readable medium) storing computer executable code, where the code when executed by a processor causes the processor to implement any of aspects 1 to 21.

What is claimed is:

1. An apparatus for wireless communication at a reader device, comprising:
   memory; and
   at least one processor coupled to the memory and, based at least in part on information stored in the memory, the at least one processor is configured to:
   receive, from an energy harvesting device and based on a transmitted signal at a first frequency, a backscatter signal over a range of frequencies in a plurality of frequencies, wherein the range of frequencies is based on a configured frequency shift and a configured frequency spread introduced by a backscattering operation at the energy harvesting device;
   determine, based on the backscatter signal, a gain associated with each of multiple frequencies in the range of frequencies;
   select, based on the gain associated with each of the multiple frequencies, at least one frequency to use to transfer energy to the energy harvesting device; and
   transmit, using the at least one frequency, an energy signal for the energy harvesting device.

2. The apparatus of claim 1, wherein transmitting the energy signal comprises transmitting the energy over a frequency with a largest gain associated with the plurality of frequencies.

3. The apparatus of claim 1, wherein the range of frequencies does not include the first frequency.

4. The apparatus of claim 1, wherein the range of frequencies is a first frequency band in a plurality of non-overlapping frequency bands, and the at least one processor is further configured to:
   receive one or more additional backscatter signals, from a corresponding one or more additional energy harvesting devices, over a corresponding one or more additional frequency bands of the plurality of non-overlapping frequency bands based on the transmitted signal at the first frequency and a corresponding one or more configured frequency shifts and a corresponding one or more configured frequency spreads introduced by a corresponding one or more backscattering operations at the corresponding one or more additional energy harvesting devices; and
   transmit additional energy signals for the corresponding one or more additional energy harvesting devices via one or more corresponding frequencies based on a corresponding one or more CSI estimated based on a corresponding backscatter signal of the one or more additional backscatter signals.

5. The apparatus of claim 4, wherein the corresponding one or more additional energy harvesting devices are configured with the corresponding one or more configured frequency shifts and the corresponding one or more configured frequency spreads by at least one of the reader device or a device that transmits the transmitted signal at the first frequency.

6. The apparatus of claim 1, wherein the at least one processor is further configured to:
   receive, from the energy harvesting device, one or more additional backscatter signals over one more additional ranges of frequencies in the plurality of frequencies based on one or more transmitted signals at a corresponding one or more additional frequencies; and
   determine, based on the one or more additional backscatter signals, an additional gain associated with each of multiple additional frequencies in the plurality of frequencies, wherein to select the at least one frequency, the at least one processor is configured to select the at least one frequency further based on the gain associated with each of the multiple additional frequencies.

7. The apparatus of claim 1, wherein to receive the backscatter signal, the at least one processor is configured to receive the backscatter signal via a plurality of antennas, and the at least one processor is further configured to:
   determine a precoding matrix for transmitting the energy signal for the energy harvesting device based on the backscatter signal received via the plurality of antennas, wherein the at least one processor configured to transmit the energy signal is configured to transmit the energy signal using the precoding matrix.

8. The apparatus of claim 1, wherein the at least one processor is further configured to:
   iteratively, until a set of criteria is met, receive an additional backscatter signal via a second plurality of frequencies based on an additional signal at an additional frequency in an additional plurality of frequencies associated with a last-received backscatter signal, wherein the additional frequency is based on an additional CSI estimation based on the last-received backscatter signal, and wherein the at least one frequency used to transmit energy for the energy harvesting device is further based on a set of additional CSI estimations associated with the additional backscatter signal received during a set of iterations performed before meeting the set of criteria.

9. The apparatus of claim 1, wherein the at least one processor is further configured to:

transmit the transmitted signal at the first frequency.

10. The apparatus of claim 1, wherein the at least one processor is further configured to:

transmit, to the energy harvesting device, an indication of the configured frequency spread and the configured frequency shift to be introduced by the backscattering operation at the energy harvesting device.

11. The apparatus of claim 1, wherein the gain associated with each of the multiple frequencies comprises a channel gain as a function of frequency over the range of frequencies for a channel between the reader device and the energy harvesting device.

12. The apparatus of claim 11, wherein, to determine the gain associated with each of multiple frequencies in the range of frequencies the at least one processor is further configured to:

perform, based on the backscatter signal, an estimation of the channel gain as the function of the frequency over the range of frequencies.

13. An apparatus for wireless communication at an energy harvesting device, comprising:

memory; and at least one processor coupled to the memory and, based at least in part on information stored in the memory, the at least one processor is configured to:

transmit, or include in a previously backscattered signal, a capability indication of a first frequency-spreading capability of the energy harvesting device to backscatter a received signal associated with at least a first frequency over a range of frequencies in a plurality of frequencies and a second frequency-shifting capability of the energy harvesting device to backscatter the received signal with a frequency shift;

receive a transmitted signal at the first frequency;

backscatter, for a determination, at a reader, of a gain associated with each of multiple frequencies in the range of frequencies, and via a backscattering operation introducing a configured frequency shift and a configured frequency spread, a backscatter signal over the range of frequencies based on the transmitted signal at the first frequency; and receive, from the reader, an energy signal based on the backscatter signal.

14. The apparatus of claim 13, wherein the at least one processor is further configured to:

receive an indication of the configured frequency spread and the configured frequency shift to be introduced by the backscattering operation at the energy harvesting device for the transmitted signal at the first frequency.

15. The apparatus of claim 13, wherein the range of frequencies does not include the first frequency.

16. The apparatus of claim 13, wherein the energy harvesting device is one of a passive internet of things (IoT) device, a backscatter device, or a radio frequency integrated circuit (RFIC).

17. An apparatus for wireless communication at a reader device, comprising:

memory; and at least one processor coupled to the memory and, based at least in part on information stored in the memory, the at least one processor is configured to:

transmit a first signal at a first frequency for a backscattering from an energy harvesting device over a range of frequencies in a plurality of frequencies, wherein the range of frequencies is based on a configured frequency shift and a configured frequency spread introduced by a backscattering operation at the energy harvesting device; and obtain, based on the backscattering of the first signal, a gain associated with each of multiple frequencies in the range of frequencies.

18. The apparatus of claim 17, wherein the at least one processor is further configured to:

transmit one or more additional signals at one or more additional frequencies based on the gain associated with each of multiple frequencies in the range of frequencies.

19. The apparatus of claim 17, wherein the at least one processor is further configured to:

receive a first indication of a first frequency-spreading capability of the energy harvesting device to backscatter a received signal associated with at least the first frequency over at least a frequency band comprising the range of frequencies and a second frequency-shifting capability of the energy harvesting device to backscatter the received signal associated with at least the first frequency with the configured frequency shift; and transmit a second indication of the configured frequency spread and the configured frequency shift to be introduced by the backscattering operation at the energy harvesting device for the first signal at the first frequency.

20. The apparatus of claim 17, wherein the range of frequencies is a first frequency band of a plurality of non-overlapping frequency bands, and the at least one processor is further configured to:

transmit one or more indications of one or more frequency bands of the plurality of non-overlapping frequency bands over which to backscatter the first signal for a corresponding one or more energy harvesting devices, wherein the one or more indications comprises a corresponding one or more configured frequency shifts and a corresponding one or more configured frequency spreads to be introduced by a corresponding one or more backscattering operations at the corresponding one or more energy harvesting devices; and obtain one or more CSI associated with the corresponding one or more energy harvesting devices based on the backscattering of the first signal from each of the corresponding one or more energy harvesting devices.

21. A method for wireless communication at a reader device, the method comprising:

receiving, from an energy harvesting device and based on a transmitted signal at a first frequency, a backscatter signal over a range of frequencies in a plurality of frequencies, wherein the range of frequencies is based on a configured frequency shift and a configured frequency spread introduced by a backscattering operation at the energy harvesting device;

determining, based on the backscatter signal, a gain associated with each of multiple frequencies in the range of frequencies;

selecting, based on the gain associated with each of the multiple frequencies, at least one frequency to use to transfer energy to the energy harvesting device; and transmitting, using the at least one frequency, an energy signal for the energy harvesting device.

22. The method of claim 21, wherein transmitting the energy signal comprises transmitting energy over a frequency with a largest gain associated with the plurality of frequencies.

23. The method of claim 21, wherein the range of frequencies does not include the first frequency.

24. The method of claim 21, wherein the range of frequencies is a first frequency band in a plurality of non-overlapping frequency bands, the method further comprising:

receiving one or more additional backscatter signals, from a corresponding one or more additional energy harvesting devices, over a corresponding one or more additional frequency bands of the plurality of non-overlapping frequency bands based on the transmitted signal at the first frequency and a corresponding one or more configured frequency shifts and a corresponding one or more configured frequency spreads introduced by a corresponding one or more backscattering operations at the corresponding one or more additional energy harvesting devices, wherein the corresponding one or more additional energy harvesting devices are configured to backscatter over the corresponding one or more additional frequency bands by at least one of the reader device or a device that transmits the transmitted signal at the first frequency; and transmitting additional energy signals for the corresponding one or more additional energy harvesting devices via one or more corresponding frequencies based on a corresponding one or more CSI estimated based on a corresponding backscatter signal of the one or more additional backscatter signals.

25. The method of claim 21, further comprising:

receiving, from the energy harvesting device, one or more additional backscatter signals over one more additional ranges of frequencies in the plurality of frequencies based on one or more transmitted signals at a corresponding one or more additional frequencies; and determining, based on the one or more additional backscatter signals, an additional gain associated with each of multiple additional frequencies in the plurality of frequencies, wherein selecting the at least one frequency further comprising selecting the at least one frequency further based on the gain associated with each of the multiple additional frequencies.

26. The method of claim 21, wherein receiving the backscatter signal comprises receiving the backscatter signal via a plurality of antennas, the method further comprising:

determining a precoding matrix for transmitting the energy signal for the energy harvesting device based on the backscatter signal received via the plurality of antennas, wherein transmitting the energy signal comprises using the precoding matrix to transmit the energy signal.

27. The method of claim 21, further comprising:

iteratively, until a set of criteria is met, receiving an additional backscatter signal via a second plurality of frequencies based on an additional signal at an additional frequency in an additional plurality of frequencies associated with a last-received backscatter signal, wherein the additional frequency is based on an additional CSI estimation based on the last-received backscatter signal, and wherein the at least one frequency used to transmit energy for the energy harvesting device is further based on a set of additional CSI estimations associated with the additional backscatter signal received during a set of iterations performed before meeting the set of criteria.

28. The method of claim 21, further comprising:

transmitting, to the energy harvesting device, an indication of the configured frequency spread and the configured frequency shift to be introduced by the backscattering operation at the energy harvesting device; and transmitting the transmitted signal at the first frequency.

* * * * *